US012585571B1

(12) United States Patent
Agarwal et al.

(10) Patent No.: US 12,585,571 B1
(45) Date of Patent: *Mar. 24, 2026

(54) MULTIPLE MODES OF STORING AND QUERYING TRACE DATA IN A MICROSERVICES-BASED ARCHITECTURE

(71) Applicant: Cisco Technology, Inc., San Jose, CA (US)

(72) Inventors: Mayank Agarwal, Mountain View, CA (US); Dmitrii Anoshin, San Francisco, CA (US); Steven Flanders, San Francisco, CA (US); Steven Karis, Redwood City, CA (US); Justin Smith, San Francisco, CA (US); Eric Wohlstadter, Atherton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,606

(22) Filed: Jul. 31, 2023

Related U.S. Application Data

(63) Continuation of application No. 17/538,159, filed on Nov. 30, 2021, now Pat. No. 11,762,759, which is a
(Continued)

(51) Int. Cl.
| | |
|---|---|
| *G06F 11/36* | (2006.01) |
| *G06F 11/362* | (2025.01) |
| *G06F 16/953* | (2019.01) |

(52) U.S. Cl.
CPC .......... *G06F 11/364* (2013.01); *G06F 16/953* (2019.01)

(58) Field of Classification Search
CPC .............................. G06F 11/364; G06F 16/953
(Continued)

(56) References Cited

U.S. PATENT DOCUMENTS

| | | |
|---|---|---|
| 8,375,370 B2 | 2/2013 | Chaar et al. |
| 11,256,604 B2 | 2/2022 | Agarwal et al. |

(Continued)

FOREIGN PATENT DOCUMENTS

| | | |
|---|---|---|
| CN | 109656792 A | 4/2019 |

OTHER PUBLICATIONS

Zhou, Xiang, et al. "Fault analysis and debugging of microservice systems: Industrial survey, benchmark system, and empirical study." IEEE Transactions on Software Engineering 47.2 (2018): pp. 243-260. (Year: 2018).*

(Continued)

*Primary Examiner* — Satish Rampuria
(74) *Attorney, Agent, or Firm* — Kilpatrick Townsend & Stockton LLP

(57) ABSTRACT

A method of analyzing a performance of a microservices-based application comprises generating a plurality of traces from a plurality of spans associated with the microservices-based application. The method also comprises generating a plurality of data sets each associated with a respective analysis mode of a plurality of analysis modes using the plurality of traces, wherein each analysis mode extracts a different level of detail for analyzing the performance of the services in the application from the plurality of spans. Further, the method comprises selecting, based on a first user query, a first analysis mode from the plurality of analysis modes for generating a response to the first user query. The method also comprises accessing a data set of the plurality of data sets that is associated with the first analysis mode and generating the response to the first user query using the data set associated with the first analysis mode.

17 Claims, 33 Drawing Sheets

Related U.S. Application Data continuation of application No. 16/752,286, filed on Jan. 24, 2020, now Pat. No. 11,256,604.

(58) Field of Classification Search
USPC ................................................. 717/124–135
See application file for complete search history.

(56) References Cited

U.S. PATENT DOCUMENTS

| | | | |
|---|---|---|---|
| 11,283,900 | B2 | 3/2022 | Myers et al. |
| 11,329,905 | B1 | 5/2022 | Pangeni et al. |
| 11,360,881 | B2 * | 6/2022 | Gardner .............. G06F 11/3684 |
| 11,762,759 | B1 | 9/2023 | Agarwal et al. |
| 12,309,236 | B1 * | 5/2025 | Frazier, Jr .......... G06F 16/9535 |
| 2002/0087949 | A1 | 7/2002 | Golender et al. |
| 2008/0127108 | A1 | 5/2008 | Ivanov et al. |
| 2014/0215443 | A1 | 7/2014 | Voccio et al. |
| 2016/0098342 | A1 | 4/2016 | Faizanullah et al. |
| 2017/0242784 | A1 | 8/2017 | Heorhiadi et al. |
| 2018/0089287 | A1 | 3/2018 | Haggie et al. |
| 2018/0136931 | A1 | 5/2018 | Hendrich et al. |
| 2018/0144064 | A1 | 5/2018 | Krasadakis |
| 2018/0150383 | A1 | 5/2018 | Alaranta et al. |
| 2020/0104233 | A1 * | 4/2020 | Gaber ................ G06F 11/3476 |
| 2021/0232485 | A1 | 7/2021 | Agarwal et al. |
| 2022/0027431 | A1 * | 1/2022 | Zheng ................... G06F 16/986 |
| 2022/0278889 | A1 * | 9/2022 | Malleshaiah .......... H04L 67/51 |

OTHER PUBLICATIONS

Zasadziński, Michał, et al. "Next stop" noops: Enabling cross-system diagnostics through graph-based composition of logs and metrics. 2018 IEEE International Conference on Cluster Computing (Cluster). IEEE, 2018. pp. 212-222. (Year: 2018).*

Viennot, Nicolas, et al. "Synapse: a microservices architecture for heterogeneous-database web applications." Proceedings of the tenth european conference on computer systems. 2015. pp. 1-16 (Year: 2015).*

Kakivaya, Gopal, et al. "Service fabric: a distributed platform for building microservices in the cloud." Proceedings of the thirteenth EuroSys conference. 2018. pp. 1-15 (Year: 2018).*

Chothia, Zaheer, et al. "Online reconstruction of structural information from datacenter logs." Proceedings of the Twelfth European Conference on Computer Systems. 2017. pp. 344-358 (Year: 2017).*

Hanif, Zach, Tamas K. Lengyel, and George D. Webster. "Internet-scale file analysis." Black Hat, USA (2015): pp. 1-10. (Year: 2015).*

Zheng , et al., "A Detailed and Real-time Performance Monitoring Framework for Blockchain Systems", Proceedings of the 40th International Conference on Software Engineering: Software Engineering in Practice, 2018, pp. 134-143.

Thalheim , et al., "Sieve: Actionable Insights from Monitored Metrics in Distributed Systems", Proceedings of the 18th ACM/IFIP/USENIX Middleware Conference, Sep. 2017, 17 pages.

PCT/US2021/014348 , "International Search Report and Written Opinion", Apr. 16, 2021, 9 pages.

Akbulut , et al., "Performance Analysis of Microservices Design Patterns", IEEE Internet Computing, vol. 23, No. 6, Available Online at: https://people.engr.ncsu.edu/hp/papers/Akhan2.pdf, Nov. 4, 2019, pp. 1-6.

Al-Masri , "Enhancing the Microservices Architecture for the Internet of Things", IEEE International Conference on Big Data (Big Data), Dec. 10-13, 2018, pp. 5119-5125.

Amaral , et al., "Performance Evaluation of Microservices Architectures Using Containers", IEEE 14th International Symposium on Network Computing and Applications, Sep. 30, 2015, pp. 27-34.

Barakat , "Monitoring and Analysis of Microservices Performance", Journal of Computer Science and Control Systems, vol. 10, No. 1, May 2017, pp. 19-22.

Coulson , et al., "Adaptive Microservice Scaling for Elastic Applications", IEEE Internet of Things Journal, vol. 7, No. 5, Jan. 7, 2020, pp. 4195-4202.

EP21705770.2 , "Office Action", Aug. 16, 2023, 3 pages.

Jha , et al., "A Holistic Evaluation of Docker Containers for Interfering Microservices", IEEE International Conference on Services Computing (SCC), Jul. 7, 2018, pp. 33-40.

Jindal , et al., "Performance Modeling for Cloud Microservice Applications", Proceedings of the 2019 ACM/SPEC International Conference on Performance Engineering, Available Online at: https://research.spec.org/icpe_proceedings/2019/proceedings/p25.pdf, Apr. 7-11, 2019, pp. 25-32.

Khazaei , et al., "Efficiency Analysis of Provisioning Microservices", IEEE International Conference on Cloud Computing Technology and Science (CloudCom), Dec. 15, 2016, pp. 261-268.

Kistowski , et al., "Teastore: A Micro-Service Reference Application for Benchmarking, Modeling and Resource Management Research", Institute of Electrical and Electronics Engineers 26th International Symposium on Modeling, Analysis, and Simulation of Computer and Telecommunication Systems (MASCOTS), Sep. 2018, 14 pages.

EP21705770.2 , "Office Action", May 16, 2024, 6 pages.

YouTube, Dynatrace, Titled: "Product demo—Front-end to Back-end monitoring" pulled from the Interneton.Dec. 24, 2024: https://www.youtube.com/watch?v=3Gdqn2WI6Go, Jun. 26, 2020, included transcription, 6 pages.

* cited by examiner

588

| Mode | Speed | Accuracy | Dimensions | Comment |
|---|---|---|---|---|
| Fast and full-fidelity (FFF) | Fast | Full-Fidelity | Selected | Metrics are pre-computed for select dimensions (e.g., indexed tags) to facilitate speed of aggregating metrics to respond to queries. Also full-fidelity accuracy of computing metrics across the select dimensions is prioritized over full-fidelity accuracy across all possible dimensions. |
| Fast and approximate (FAA) | Fast | Sampled | Full | Data is sampled and fast speed of performing computations across all possible dimensions (instead of being limited to select dimensions) is prioritized over full-fidelity accuracy of the computations. |
| Slow and full-fidelity (SFF) | Slow | Full-Fidelity | Full | All raw data is processed, and full fidelity accuracy of performing computations across all possible dimensions is prioritized over the speed of performing the computations. |

Workflow

| frontend:/cart | ⌄ |
| frontend:/cart | |
| frontend:/checkout | |
| frontend:/currency | |
| frontend:/product | |
| frontend:/shipping | |

1034 incident

| dev_errors | ⌄ |
| dev_errors | |
| instance_errors | |
| none | |
| region_latency | |
| tenant_level_errors | |
| version_errors | |

1036 tenant-level

| bronze | ⌄ |
| bronze | |
| gold | |
| silver | |

1032 environment

| dev | ⌄ |
| dev | |
| prod | |
| stag | |

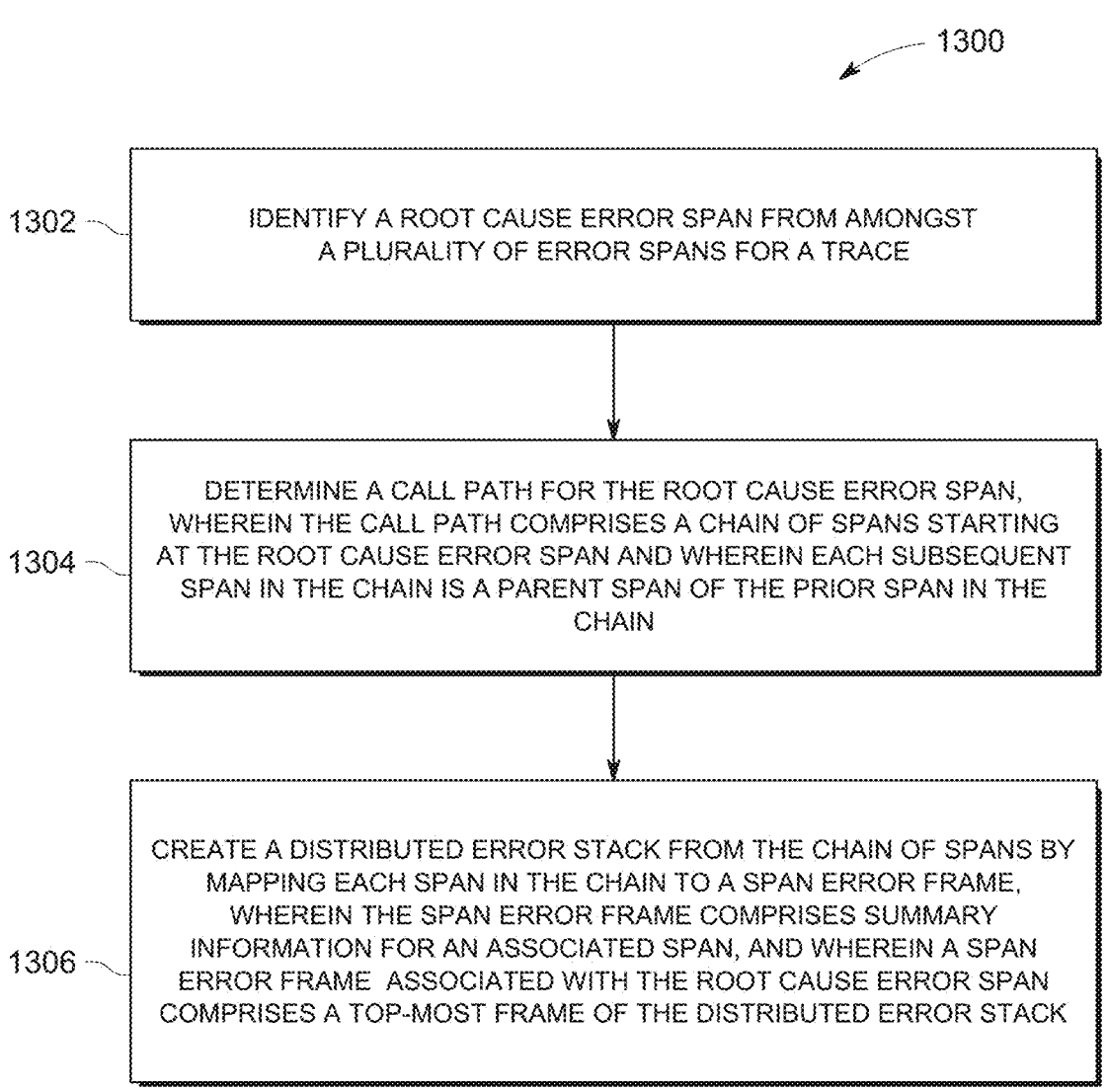

1300

1302 — IDENTIFY A ROOT CAUSE ERROR SPAN FROM AMONGST A PLURALITY OF ERROR SPANS FOR A TRACE

1304 — DETERMINE A CALL PATH FOR THE ROOT CAUSE ERROR SPAN, WHEREIN THE CALL PATH COMPRISES A CHAIN OF SPANS STARTING AT THE ROOT CAUSE ERROR SPAN AND WHEREIN EACH SUBSEQUENT SPAN IN THE CHAIN IS A PARENT SPAN OF THE PRIOR SPAN IN THE CHAIN

1306 — CREATE A DISTRIBUTED ERROR STACK FROM THE CHAIN OF SPANS BY MAPPING EACH SPAN IN THE CHAIN TO A SPAN ERROR FRAME, WHEREIN THE SPAN ERROR FRAME COMPRISES SUMMARY INFORMATION FOR AN ASSOCIATED SPAN, AND WHEREIN A SPAN ERROR FRAME ASSOCIATED WITH THE ROOT CAUSE ERROR SPAN COMPRISES A TOP-MOST FRAME OF THE DISTRIBUTED ERROR STACK

FIG. 13

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

Edge_Health:

| from service name | to service name | from pod | to pod | from operation | to operation | request | error | Latency Bucket N | ts |
|---|---|---|---|---|---|---|---|---|---|
| frontend | product-catalog service | frontend-daliuytgq-dd58f | product catalog service-18iodsfh27-r234t | /product | /GetProduct | 1 | 0 | 1 | 1576695520 |

Node_Health:

| svc_name | env | pod | code | operation | request | error | Root cause | Latency Bucket N | ts |
|---|---|---|---|---|---|---|---|---|---|
| frontend | prod | frontend-dalluytgq-dd58f | 200 | /product | 1 | 0 | 1 | 1 | 1576695520 |
| product catalog service | prod | productcatalongservice-18iodsfh27-r234t | 200 | /GetProduct | 1 | 1 | 1 | 1 | 1576695520 |

FIG. 15B

| svc_name | env | pod | code | count | sum | ts |
|---|---|---|---|---|---|---|
| product catalog service | pod | product catalog service-18iodsfh 27-r234t | 200 | 1 | 115 | 1576695520 |

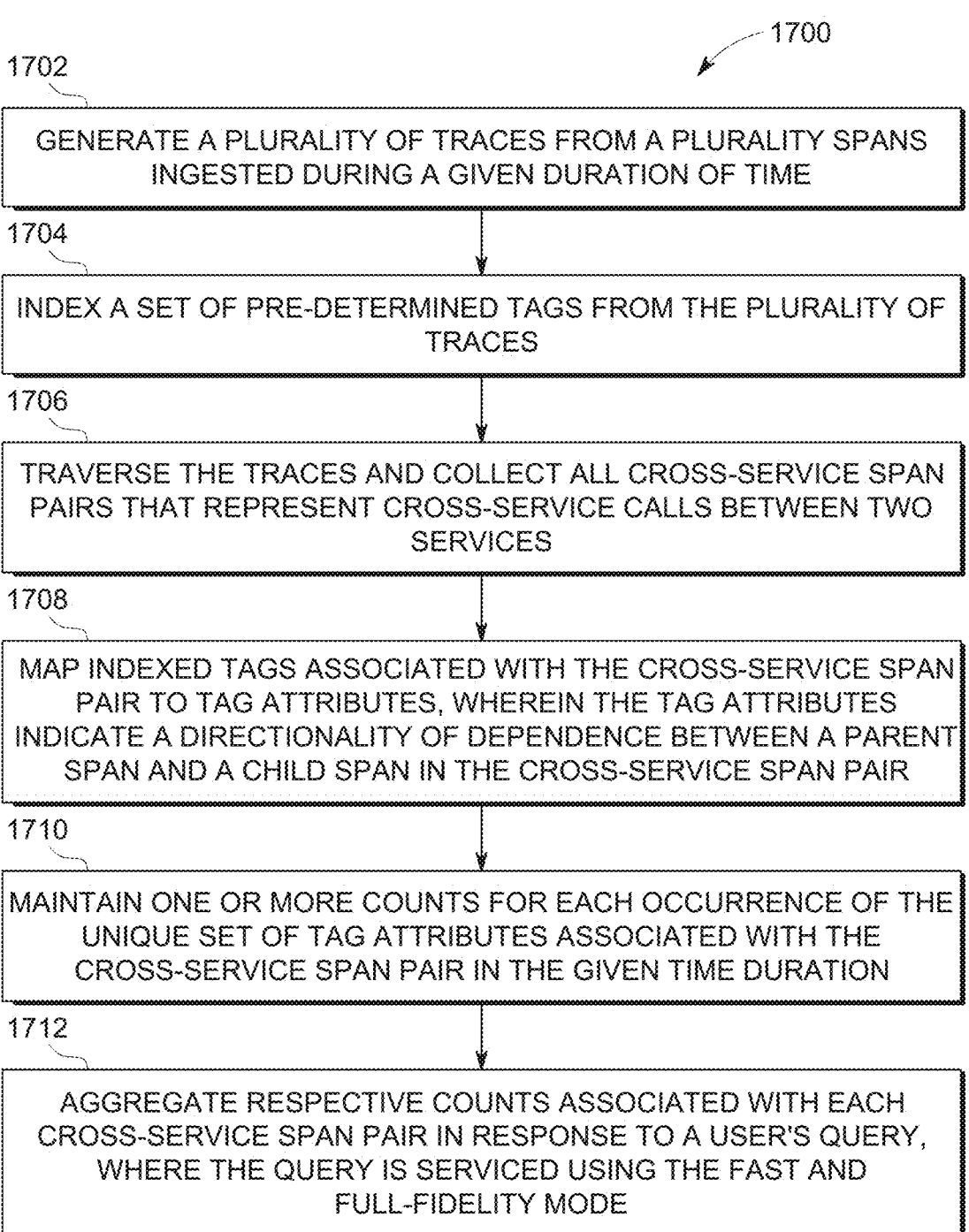

1700

1702

GENERATE A PLURALITY OF TRACES FROM A PLURALITY SPANS INGESTED DURING A GIVEN DURATION OF TIME

1704

INDEX A SET OF PRE-DETERMINED TAGS FROM THE PLURALITY OF TRACES

1706

TRAVERSE THE TRACES AND COLLECT ALL CROSS-SERVICE SPAN PAIRS THAT REPRESENT CROSS-SERVICE CALLS BETWEEN TWO SERVICES

1708

MAP INDEXED TAGS ASSOCIATED WITH THE CROSS-SERVICE SPAN PAIR TO TAG ATTRIBUTES, WHEREIN THE TAG ATTRIBUTES INDICATE A DIRECTIONALITY OF DEPENDENCE BETWEEN A PARENT SPAN AND A CHILD SPAN IN THE CROSS-SERVICE SPAN PAIR

1710

MAINTAIN ONE OR MORE COUNTS FOR EACH OCCURRENCE OF THE UNIQUE SET OF TAG ATTRIBUTES ASSOCIATED WITH THE CROSS-SERVICE SPAN PAIR IN THE GIVEN TIME DURATION

1712

AGGREGATE RESPECTIVE COUNTS ASSOCIATED WITH EACH CROSS-SERVICE SPAN PAIR IN RESPONSE TO A USER'S QUERY, WHERE THE QUERY IS SERVICED USING THE FAST AND FULL-FIDELITY MODE

FIG. 17

Aggregating for fast and approximate mode

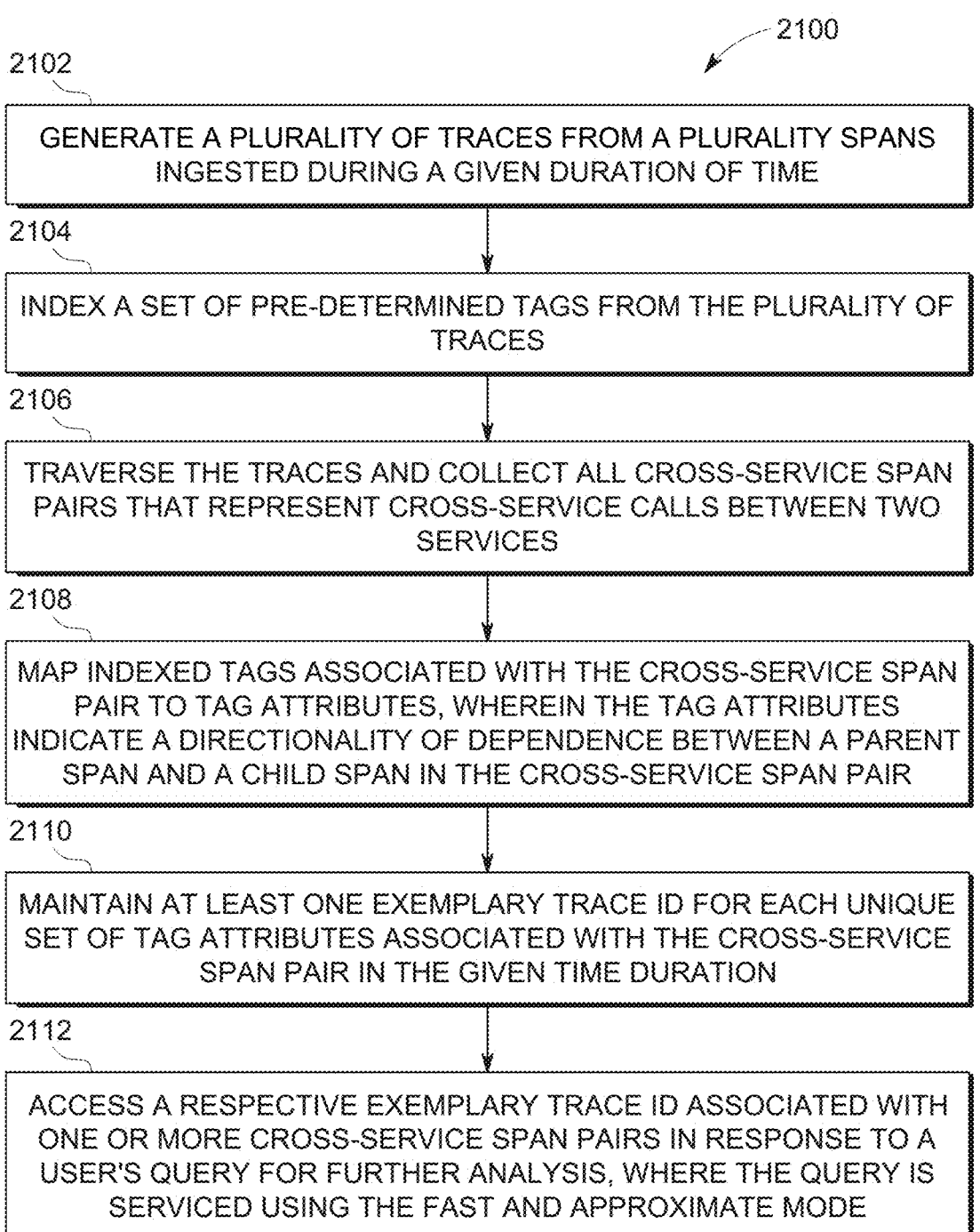

2100

2102

GENERATE A PLURALITY OF TRACES FROM A PLURALITY SPANS INGESTED DURING A GIVEN DURATION OF TIME

2104

INDEX A SET OF PRE-DETERMINED TAGS FROM THE PLURALITY OF TRACES

2106

TRAVERSE THE TRACES AND COLLECT ALL CROSS-SERVICE SPAN PAIRS THAT REPRESENT CROSS-SERVICE CALLS BETWEEN TWO SERVICES

2108

MAP INDEXED TAGS ASSOCIATED WITH THE CROSS-SERVICE SPAN PAIR TO TAG ATTRIBUTES, WHEREIN THE TAG ATTRIBUTES INDICATE A DIRECTIONALITY OF DEPENDENCE BETWEEN A PARENT SPAN AND A CHILD SPAN IN THE CROSS-SERVICE SPAN PAIR

2110

MAINTAIN AT LEAST ONE EXEMPLARY TRACE ID FOR EACH UNIQUE SET OF TAG ATTRIBUTES ASSOCIATED WITH THE CROSS-SERVICE SPAN PAIR IN THE GIVEN TIME DURATION

2112

ACCESS A RESPECTIVE EXEMPLARY TRACE ID ASSOCIATED WITH ONE OR MORE CROSS-SERVICE SPAN PAIRS IN RESPONSE TO A USER'S QUERY FOR FURTHER ANALYSIS, WHERE THE QUERY IS SERVICED USING THE FAST AND APPROXIMATE MODE

FIG. 21

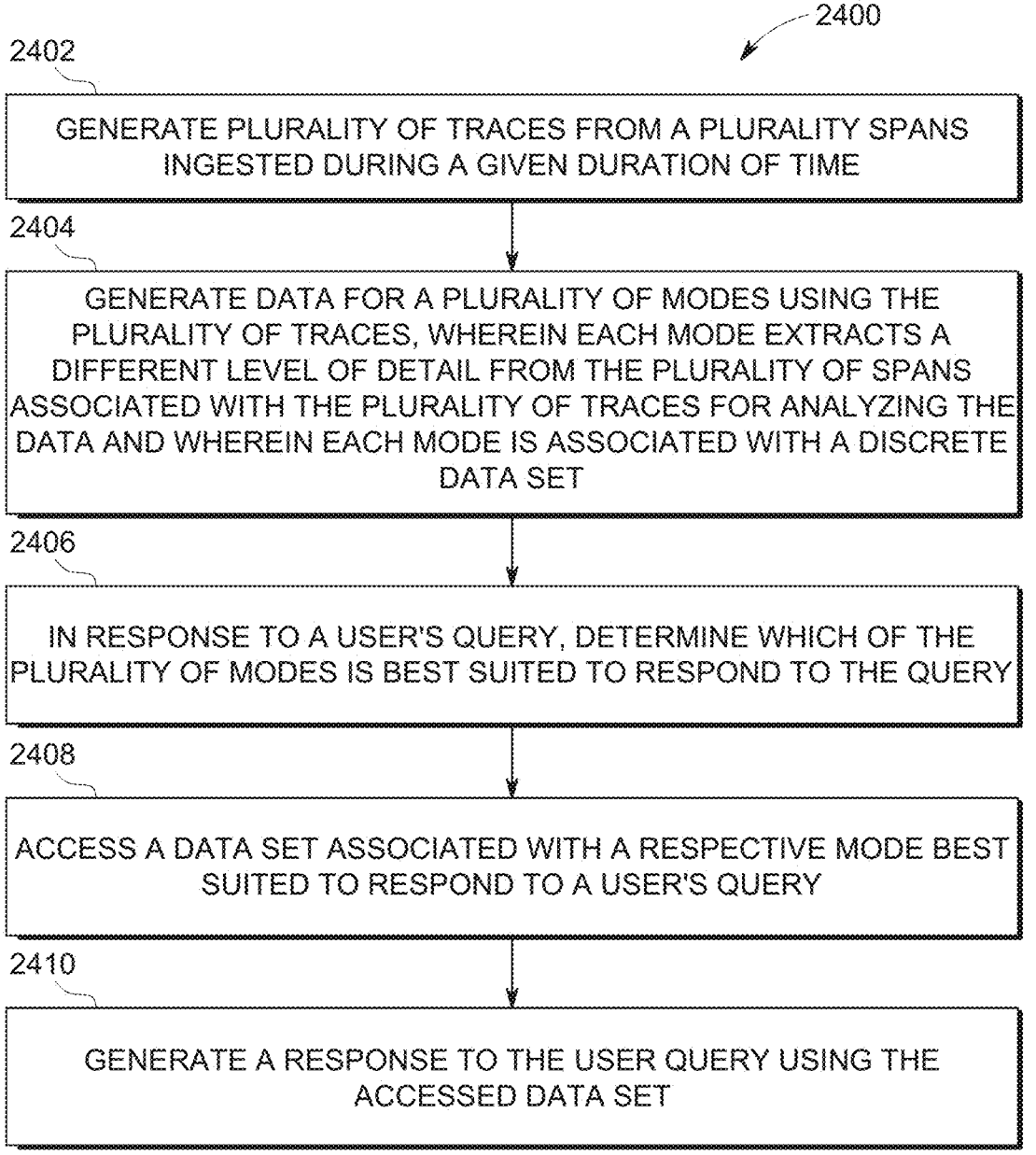

2400

2402

GENERATE PLURALITY OF TRACES FROM A PLURALITY SPANS INGESTED DURING A GIVEN DURATION OF TIME

2404

GENERATE DATA FOR A PLURALITY OF MODES USING THE PLURALITY OF TRACES, WHEREIN EACH MODE EXTRACTS A DIFFERENT LEVEL OF DETAIL FROM THE PLURALITY OF SPANS ASSOCIATED WITH THE PLURALITY OF TRACES FOR ANALYZING THE DATA AND WHEREIN EACH MODE IS ASSOCIATED WITH A DISCRETE DATA SET

2406

IN RESPONSE TO A USER'S QUERY, DETERMINE WHICH OF THE PLURALITY OF MODES IS BEST SUITED TO RESPOND TO THE QUERY

2408

ACCESS A DATA SET ASSOCIATED WITH A RESPECTIVE MODE BEST SUITED TO RESPOND TO A USER'S QUERY

2410

GENERATE A RESPONSE TO THE USER QUERY USING THE ACCESSED DATA SET

FIG. 24

MULTIPLE MODES OF STORING AND QUERYING TRACE DATA IN A MICROSERVICES-BASED ARCHITECTURE

CROSS-REFERENCE OF RELATED APPLICATIONS

This application is as a Continuation of U.S. application Ser. No. 17/583,159, filed Nov. 30, 2021, titled "MULTIPLE MODES OF STORING AND QUERYING TRACE DATA IN A MICROSERVICES-BASED ARCHITECTURE" which is a Continuation of U.S. application Ser. No. 16/752,286, filed Jan. 24, 2020, titled "MULTIPLE MODES OF DATA COLLECTION AND ANALYSIS IN A MICROSERVICES-BASED ARCHITECTURE," which are hereby incorporated by reference in their entirety for all purposes.

BACKGROUND

Computer systems may run applications or services that are provided via a server or cloud. A client computer system may send a request to a server that retrieves application installation files in an underlying database. The applications or services may be developed and deployed as a single unit or as multiple units, such as a collection of microservices. Applications that are developed as a single unit may be monolithic applications that includes a user interface and data access codes combined into a single program from a single platform. Monolithic applications are self-contained and independent from other computing applications. With the advent of cloud computing, however, these large centralized monolithic systems are being decoupled and distributed to address scalability needs and to allow companies to deliver value faster.

Microservices or "microservices architecture" is a software development method of developing software applications as a suite of independently deployable smaller cooperating services. The cooperating services run processes and communicate to serve a business goal to form an enterprise application. More specifically, in a microservices architecture, an application is developed as a collection of small services; each service implements business capabilities, runs in its own process and communicates via Application Program Interfaces ("APIs"), e.g., hypertext transfer protocol (HTTP) APIs, or messaging. Each microservice may be deployed, upgraded, scaled and restarted independent of other services in the application, typically as part of an automated system, enabling frequent updates to live applications without impacting end customers.

With the rise of cloud native applications, which include microservices, there has been a shift in the manner in which software is built and deployed, and also in the manner in which it is monitored and observed. Microservices-based applications have to operate within environments of dramatically increased complexity and many more layers of abstraction compared to previous generations of monolithic applications. Compared to monolithic applications, microservices architectures generally introduce complexity in network communication, feature short lifecycles and require resiliency in dynamic environments.

Software developers for microservices-based applications monitor different aspects of the software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed in a cloud architecture.

Computing operations of the instrumented software may be described by spans and traces. The spans and traces produced by various instrumented microservices in an architecture are communicated to an analysis system that analyzes the traces and spans to enable a software developer to monitor and troubleshoot the services within their software.

As companies begin to increasingly rely on microservices architectures, they run into operational complexity and struggle to efficiently monitor their environments. One of the challenges associated with microservices architectures, for example, is efficiently ingesting and aggregating significant amounts of span and trace data generated by various services in an application owner's architecture. Traditional monitoring and troubleshooting tools, designed as symptom-based solutions with single purpose capabilities, are simply unable to keep up with tracking the performance of dynamic cloud native applications and analyzing the significant amounts of span and trace data they generate. Thus, systems that can efficiently and accurately monitor microservices architectures and microservices-based applications are the subject of considerable innovation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The challenges associated with monitoring, troubleshooting and tracking errors in microservices architectures led to the rise of distributed tracing, which involves racing user requests through applications that are distributed. One of the challenges encountered in the development of monitoring tools for microservices architectures, for example, is efficiently ingesting and aggregating considerable amounts of trace data generated by various services in an architecture. Conventional tracing and monitoring systems are typically unable to ingest the significant amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate statistics (e.g., requests, errors, latency, etc.) based on the sampled set of data and, accordingly, the calculations may be approximate at best and inaccurate at worst.

Embodiments of the present invention allow clients of a monitoring platform the ability to ingest, process and store most or all of the spans received from the client in real time. By comparison, conventional monitoring systems do not accept all of the incoming spans or traces; instead, they sample incoming spans (or traces) to calculate service level indicators (SLIs) at the root level of a trace before discarding the spans. Embodiments of the present invention, by comparison, comprise an ingestion streaming pipeline that is able to ingest and consolidate all the incoming spans into traces in real time and is further able to use advanced compression methods to store the traces.

Additionally, because most or all of the incoming trace and span information from a client may be efficiently ingested and aggregated, a monitoring platform configured in accordance with embodiments of the present invention is able to convey meaningful and accurate information regarding throughput, latency and error rate (without the need for sampling). The ability to ingest most or all of the incoming span data allows the monitoring platform to compute metrics pertaining to throughput, latency and error to be performed with a high level of accuracy.

Embodiments of the present invention further allow a client to store and analyze the trace data using multiple modes of analysis. In one embodiment, for example, a first mode of analysis may comprise a "fast and full-fidelity" mode that supports a rapid and accurate analysis for a selected set of tags, e.g., user-selected indexed tags, global tags of the trace, etc. This mode is particularly useful for clients who need accurate statistics and SLI information in connection with a limited set of high-value tags. The fast and full-fidelity mode enables developers to aggregate metrics that have been generated from the trace data to efficiently and accurately respond to queries submitted by a client.

In one or more embodiments, a second mode of analysis may comprise a "fast and approximate" mode that provides SLI information on any dimension or attribute of data by sampling traces and is particularly useful for clients who want to rapidly analyze problem areas in their application. In an embodiment, the fast and approximate mode may be characterized by a sampled data collection and method of analysis. In an embodiment, the sampled data set may comprise exemplary traces. For example, the fast and approximate mode may allow users to track Trace Identifiers (IDs) for exemplary traces associated with a user-configured set of indexed tags. The Trace IDs may be used to retrieve the associated traces and analysis on the actual traces may be run to generate more particularized information, e.g., span duration, span count, span workload percentage, etc. for each span in a given trace. Once the traces are retrieved, an analysis may be run on an arbitrary set of tags (in addition to the user-configured indexed tags). Note that this analysis may de-prioritize accuracy to provide approximate results because the arbitrary set of tags are analyzed for an exemplary set of traces (instead of the entire set of ingested traces). In some embodiments, instead of performing computations using exemplary traces, the fast and approximate mode may use other types of sampling, e.g., statistical sampling.

Additionally, in one or more embodiments, a third mode of analysis may comprise a "slow and full-fidelity" mode where a full-fidelity analysis may be conducted on any dimension or attribute of data. The slow and full-fidelity mode allows clients to search most or all of the incoming trace information that was ingested by the monitoring platform. The slow and full-fidelity mode may de-prioritize speed for accuracy, and may be used by clients who need a more thorough analysis across all dimensions.

In an embodiment, each of the three modes may be supported by the monitoring platform simultaneously by storing ingested trace data using three different formats, wherein each format corresponds to one of the three available modes of analysis. When a user submits a query, the monitoring platform may determine which of the three data sets is most appropriate for addressing the query. Thereafter, the monitoring platform executes the query against the selected data set to deliver results to the user.

In one or more embodiments of the present disclosure, a method is provided for analyzing a performance of a microservices-based application. The method comprises generating a plurality of traces from a plurality of spans associated with the microservices-based application and ingested during a given time duration. The method also comprises generating a plurality of data sets each associated with a respective analysis mode of a plurality of analysis modes using the plurality of traces, wherein each analysis mode extracts a different level of detail from the plurality of spans associated with the plurality of traces. Further, the method comprises selecting, based on a first user query, a first analysis mode from the plurality of analysis modes for generating a response to the first user query and accessing a data set of the plurality of data sets that is associated with the first analysis mode. The method also comprises generating the response to the first user query using the data set associated with the first analysis mode, wherein the first user query requests information pertaining to the performance of the services in the microservices-based application.

In one or more embodiments of the present disclosure, a non-transitory computer-readable medium having computer-readable program code embodied therein for causing a computer system to perform a method of analyzing performance of a microservices-based application is provided. The method comprises generating a plurality of traces from a plurality of spans associated with the microservices-based application and ingested during a given time duration. The method also comprises generating a plurality of data sets each associated with a respective analysis mode of a plurality of analysis modes using the plurality of traces, wherein each analysis mode extracts a different level of detail from the plurality of spans associated with the plurality of traces. Further, the method comprises selecting, based on a first user query, a first analysis mode from the plurality of analysis modes for generating a response to the first user query and accessing a data set of the plurality of data sets that is associated with the first analysis mode. The method also comprises generating the response to the first user query using the data set associated with the first analysis mode, wherein the first user query requests information pertaining to the performance of the services in the microservices-based application.

In one or more embodiments of the present disclosure, a system for performing a method for analyzing a performance of a microservices-based application is provided. The system comprises a processing device communicatively coupled with a memory and configured to: a) generate a plurality of traces from a plurality of spans associated with the microservices-based application and ingested during a given time duration; b) generate a plurality of data sets each associated with a respective analysis mode of a plurality of analysis modes using the plurality of traces, wherein each analysis mode extracts a different level of detail for analyzing the performance of the services in the microservices-based application from the plurality of spans associated with the plurality of traces; c) select, based on a first user query, a first analysis mode from the plurality of analysis modes for generating a response to the first user query; d) access a data set of the plurality of data sets that is associated with the first analysis mode; e) generate the response to the first user query using the data set associated with the first analysis mode.

BRIEF DESCRIPTION OF THE DRAWINGS

In the drawings:

FIG. 5B is a table that compares the multiple modes of analysis discussed in FIG. 5A, in accordance with embodiments of the present invention.

FIG. 13 presents a flowchart illustrating a process to create a trace error signature starting with a root cause error span, in accordance with embodiments of the present invention.

FIG. 14B is a table illustrating an exemplary manner in which selected tags for each service in a cross-service span pair may be mapped to tag attributes and stored as part of a data object associated with an edge in the service graph, in accordance with embodiments of the present invention.

FIG. 15B illustrates the manner in which data in the FFF mode is persisted using an edge data object comprising a memory-resident table of tag attributes with associated counts and using a node data object comprising a memory-resident table of tags with associated counts, in accordance with an embodiment of the present invention.

FIG. 15C illustrates the manner in which custom metrics in the FFF mode may be extracted and persisted, in accordance with an embodiment of the present invention.

FIG. 17 presents a flowchart illustrating a process in which data for the FFF mode may be aggregated and persisted, in accordance with embodiments of the present invention.

FIG. 21 presents a flowchart illustrating a process in which data for the FAA mode may be aggregated and persisted, in accordance with embodiments of the present invention.

FIG. 24 presents a flowchart illustrating a process for persisting and querying data in a computer system comprising microservices, in accordance with embodiments of the present invention.

DETAILED DESCRIPTION

Figure 1A:
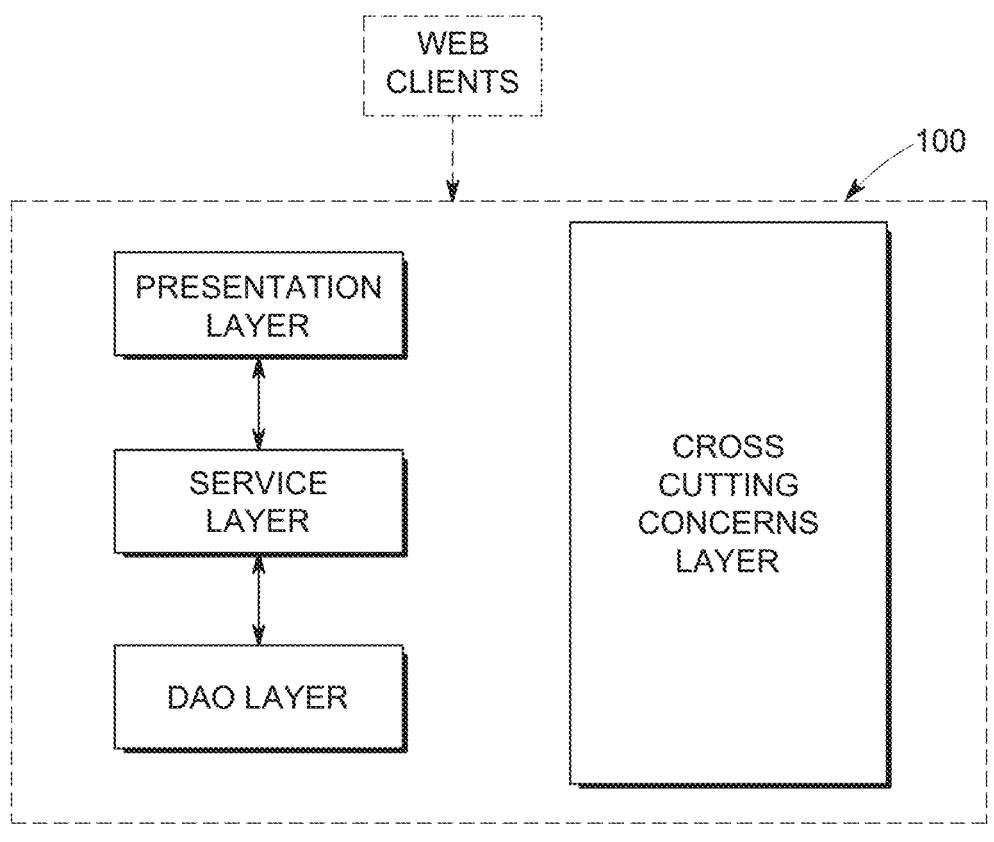
FIG. 1A illustrates an exemplary monolithic multi-layer architecture.

Embodiments are described herein according to the following outline:

1.0 Terms
2.0 General Overview
3.0 Data Collection
    3.1 Logs, Traces and Metrics
4.0 Multiple Modes of Data Collection and Analysis in a Microservices-Based Architecture
    4.1 Fast and Full-Fidelity Mode
        4.1.1 Full-Fidelity Service Graph
        4.1.2 Full-Fidelity Service Level Indicators
        4.1.3 Distributed Error Stacks
        4.1.4 Metrics Data Generation and Persistence
    4.2 Fast and Approximate Mode
        4.2.1 Data Generation and Persistence
        4.2.2 Features Supported by FAA Mode
    4.3 Slow and Full-Fidelity Mode
    4.4 Seamless Navigation Between Modes

1.0 Terms

The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one embodiment, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span-a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span.

Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant: gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g., tag "region" may take different values in two services: a span in Service A may be attributed to "region: east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

2.0 General Overview

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
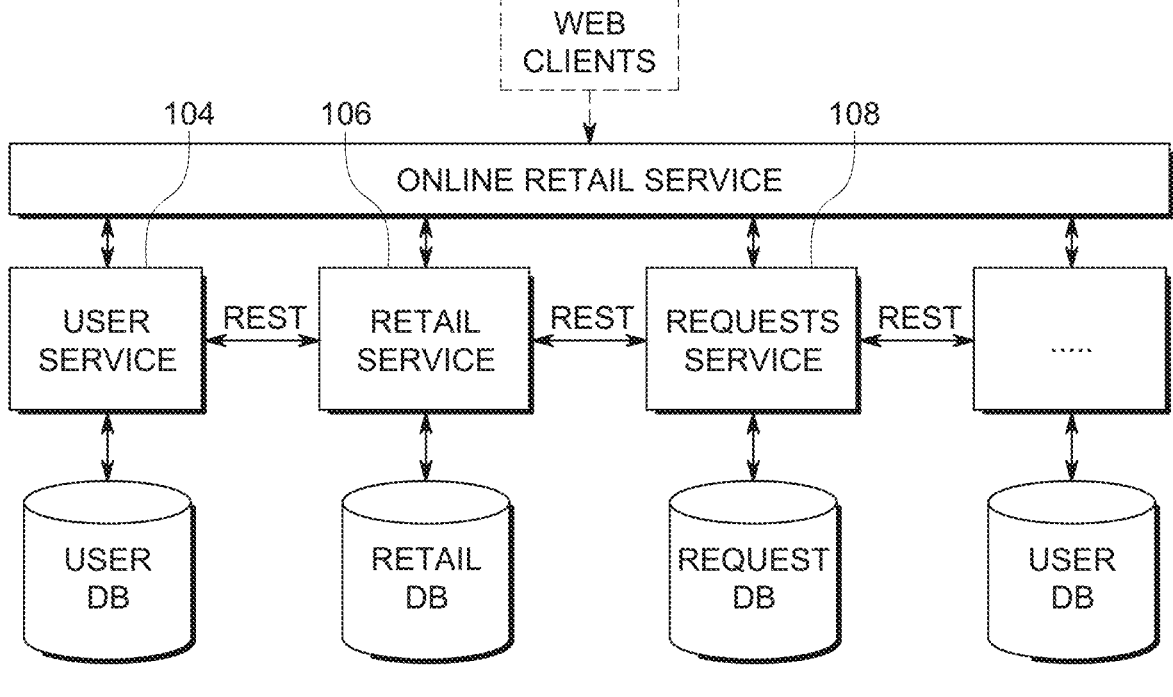
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors.

These challenges have led to the rise of observability, a new generation of monitoring, the foundation for which is built on distributed tracing. Distributed tracing, also called distributed request tracing, is a method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

Figure 2A:
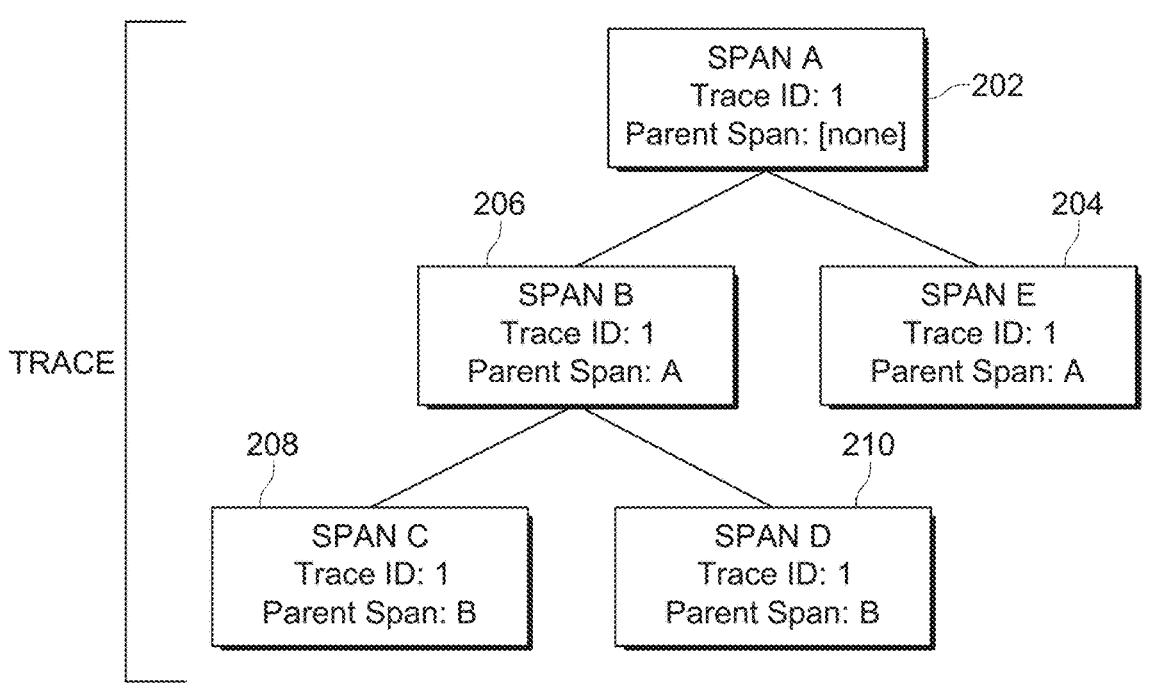
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
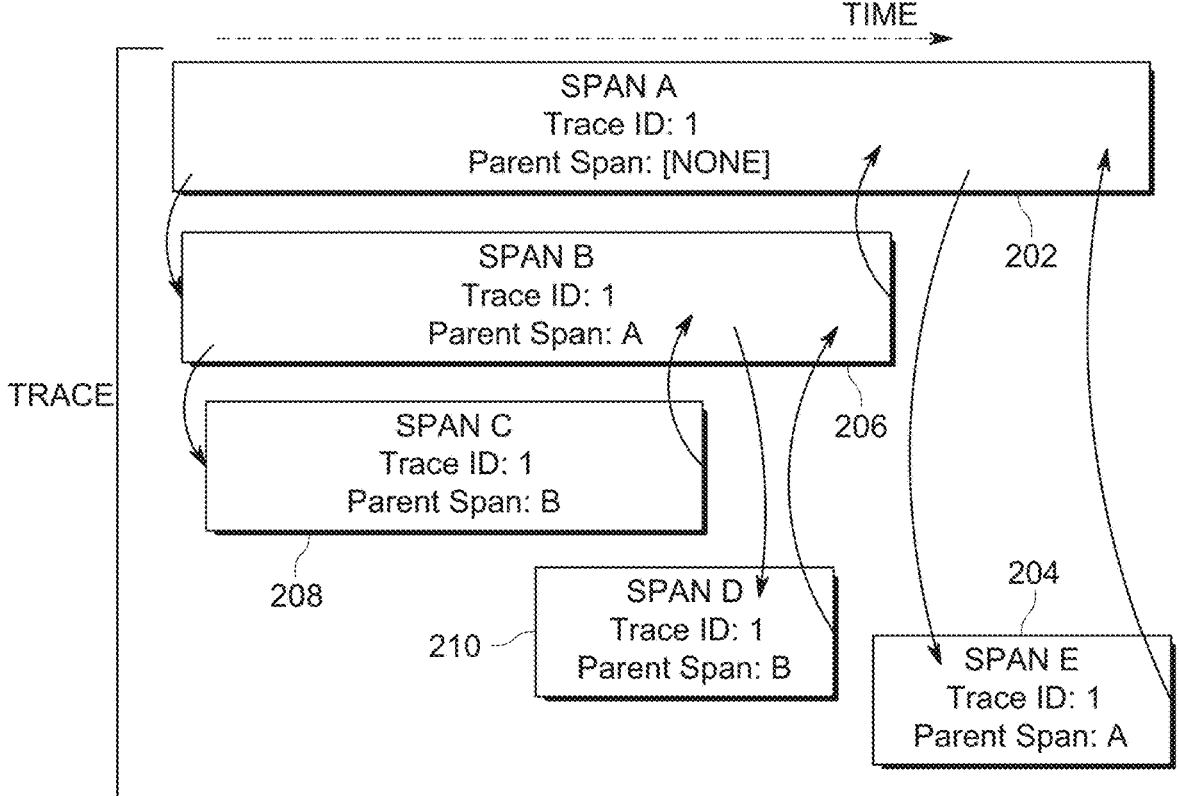
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

3.0 Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the user instrumenting the software, a document involved in the request, an infrastructure element used in servicing a request, etc.

The instrumentation handles the creating of unique trace and span IDs, tracking duration, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Figure 3:
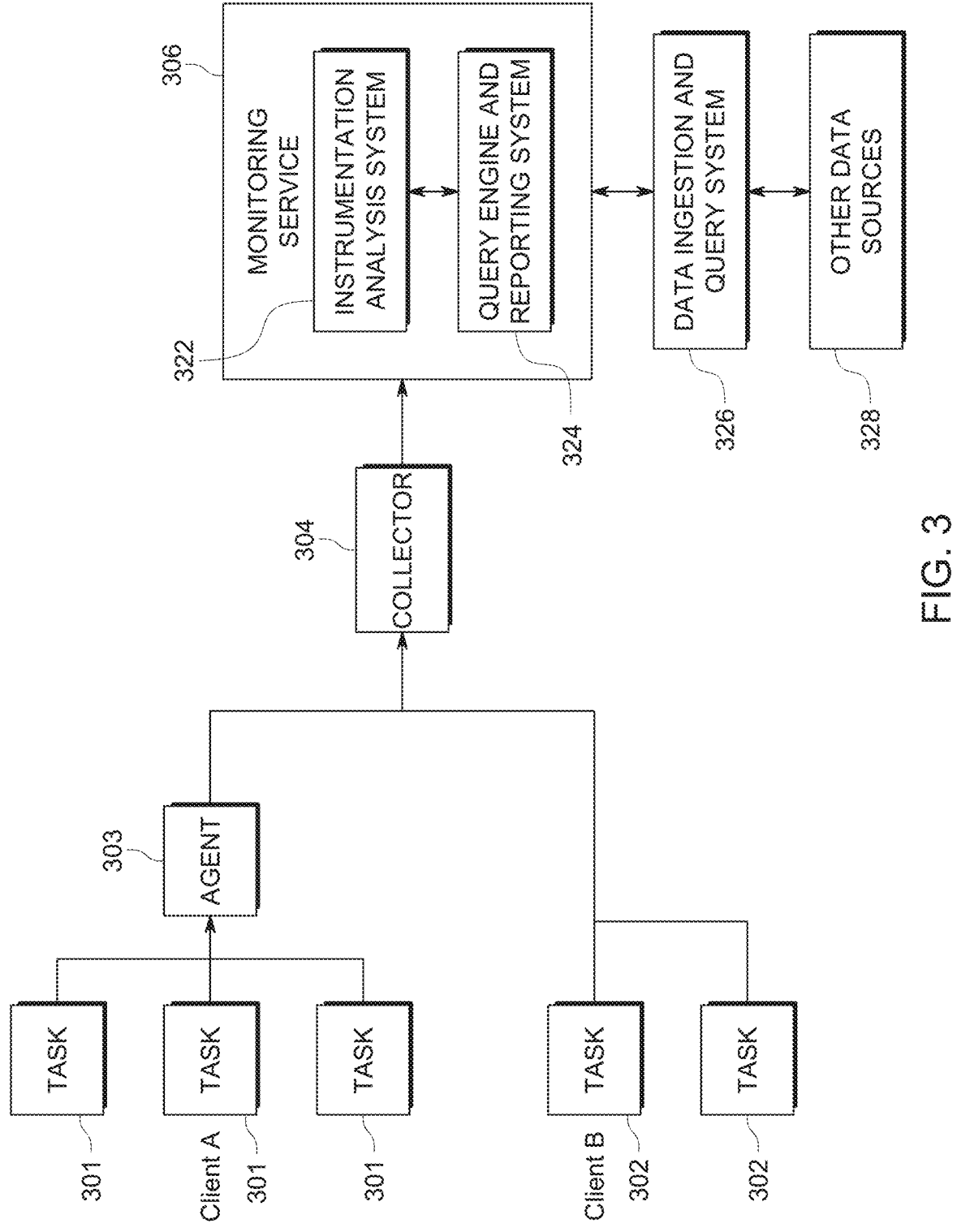
FIG. 3 is a flow diagram that illustrates the manner in which trace data may be collected and ingested for further analysis within a computer system, in accordance with embodiments of the present invention.

FIG. 3 is a flow diagram that illustrates the manner in which trace data may be collected and ingested for further analysis within a computer system, in accordance with an embodiment of the invention. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an embodiment, the collector 304 may consolidate data from several client devices and combine the data to send to the monitoring service 306. For example, the collector 304 may comprise a server that receives data streams internally from different client devices and, periodically, sends the combined data in batch form to the monitoring service 306. This allows efficiency of external communication from the enterprise.

In an embodiment, the monitoring service 306 receives and analyzes the span data for monitoring and troubleshooting purposes. It should be noted that, in addition to monitoring service 306, tracing data might also be simultaneously transmitted to other types of storage and monitoring backend services, e.g., a data ingestion and query system 326.

In one embodiment, the monitoring service 306 may be a Software as a Service (SaaS) based service offering or, alternatively, it may also be implemented as an on-prem application. The monitoring service 306 receives the observability data collected by the collector 304 and provides critical insights into the collected trace data to a client, who may be an application owner or developer. In an embodiment, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 and a query engine and reporting system 324. The instrumentation analysis system 322 receives data comprising, for example, trace information, span information and/or values of metrics sent by different clients. As noted previously, task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an embodiment, the tasks (e.g., tasks 301 and 302) and the collector 304 may send data to the monitoring service 306 by invoking an API supported by the monitoring service 306 and the instrumentation analysis system 322. In one embodiment, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one embodiment, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" herein) to represent information regarding the traces and spans received from a client. Alternatively, the query engine and reporting system 324 may be configured to respond to specific statistical queries submitted by a developer regarding one or more services within a client's application.

3.1 Logs, Traces and Metrics

As mentioned above, the shift from monolithic applications to microservices-based architectures has increased the usefulness of analyzing traces in a distributed system. In one or more embodiments, the tracing data may be coupled with log data and/or metrics data, in order to provide users with a more complete picture of the system. For example, the trace data may be coupled with log or other data from the data ingestion and query system 326. In one embodiment the data ingestion and query system 326 may be comprised within the monitoring service 306.

One example of a data ingestion and query system 326 is the event-based data intake and query SPLUNK® ENTER-PRISE system developed by Splunk Inc. of San Francisco, California. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one embodiment the other data sources 328 may be associated with the same clients (e.g., Client A and Client B) that generate the trace data received by the monitoring service 306.

The SPLUNK® ENTERPRISE system is particularly useful for analyzing data which is commonly found in system log files, network data and other data input sources. One example of the SPLUNK® ENTERPRISE system is described in more detail in U.S. patent application Ser. No. 15/011,651, entitled "TOKENIZED HTTP EVENT COL-LECTOR, filed on 31 Jan. 2016, and now issued as U.S. Pat. No. 10,169,434, and U.S. patent application Ser. No. 14/503, 335, entitled "GENERATING REPORTS FROM UNSTRUCTURED DATA", filed on 30 Sep. 2014, each of which is hereby incorporated by reference in their entirety. In another example, the data ingestion and query system 326 may be based on a distributed or cloud-based service, for example, as described in U.S. patent application Ser. No. 15/665,148, entitled "QUERY PROCESSING USING QUERY-RESOURCE USAGE AND NODE UTILIZA-TION DATA," filed on 31 Jul. 2017, which is hereby incorporated by reference in its entirety.

In one embodiment, the trace data may be ingested into the data ingestion and query system 326, or may be coupled with outputs from the data ingestion and query system 326 e.g., from searches that may be based on trace data and run on the data ingestion and query system 326. In some embodiments, the data ingestion and query system 326 described above may be integrated with or into the monitoring service 306 that analyzes trace data, e.g., the monitoring service 306. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data ingestion and query systems 326 described above. In some embodiments data ingestion and query system 326 may be configured to generate metrics data from the trace data received from the collector 304. Additionally, other embodiments may use a stream processor that may perform transformations and other operations on incoming data prior to, concurrently with, and/or as an alternative to, ingestion of the data. In some embodiments, the system may also be configured to ingest metrics data and may be optimized to ingest, query and generate insights from metrics data. One example of such a system is described in more detail in U.S. patent application Ser. No. 15/339,863, entitled "STORING AND QUERYING METRICS DATA," filed on 29 Mar. 2018, which is hereby incorporated by reference in its entirety.

In other embodiments, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to another source, where metrics may be aggregated, queried and alerted. Some examples of these systems are described in U.S. Pat. No. 9,846,632, titled, "REAL-TIME REPORTING BASED ON INSTRUMENTATION OF SOFTWARE," filed on Jul. 15, 2015, the entirety of which is herein incorporated by reference. As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

4.0 Multiple Modes of Data Collection and Analysis in a Microservices-Based Architecture Historically, there have been several challenges associated with implementing an analytics tool such as the monitoring service 306 within a heterogeneous distributed system. One of the challenges encountered in the development of monitoring tools for microservices architectures, for example, is efficiently ingesting and aggregating significant amounts of trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate statistics (e.g., requests, errors, latency, etc.) based on the sampled set of data and, accordingly, the calculations may be approximate at best and inaccurate at worst.

Advantageously, embodiments of the present invention allow clients of a monitoring platform the ability to ingest, process and store up to 100% of the spans received from the client in real time. Embodiments of the present invention comprise an ingestion streaming pipeline that is able to ingest and consolidate the incoming spans into traces in real time, and is further able to use advanced compression methods to store the traces. Additionally, because incoming trace and span information may be efficiently ingested and aggregated in real time, a monitoring platform configured, in accordance with embodiments of the present invention, is able to advantageously convey meaningful and accurate information regarding throughput, latency and error rate (without the need for sampling) for the services in the microservices-based application. Metrics pertaining to throughput, latency and error rate may be calculated with a high degree of accuracy because all incoming data is accounted for and there is no data loss as a result of sampling.

Embodiments of the present invention further allow a client to store and analyze the trace data using multiple modes of analysis. In one embodiment, for example, a first mode of analysis may comprise a "fast and full-fidelity" mode that supports a rapid and accurate analysis for a selected set of indexed tags, e.g., user-selected tags, global tags of the trace, etc. This mode is particularly useful for clients that need accurate SLI information for a limited set of high-value indexed tags. The fast and full-fidelity mode enables developers to aggregate metrics that have been pre-generated from the trace data to efficiently respond to queries submitted by a client. The aggregated metrics provide a user visibility into the performance of services within a microservices-based application.

In one or more embodiments, a second mode of analysis may comprise a "fast and approximate" mode that provides SLI information on any dimension or attribute of data by sampling traces and is particularly useful for clients who want to rapidly analyze problem areas in their application. In an embodiment, the fast and approximate mode may be characterized by a sampled data set and method of analysis. In an embodiment, the sampled data set may comprise exemplary traces. For example, the fast and approximate mode may allow users to track Trace IDs for exemplary traces associated with a pre-configured set of indexed tags. The tags may be pre-selected by the user or the monitoring platform. The Trace IDs may be used to retrieve the associated traces and analysis on the actual traces may be performed to generate more particularized information, e.g., span duration, span count, span workload percentage, etc. for each span in a given trace. Once the traces are retrieved, an analysis may be run on an arbitrary set of tags (in addition to the pre-configured indexed tags). Note that this analysis may de-prioritize accuracy to provide approximate results because the arbitrary set of tags are analyzed for an exemplary set of traces (instead of the entire set of ingested traces). In a different embodiment, instead of performing computations using exemplary traces, the fast and approximate mode may use other types of sampling, e.g., statistical sampling.

Additionally, in one or more embodiments, a third mode of analysis may comprise a "slow and full-fidelity" mode where a full-fidelity analysis may be conducted on any dimension or attribute of data to gauge the performance of services in the microservices-based application. The slow and full-fidelity mode allows clients to search most or all of the incoming trace data that was ingested by the monitoring platform without relying on sampling. The slow and full-fidelity mode may sacrifice speed for accuracy, and may be used by clients that need a more thorough analysis of the services across every dimension or attribute.

In an embodiment, the three modes may be supported by the monitoring platform simultaneously by storing ingested trace data using three different formats, wherein each format corresponds to one of the three available modes of analysis. When a user submits a query, the monitoring platform may determine which of the three data sets is most suitable for addressing the query. Thereafter, the monitoring platform executes the query against the selected data set to deliver results to the user. By comparison, conventional monitoring systems typically focus on a single mode and do not provide clients the ability to seamlessly navigate between different modes. Conventional monitoring systems also do not provide the ability to automatically select the most appropriate mode based on the content, structure, syntax or other specifics pertaining to an incoming query.

Figure 4:
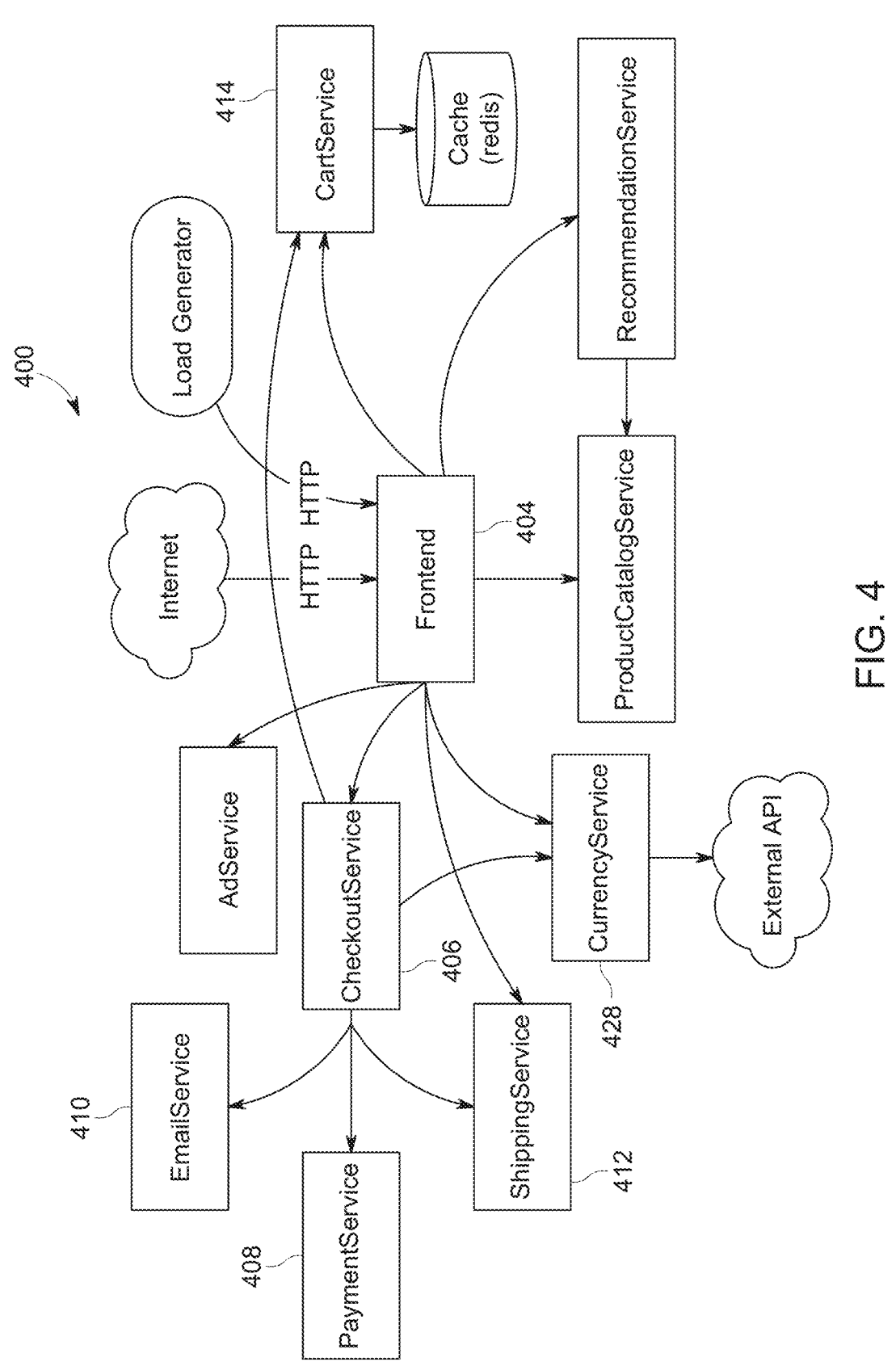
FIG. 4 illustrates components of an exemplary microservice application for an online retailer.

FIG. 4 illustrates components of an exemplary microservice application for an online retailer. A user needing to conduct a transaction may visit the website of the online retailer which would initiate a call to the retailer's Front-end service 404 on a server. The call to the the the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note, that a given request submitted by a user to the website would involve a subset of the services available and, typically, a single request would not result in a call to each of the services illustrated in FIG. 4.

As mentioned above, a request that the user initiates would generate an associated trace. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modes of storing and querying trace data with the flexibility of switching between the different modes depending on the level of detail required to respond to a user's query.

Referencing FIG. 4 again, an owner of the application 400 may, for example, need varying degrees of detail regarding the services in the application. For example, the application owner may query the number of requests made from the Frontend service 404 to the CheckoutService 406. Respond-ing to the query may require performing a numeric computation. Assuming there are errors generated by a call made from the Frontend service 404 to the CheckoutService 406, the owner may require further information regarding performance summaries for the spans associated with the call between the Frontend service 404 and the CheckoutService 406 or execute further queries against an exemplary trace associated with the call between the Frontend service 404 and the CheckoutService 406. The application owner may also need to access the full trace(s) associated with the request from the Frontend service 404 to the CheckoutService 406 to perform a more detailed analysis. Each of the requests requires a different degree of detail extracted from the trace information.

To generate the number of requests between the Frontend service 404 and the CheckoutService 406, for example, may require a numeric aggregation of metrics data computed from the tags associated with the spans generated by the call between the Frontend service 404 and the CheckoutService 406. The metrics aggregation may be a numeric summation, for example, and may be performed relatively quickly. To get more thorough insight into traces associated with Frontend service 404 and CheckoutService 406 may require the user to access the underlying trace data, which may be more time-consuming because trace data may be detailed and require significant storage space.

Embodiments of the present invention ingest and aggregate the span information from the online retailer's application. Further, embodiments of the present invention extract information from the incoming span data and store the information using multiple formats to support multiple modes of data analysis for a user. Each mode is configured to allow the users access to a different format in which incoming trace information may be represented and stored, where each format conveys a different degree of resolution regarding the ingested traces to a user and, accordingly, occupies a different amount of storage space.

For example, embodiments of the present invention provide a fast and full-fidelity mode, which generates and stores metrics data for selected indexed tags from the incoming trace data. The selected tags may be indexed when the spans are ingested. Metrics data may, for example, comprise number of requests (e.g., between two services), number of errors and latency. The metrics data may be rapidly aggregated (e.g., at sub-second rates) to respond to queries from a user. In the example related to FIG. 4, if the application owners queries the number of requests made from the Frontend service 404 to the CheckoutService 406, a query engine (e.g., the query engine and reporting system 324 of FIG. 3) would automatically access the set of metrics data associated with the fast and full-fidelity mode and perform fast aggregations to determine the number of requests made between the services 404 and 406 at sub-second speeds.

The fast and approximate mode, in accordance with embodiments of the present invention, associates the selected tags indexed from the incoming span data (e.g., the same indexed tags used for performing metrics extraction in the fast and full-fidelity mode) with Trace IDs for exemplary traces. The Trace IDs may be used to retrieve the exemplary traces associated with indexed tags. Thereafter, the monitoring platform may analyze the exemplary traces to generate more particularized information, e.g., span duration, span count, span workload percentage, etc. for each span in a given trace. Because exemplary traces are analyzed instead of all the incoming traces, this mode may generate approximate results. For the example above, if the user requires a performance summary for the spans generated by the call made from the Frontend service 404 to the CheckoutService 406, the associated query submitted by the user may access the data set associated with the fast and approximate mode. Using the Trace IDs corresponding to the indexed tags, the fast and approximate mode may then perform the computations necessary on the corresponding exemplary traces to provide the user further information regarding the span performances. Alternatively, in the fast and approximate mode, a user may also be able to run a query against an arbitrary set of tags, which were not previously indexed, for an exemplary trace. This feature may not be supported by the fast and full-fidelity mode, which typically focuses on computations associated with the indexed tags. Note that the fast and approximate mode may be configured to perform computations on exemplary traces across both indexed and unindexed tags—this mode is not limited to a particular type of tag.

If the user wants to search all the incoming trace data associated with the call between Frontend service 404 to the CheckoutService 406, embodiments of the present invention provide a third mode of analysis. In the slow and full-fidelity mode, a full-fidelity analysis may be conducted on any dimension or attribute of the trace data. For example, the user may be able to search previously indexed or unindexed tags across each of the traces associated with the call the between the Frontend service 404 and the CheckoutService 406. Unlike the fast and approximate that samples a limited set of exemplary traces, the slow and full-fidelity mode allows an analysis to be performed across any relevant trace. Conventional tracing systems are unable to provide that level of flexibility and detail for developers or application owners needing to investigate performance issues with their applications.

Figure 5A:
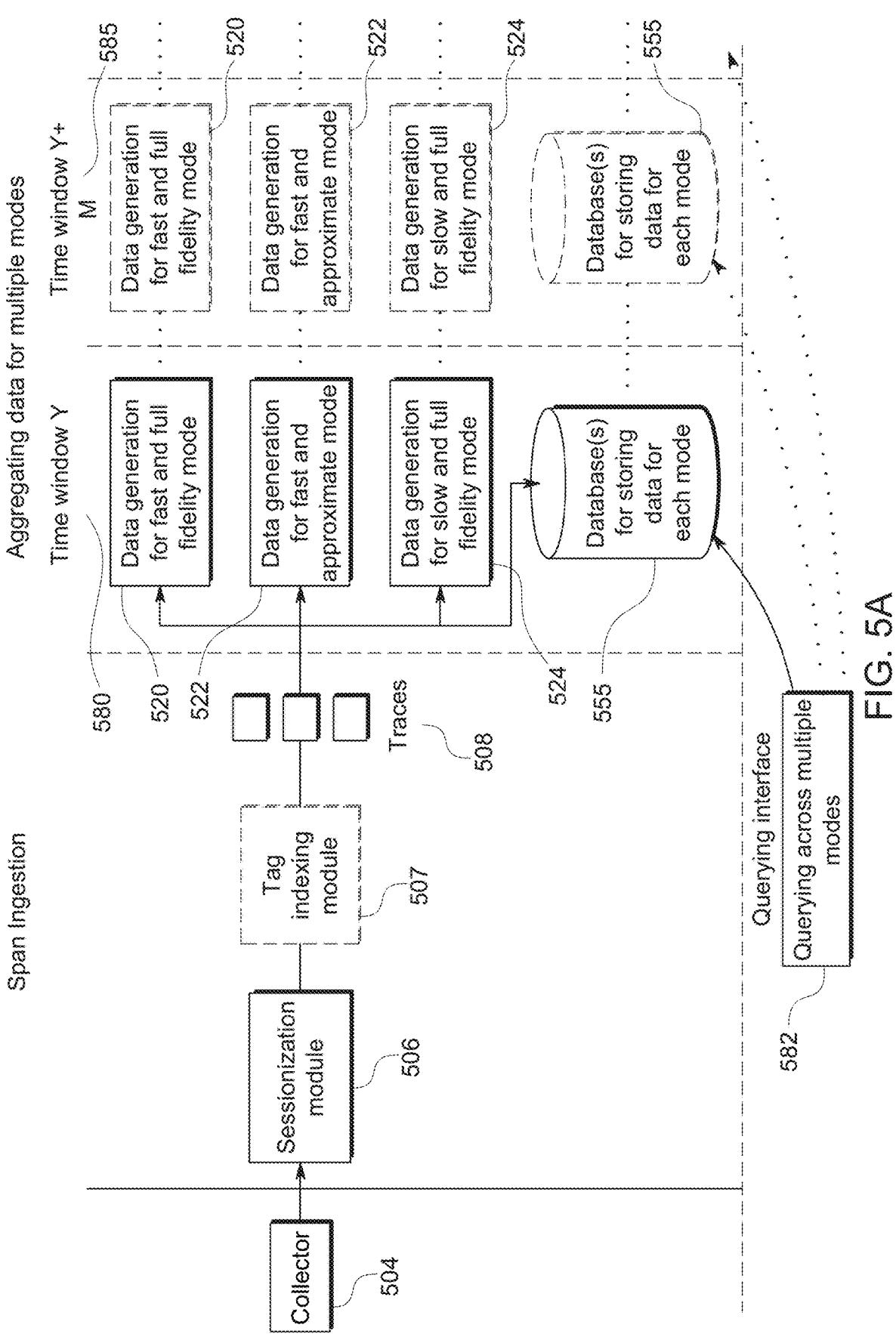
FIG. 5A is a flow diagram that illustrates an exemplary method for ingesting and aggregating trace information to support multiple modes of analysis, in accordance with embodiments of the present invention.

FIG. 5A is a flow diagram that illustrates an exemplary method for ingesting and aggregating trace information to support multiple modes of analysis, in accordance with embodiments of the present invention. As mentioned in connection with FIG. 3, span information is received at the monitoring service 306 from the collector (e.g., the collector 504 in FIG. 5A). The span information is then combined into traces in real time in a process called sessionization. The sessionization module 506 is responsible for stitching together or combining the traces 508 using, among other things, the Trace IDs associated with each user-request (and typically also the Parent Span IDs of each span).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first 15-minute window (associated with time window Y 580) before transmitting the traces to the three data generation modules 520, 522, or 524. Thereafter, the sessionization process may consolidate traces within the subsequent 15 minutes (associated with time window "Y+M" 585) before transmitting those traces to the data generation modules.

In some embodiments of the present invention, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate all the incoming spans into traces in real time, and is further able to use advanced compression methods to store the traces.

As noted above, the sessionization module 506 has the ability to collect all the traces within a first time window Y 580 (e.g., a duration of M minutes) using the time-stamps for the traces. Subsequently, the sessionized traces are fed to the data generation modules 520, 522 and 524, for the three respective modes (fast and full-fidelity, fast and approximate and slow and full-fidelity) for extraction and persistence.

In one embodiment, subsequent to consolidation, the trace data is indexed by an optional tag indexing module 507, which indexes one or more tags in the trace data. The tags may be user-selected tags or tags that the monitoring platform is configured to index by default. In a different embodiment, tag indexing may be performed as part of each of the data generation modules 520, 522 or 524.

In an embodiment, metrics data is extracted from the traces using the data generation module 520 for the fast and full fidelity mode (hereinafter, interchangeably, referred to as "the FFF module 520") and the extracted data is stored in in one or more databases 555. In one embodiment, data is extracted from the traces using the data generation module 522 for the fast and approximate mode (hereinafter, interchangeably, referred to as the "FAA module 522") and the extracted data is persisted in one or more databases 555. In yet another embodiment, batches of entire trace data are formatted by the data generation module 524 for the slow and full-fidelity mode (hereinafter, interchangeably, referred to as "the SFF module 524") and stored in one or more databases 555.

Note that the databases 555 may be a single database that stores data sets corresponding to all three modes. Alternatively, the databases 555 may represent different respective databases for each of the three modes. Furthermore, the databases 555 may also represent distributed databases across which relevant information for each of the three modes is stored.

In one embodiment, data associated with each of the three modes is generated at the time of ingestion and stored separately from each other. The structure, content, type or syntax of query submitted by a user will typically dictate which of the three modes and corresponding data set will be selected. In one embodiment, an interface through which the query is submitted may also determine which of the three modes and corresponding data set is selected. In an embodiment, there may be some commonality in the data for the three modes in which case the storage for the data may overlap. An alternative embodiment may comprise two of the three modes described above, where data associated with each mode is extracted during sessionization and stored using a respective format and storage space.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modes and respective data set to access to service the query. In an embodiment, the three data sets corresponding to the three modes are structured in a way that allows the querying engine to navigate between them fluidly. For example, a client may submit a query through the query interface 582, which may potentially result in the query engine accessing and returning data associated with the fast and full-fidelity mode. Thereafter, if the client requires more in-depth information, the querying engine may seamlessly navigate to data associated with a different mode (e.g., fast and approximate or slow and full-fidelity) to provide the user with further details. Conventional monitoring systems, by comparison, do not provide more than a single mode or the ability to navigate between multiple modes of data analysis.

FIG. 5B is a table that compares the multiple modes of analysis discussed in FIG. 5A, in accordance with embodiments of the present invention. As shown in row 590 of table 588, in one or more embodiments, a first mode of analysis may comprise a fast and full-fidelity mode that supports a rapid and accurate analysis for selected dimensions, e.g., a selected set of indexed tags. In the fast and full-fidelity mode metrics are pre-computed for some selected dimensions (e.g., indexed tags) to facilitate speed of aggregating metrics to respond to user queries. In an embodiment, the full-fidelity accuracy of the metrics computations across the selected dimensions is prioritized over full-fidelity accuracy across any possible dimension (e.g., across non-indexed tags). In an embodiment, the fast and full-fidelity mode is able to provide sub-second response rates.

As shown in row 592 of table 588, in one or more embodiments, a second mode of analysis may comprise a fast and approximate mode that samples trace data and provides approximate SLI information on any dimension or attribute of data for clients that want to rapidly analyze problem areas in their application. In an embodiment, the fast and approximate mode may be characterized by a sampled data collection and method of analysis. In the fast and approximate mode, performing computations at a fast speed using sampled data across each possible dimension (e.g., indexed and unindexed tags) is prioritized over the full-fidelity accuracy of the computations. As noted above, different types of sampling may be used for the fast and approximate mode, e.g., analyzing exemplary traces, statistical sampling, etc. In an embodiment, the fast and approximate mode is able to provide response rates on the order of seconds.

Additionally, as shown in row 594 of table 588, in one or more embodiments, a third mode of analysis may comprise a slow and full-fidelity mode where a full-fidelity analysis may be conducted on any dimension or attribute of data. The slow and full-fidelity mode allows clients to search up to 100% of the incoming trace data that was ingested by the monitoring platform. All the raw data is processed in this mode, and full-fidelity accuracy of performing calculations across each possible dimension is prioritized over the speed of performing the computations. Response rates for the slow and full-fidelity mode may, in certain embodiments, be on the order of a minute or more.

4.1 Fast and Full-Fidelity Mode (Referred to Hereinafter as "FFF" Mode)

The FFF mode generates and stores aggregated rows of metrics values for selected indexed tags from the incoming trace data. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metrics data may be rapidly vectorized and aggregated (e.g., at sub-second rates) in response to queries from a user.

4.1.1 Full-Fidelity Service Graph

Embodiments of the present invention use the aggregated rows of metrics data created for the FFF mode to generate a full-context application topology graph using data generated for the FFF mode (e.g., by the FFF module 520 in FIG.

Figure 6:
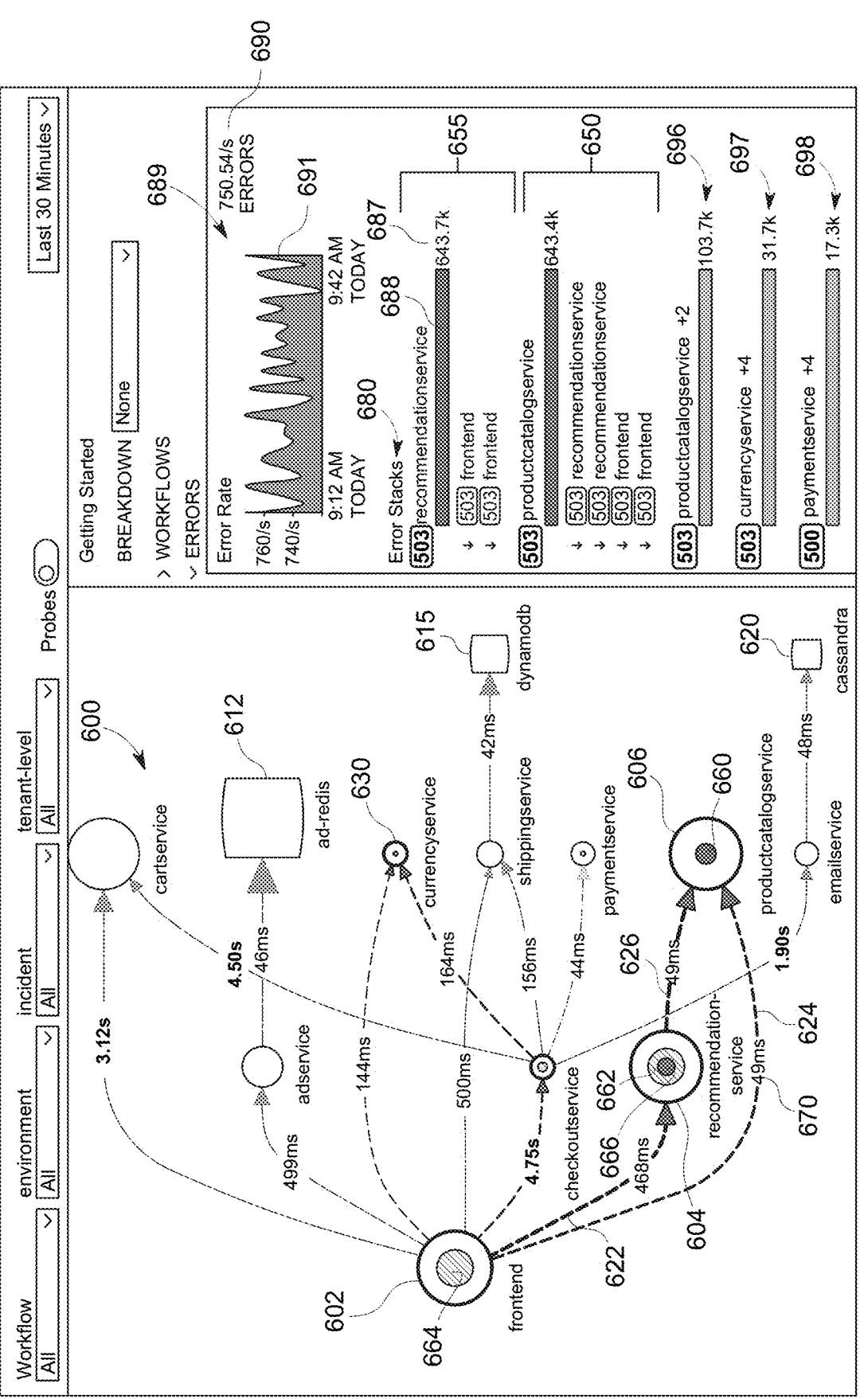
FIG. 6 illustrates an exemplary on-screen graphical user interface (GUI) comprising an interactive topology graph for an application created from the metrics data aggregated for the fast and full-fidelity mode, in accordance with embodiments of the present invention.

5A). FIG. 6 illustrates an exemplary on-screen GUI comprising an interactive topology graph for an application created from the metrics data aggregated for the FFF mode, in accordance with embodiments of the present invention. The service graph facilitates visualizing cross-service relationships between services comprised within the application and external to the application. The exemplary GUI of FIG. 6 also enables customers to track the causal chain of operations resulting in an error.

FIG. 6 illustrates a GUI comprising an interactive full-context service graph 600, which is constructed for an exemplary microservices-based application using the metrics data generated for the FFF mode (e.g., by the FFF module 520 of FIG. 5A). Each circular node (e.g., nodes associated with services 602, 604 and 606 of FIG. 6) represents a single microservice. Alternatively, in an embodiment, a circular node may also represent a group of multiple microservices, where the GUI for the monitoring platform (associated with, for example, the monitoring service 306) would provide a client the ability to expand the node into its sub-components.

In an embodiment, services that are part of the client's application may be represented differently from services that are external to the client's application. For example, circular nodes (e.g., nodes associated with services 602, 604 and 606) of the exemplary application represented by service graph 600 are associated with services comprised within the client's application. By contrast, squarish nodes (e.g., nodes associated with databases dynamodb 615, Cassandra 620, ad-redis 612) are associated with services or databases that are external to the client's application.

A user may submit a request at the front-end service 602; the user's request at the front-end service 602 may set off a chain of subsequent calls. For example, a request entered by the user at the front end of the platform may generate a call from the front-end service 602 to the recommendation service 604, which in turn may generate a further call to the product catalog service 606. As noted previously, a chain of calls to service a request may also comprise calls that a service makes to internal sub-functions or operations within the same service.

Each edge in the service graph 600 (e.g., the edges 622, 624 and 626) represents a cross-service dependency (or a cross-service call). The front-end service 602 depends on the recommendation service 604 because it calls the recommendation service 604. Similarly, the recommendation service 604 depends on the product catalog service 606 because it makes a call to the product catalog service 606. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising service graph 600 may be configured so that the nodes themselves provide a visual indication regarding the number of errors that originated at a particular node versus errors that propagated through the particular node but originated elsewhere. In an embodiment, the metrics data aggregated for the FFF mode may be used to compute number of errors for rendering the nodes of the service graph.

For example, as shown in the service graph of FIG. 6, the front-end service 602 makes calls to the recommendation service 604. Errors may be generated at the recommendation service 604 not only in response to calls from the front-end service 602, but also in response to calls that the recommendation service 604 makes to itself (e.g., in response to sub-functions or operations that are part of recommendation service). For such errors, the recommendation service 604 would be considered the "originator" for the error. The recommendation service 604 also makes calls to the product catalog service 606 and these calls may result in their own set of errors for which the product catalog service 606 would be considered the error originator. The errors originating at the product catalog service 606 may propagate upstream to the front-end service 602 through the recommendation service 604; these errors would be observed at the recommendation service 604 even though the recommendation service 604 is not the originator of those errors.

It is appreciated that conventional monitoring technologies would not provide adequate means for a client to distinguish between errors that originated at the recommendation service 604 versus errors that propagated through the recommendation service 604 but originated elsewhere. By performing computations using the metrics data associated with the FFF mode, embodiments of the present invention are able to render a service graph that visually indicates critical information regarding the services in an architecture, e.g., number of requests between services, the number of errors generated by a service, number of errors for which the service was the root cause, etc.

The service graph 600 allows clients the ability to visually distinguish between errors that originated at the recommendation service 604 as compared with errors that simply propagated through the recommendation service 604. As shown in FIG. 6, the node associated the recommendation service 604 comprises a solid-filled circular region 666 and a partially-filled region 662, where the region 666 represents errors that originated at the recommendation service 604 while the region 662 represents errors that propagated through the recommendation service 604 but originated elsewhere (e.g., at the product catalog service 606).

Similarly, solid-filled region 660 within the node associated with the product catalog service 606 represents the errors that originated at product catalog service. Note that the errors returned by the product catalog service 606 originated at product catalog service. In other words, the product catalog service 606 does not have errors from another downstream service propagating through it because it does not make calls to another service that is further downstream in the execution pipeline. Conversely, the front-end service 602 comprises a partially-filled region 664 because the errors observed at the front-end service 602 propagated to it from other downstream services (e.g., the recommendation service 604, the currency service 630, the product catalog service 606, etc.) The front-end service 602 was not the originator of errors in the example shown in FIG. 6. Note that in other embodiments solid-filled regions (e.g., region 666) and partially-filled regions (e.g., region 664) may be represented differently. For example, different shades, patterns, or colors may be used to distinguish these regions from each other.

In an embodiment, more detailed information pertaining to the errors including distributed error stacks associated with the application topology graph 600 may be displayed in an on-screen error panel 689, which will be discussed in detail below. In an embodiment, the underlying information used to create the distributed error stacks shown in the on-screen error panel 689 is also computed and aggregated from the metrics data associated with the FFF mode.

4.1.2 Full-Fidelity Service Level Indicators

Embodiments of the present invention use the aggregated rows of metrics data created for the FFF mode to determine full-fidelity SLIs associated with the services in an application using data generated for the FFF mode (e.g., by the FFF module 520 in FIG. 5A). An SLI is a service level indicator—a defined quantitative measure of some aspect of the level of service that is provided. SLIs may be the same as the metrics data aggregated into rows for the FFF mode or may be computed from the metrics data gathered for the FFF mode.

The SLIs are aggregated and extracted for the various services in a microservices architecture so that the behavior of applications may be understood. Most clients consider request latency—how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the FFF mode and then turned into a rate, average, or percentile.

In one embodiment, the GUI comprising service graph 600 is interactive, thereby, allowing a developer to access the SLIs associated with the various nodes and edges within the application by interacting with respective portions of the service graph. Referring to FIG. 6, in an embodiment, a client may be able to hover their cursor over various regions of the on-screen displayed service graph 600, including but not limited to the nodes (e.g., the nodes associated with services 604, 606 etc.) and edges (e.g., the edges 622, 626, etc.), to receive SLI-related information for the associated microservices through a pop-up window or other interface.

Figure 7:
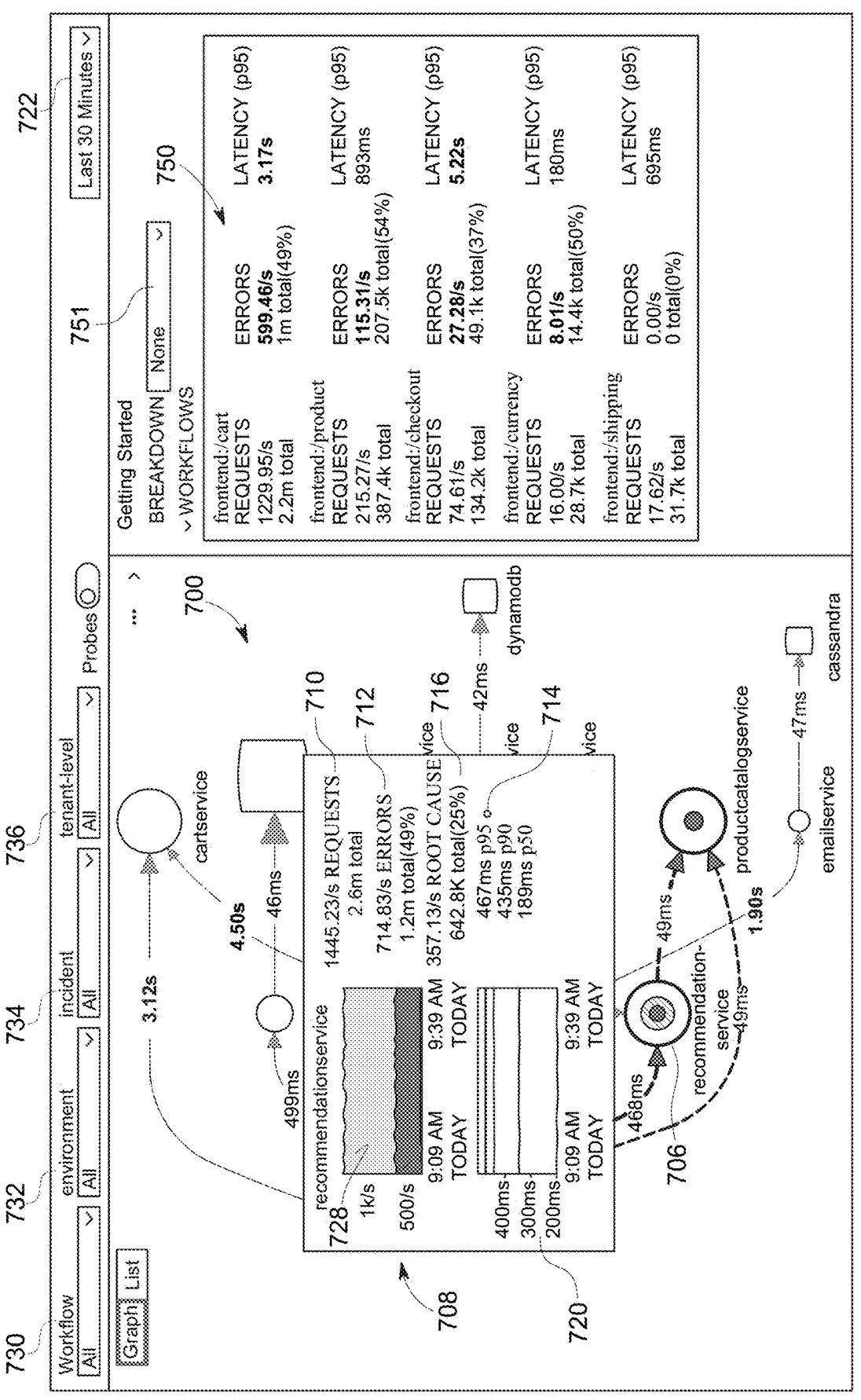
FIG. 7 illustrates an exemplary on-screen displayed GUI showing the manner in which a client may access SLIs pertaining to a service within an interactive topology graph, in accordance with embodiments of the present invention.

FIG. 7 illustrates an exemplary on-screen displayed GUI showing the manner in which a client may access SLIs pertaining to a service within an interactive topology graph, in accordance with embodiments of the present invention. Note that in one embodiment the SLIs may be computed using metrics data generated for the FFF mode. As shown in FIG. 7, when a client hovers the cursor over the node associated with, for example, the recommendation service 706, a pop-up window 708 is overlaid on the service graph 700 comprising SLIs pertaining to the recommendation service 706. Specifically, SLIs pertaining to Requests 710, Errors 712 and Latency percentiles 714 are provided. Furthermore, in an embodiment, information pertaining to Root Cause 716 is also provided to the client.

For example, the SLIs related to Requests 710 comprise information regarding the rate of requests and number of requests serviced by the recommendation service 706 during a specific time duration. The time duration over which the SLIs are calculated may be adjusted using drop-down menu 722. The time duration over which SLIs are calculated may vary, for example, from 5 minute to 3 days. As indicated by the time axis on hover chart 728, for this example, a time window of 30 minutes (from 9:09 to 9:39 a.m.) is selected.

In an embodiment, the pop-up window 708 also provides the client information pertaining to SLIs related to Errors 712. In the example of FIG. 7, the pop-up window 708 provides information regarding the error rate and the total number of errors that occurred during the specified time duration. The client is also provided information regarding what percentage of the total number of requests resulted in errors.

In an embodiment, the pop-up window 708 also provides the client information pertaining to Latency Percentiles 714 and a graphical representation 720 of the same. For example, SLI p95 indicates that for 95% of the users, the latency for servicing the requests was less than 467 ms. Latency-related SLIs also include information regarding p90 and p50 percentiles. The graphical representation 720, in the example of FIG. 7, shows the latency information regarding the p95 percentile graphically.

In one embodiment of the present invention, the pop-up window 708 also displays information pertaining to errors for which the selected service was the root-cause. The Root Cause information 716 includes the number of errors for which the selected service (e.g., the recommendation service 706 in the example of FIG. 7) was the originator, the associated error rate and the percentage of the total number of requests that represents. In this way, embodiments of the present invention, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 708 are computed accurately using the metrics data gathered for the FFF mode. Because embodiments of the present invention are able to ingest up to 100% the incoming span data (without sampling), the SLIs are computed factoring in all the incoming data, which results in accurate measurements. For the example of FIG. 7, there were a total of 2.6 million requests served by the recommendation service 706 at a rate of 1445.23 requests/second ("sec"). Of these, 1.2 million of the requests resulted in errors at a rate of 714.83/sec, which represents approximately 49% of the total number of requests. From those 1.2 million errors, the recommendation service 706 was the root cause of 642.8 k errors, which occurred at a rate of 357.13/sec and represented about 25% of the total number of requests. In this way, embodiments of the present invention provide a mode of analysis that enables a client to gather critical SLIs pertaining to the recommendation service 706 including an indication of how many of the errors originated at the recommendation service 706.

Figure 8:
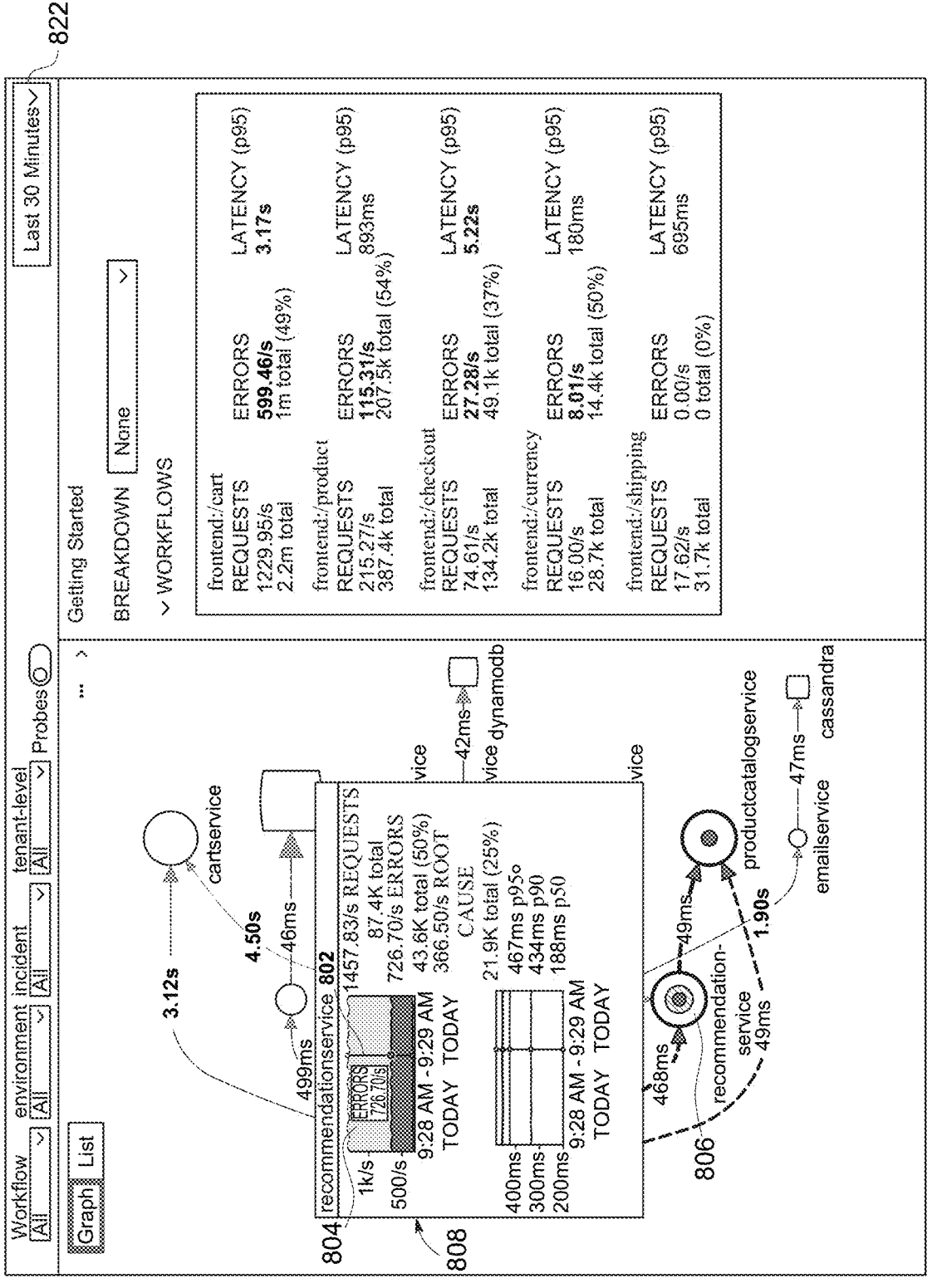
FIG. 8 illustrates an exemplary on-screen GUI showing the manner in which a client may interact with an interactive graphical representation of the SLIs to access further information, in accordance with embodiments of the present invention.

FIG. 8 illustrates an exemplary on-screen GUI showing the manner in which a client may interact with an interactive graphical representation of the SLIs to access further information, in accordance with embodiments of the present invention. It is appreciated that in one embodiment the SLIs may be computed using data generated for the FFF mode.

As mentioned previously, a dialog box 808 may open on-screen when a client hovers their cursor over a node, e.g., the recommendation service 806. In one embodiment, a client may access SLIs for more granular time windows by clicking within hover graph 804. As shown in FIG. 8, by clicking within the on-screen hover graph 804, a user is able to obtain SLIs for a 1-minute duration (9:28 a.m.-9:29 a.m.) even though the time duration selected in drop-down box 822 is 30 minutes. In an embodiment, the dialog box 808 may comprise a mouse-over effect (or hover effect) for the hover graph 804, thereby, allowing the client to move the bar 802 to various positions on the graph and get information regarding error rate for various points in time. As shown in FIG. 8, the total number of requests and errors (87.4 k and 43.6 k) during the 1-minute duration is much smaller compared to the corresponding request and error counts shown in the pop-up window 708 in FIG. 7.

In one embodiment, a client may also be able to double-click within the time-range shown in the hover graph 804 to load an exemplary trace (e.g., a trace associated with the type of error that occurred) for the particular time-period selected. Loading exemplary traces associated with the error activity allows users to determine the type of problem that is prevalent in the environment. As will be discussed further below, loading an exemplary trace opens up a GUI window with a visual representation of the trace allowing a user to get information pertaining to the spans comprising the trace. In an embodiment, the loading of the exemplary trace is associated with the fast and approximate or the slow and full-fidelity mode because the FFF mode does not store information at the trace level. Typically, the data sets for the fast and approximate and the slow and full-fidelity modes are configured to store information at the trace level. In loading the exemplary trace, however, the monitoring platform is able to seamlessly navigate from the FFF mode to one of the other two modes to provide access to the exemplary trace.

Figure 9:
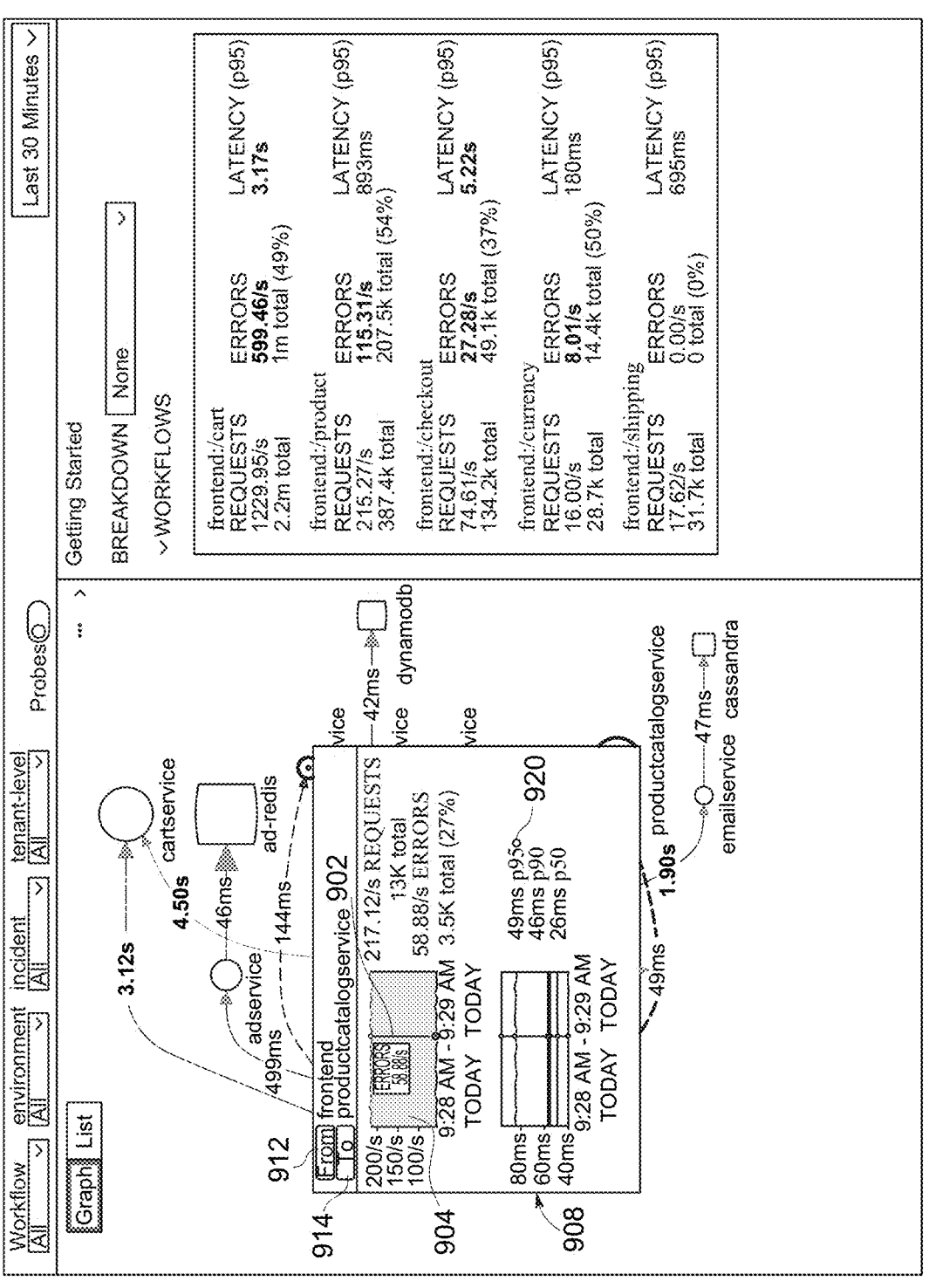
FIG. 9 illustrates an exemplary on-screen GUI showing the manner in which a client may access SLIs pertaining to an edge within an interactive topology graph, in accordance with embodiments of the present invention.

FIG. 9 illustrates an exemplary on-screen GUI showing the manner in which a client may access SLIs pertaining to an edge within an interactive topology graph, in accordance with embodiments of the present invention. The SLIs pertaining to edges are also computed using the metrics data associated with the FFF mode. As shown in FIG. 9, if a user hovers over or selects a particular edge, e.g., the edge 624 (as shown in FIG. 6) (which represents the cross-service dependency of the front-end service 602 on the product catalog service 606) a pop-up dialog box 908 opens up on-screen that reports SLIs specific to the dependency. The "From" field 912 represents the service that executes the call and the "To" field 914 represents the service that is called (the service that the calling service depends on).

As shown in the dialog box 908, SLIs pertaining to number of requests (or calls) that were made, the number of those that returned in errors, and the latency associated with servicing the requests are provided. Further, similar to the feature discussed in connection with FIG. 8, the user has the ability to click at a point within the graph 904, which visually represents the SLIs, to obtain performance details for more granular windows of time and to access exemplary traces associated with the dependency. In an embodiment, the dialog box 908 may comprise a mouse-over effect for the graph 904, thereby, allowing the client to move a bar 902 to various positions on the graph and get information regarding error rate for more granular windows of time.

It should be noted that a latency value 920 of 49 ms shown in FIG. 9 for this particular dependency may be annotated directly on the edge of the service graph. For example, as shown in service graph 600 of FIG. 6, edge 624 of the service graph 600 in FIG. 6 indicates the latency value 670 (e.g., 49 ms) directly on the edge in the service graph allowing a client to efficiently gather information regarding latency associated with the dependency. In an embodiment, as shown in FIG. 6, the edges within the application topology graph are annotated with their corresponding latency values. In this way, embodiments of the present invention efficiently compute SLI data from the metrics information aggregated for the FFF mode and advantageously enable developers to gather meaningful and accurate information regarding cross-service dependencies directly from the service graph 600.

It should be noted that while the terms "mouse-over effect," "hovering the cursor over," "clicking" and "double-clicking" have been used herein to represent well-known GUI interactions and exemplary actions that a user may take to access the various features, embodiments of the present invention are not so limited to the user interactions—the features of the disclosed embodiments may be accessed in several different ways, including, but not limited to, keyboard shortcuts, right-clicking and selecting an option from a drop-down menu, selecting objects via touch-screen capability, iris tracking, voice commands, anatomical tracking in virtual and/or augmented reality applications, etc.

In some embodiments, information gleaned from the computed SLIs in the FFF mode may be used to visually represent nodes and edges within a service graph in a way that allows clients to visually intuit the health of the services and the flow of traffic between services. For example, the service graph 600 of the GUI may be configured to indicate the diminishing health status of a particular node or a particular edge by changing the pattern, shade, and/or color of a respective node or edge. A health of a node may be inferred on the basis of how many calls made to a node resulted in an error. Similarly, a health of a dependency (or edge) may be inferred on the basis of how many calls represented by the edge resulted in an error. Unhealthy nodes (e.g., nodes that fail to meet their Service Level Objectives because they return a high percentage of errors when called) may be represented using a darker shade (or an appropriate color, e.g., red). Further, by way of example, if a particular call to a service results in a high number of errors, the edge associated with the call will also be changed to the darker shade (or appropriate color, e.g., red) or a different visual attribute may be used.

Referencing FIG. 7, the node associated with the recommendation service 706 is represented in darker shades (or colors) to indicate that this node was failing to meet its Service Level Objectives (SLOs) (where SLOs comprise a target value or range of values for a service level that is measured by an SLI). This is corroborated by the information in the pop-up window 708 (in FIG. 7), for example, where a client may see that of the requests served by the recommendation service, at least 50% results in errors, and where recommendation service was the root cause error originator for at least 25% of the requests.

Similarly, referencing FIG. 6, the edge 624 may also be represented using a darker shade (or a different visual attribute) also indicating that the associated dependency represented by that edge is also failing to meet its SLOs. This is corroborated by hovering over the edge and viewing the pop-up dialog box 908 (as shown in FIG. 9), which reports that at least 27% of requests were returning errors. As indicated above, the latency value 670 of 49 ms experienced by requests serviced by the product catalog service 606 may also be annotated on the edge 624 in FIG. 6 (wherein the edge represents the dependency of the front-end service 602 on the product catalog service 606).

In one embodiment, the GUI for the service graph may be configured so that the thickness of an edge may be dynamic and represent the number of requests flowing between services. Similarly, in one embodiment of the present invention, the size of the node may be dynamic and represent the amount of traffic the node is receiving. For example, as indicated by the size of the respective nodes, the front-end service 602, the recommendation service 604 and the product catalog service 606 receive more traffic than the currency service 630. Similarly, the dependency or edge 622 in FIG. 6 is thicker compared to the edge 624 because the front-end service 602 makes significantly more requests to the recommendation service 604 than it does to the product catalog service 606.

In one embodiment, the metrics data associated with the FFF mode is used to compute full-fidelity SLIs across multiple dimensions in real time. Further, embodiments of the present invention support high dimensionality and high cardinality tags. In one embodiment, the GUI of FIG. 7 may display one or more attribute (or tag) categories that comprise dimensions that may be varied across the service graph 700. For example, attribute categories (e.g., Workflow 730, environment 732, incident 734 and tenant-level 736) may be depicted within the GUI, each of which may correspond to attributes that may be varied to compute SLIs and error-related information for different combinations of the attributes. The categories of dimensions across which the SLIs may be computed, include, but are not limited to, workflow 730, environment 732, incident 734 and tenant-level 736. Each of the categories comprises a drop-down menu with options for the different dimensions (as will be discussed in connection with FIG. 10A).

In an embodiment, the GUI may include a panel 750 that may display SLIs across the various workflows. Further, the GUI allows users the ability to break down the workflows across multiple different attributes using drop down menu 751. The computations for each of the break-downs may be efficiently determined using the metrics data aggregated for the FFF mode.

Further, in one or more embodiments, the user may be able to click on a point within the interactive graphical representations of the SLIs (e.g., the hover chart 728 in FIG. 7) and load exemplary traces associated with the particular combination of dimensions or attributes selected. As noted previously, the loading of an exemplary trace is a feature that is supported as a result of the fast and approximate mode or the slow and full-fidelity mode as mentioned previously. The FFF data does not store full trace information. Nevertheless, a user is able to seamlessly transition between the various modes depending on the query.

The monitoring platform supports a seamless transition between the three types of data (associated with the data generation modules 520, 522 and 524 in FIG. 5A) so that the users may drill further down into a query result to get further resolution. Accordingly, a user is able to click on the hover chart 728 in FIG. 7, which is created using data from the FFF mode, and access an exemplary trace, in accordance with one of the other two modes.

Figure 10A:
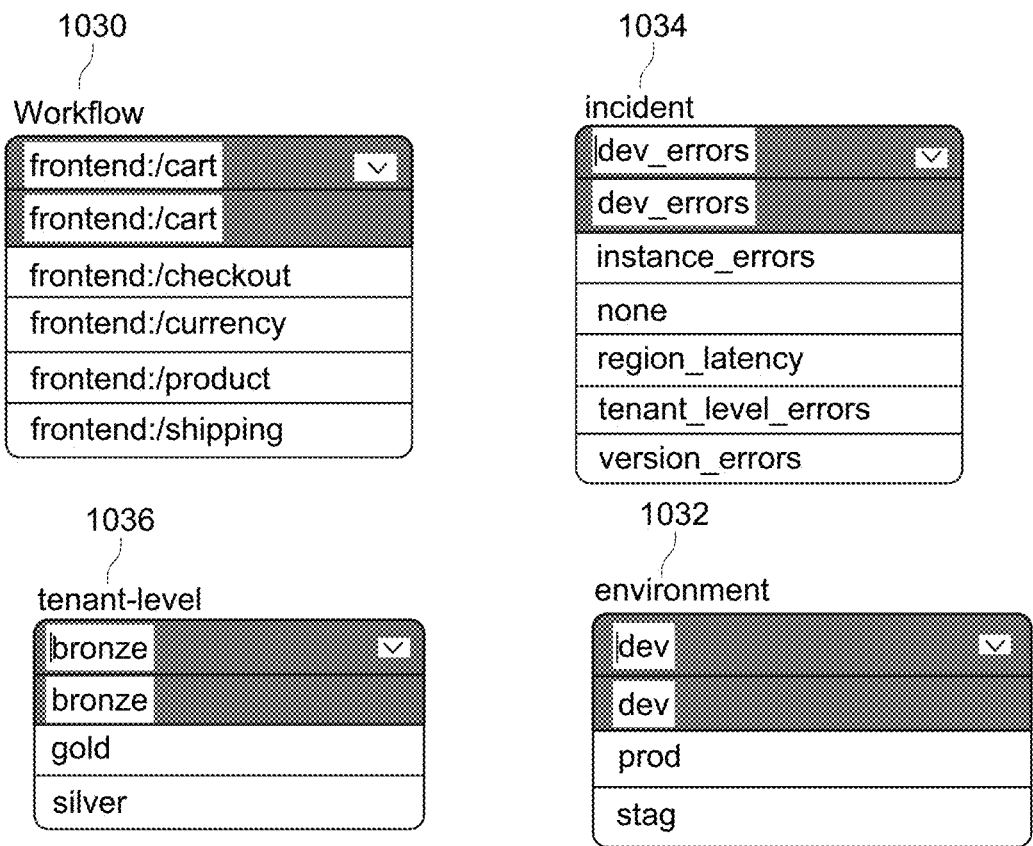
FIG. 10A illustrates on-screen displays that represent exemplary categories of dimensions across which SLIs may be computed, in accordance with embodiments of the present invention.

FIG. 10A illustrates on-screen displays that represent exemplary categories of dimensions across which SLIs may be computed, in accordance with embodiments of the present invention. The metrics data aggregated in the FFF mode allows users to easily and rapidly compute measurements across various cross-combinations of attributes. Drop-down on-screen menu 1030, corresponding to workflow, illustrates different workflows specific to the application discussed in connection with FIG. 6. A "workflow" is a type of category of dimension of the request that was processed; a workflow may be conceptualized as a type of "global tag" that is attributed to each span in a given trace. A workflow may, for example, be associated with a type of business action, e.g., "checkout," that is generated on the back-end in response to a request.

Similarly, drop down on-screen menus 1034, 1036 and 1032, relating to incident, tenant-level and environment respectively, provide further categories of dimensions across which SLIs may be computed. Each of the drop down on-screen menus 1030, 1032, 1034 and 1036 comprises various dimensions (associated with the respective categories) across which aggregations may be made. For example, the user may submit a query asking for the number of requests in a trace where "Workflow=frontend:/cart" and "incident=instance_errors" and "tenant-level=gold." By aggregating metrics data associated with the indexed tags, the FFF is able to respond to the user's query rapidly and efficiently.

Note that SLIs may be computed for each attribute of the categories in FIG. 10A and also for each combination of attributes associated with the categories. In an embodiment, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIGS. 7 and 10A). In this way, embodiments of the present invention enable a client to use the FFF mode to slice the application topology graph across several different attributes.

It should be noted that clients might have different attributes or dimensions that may be of interest for their respective application. In an embodiment, the monitoring platform may be configured to provide insight into client-specific dimensions. Consequently, the specific attributes or dimensions available in each of the drop-down menus may vary by client.

Figure 10B:
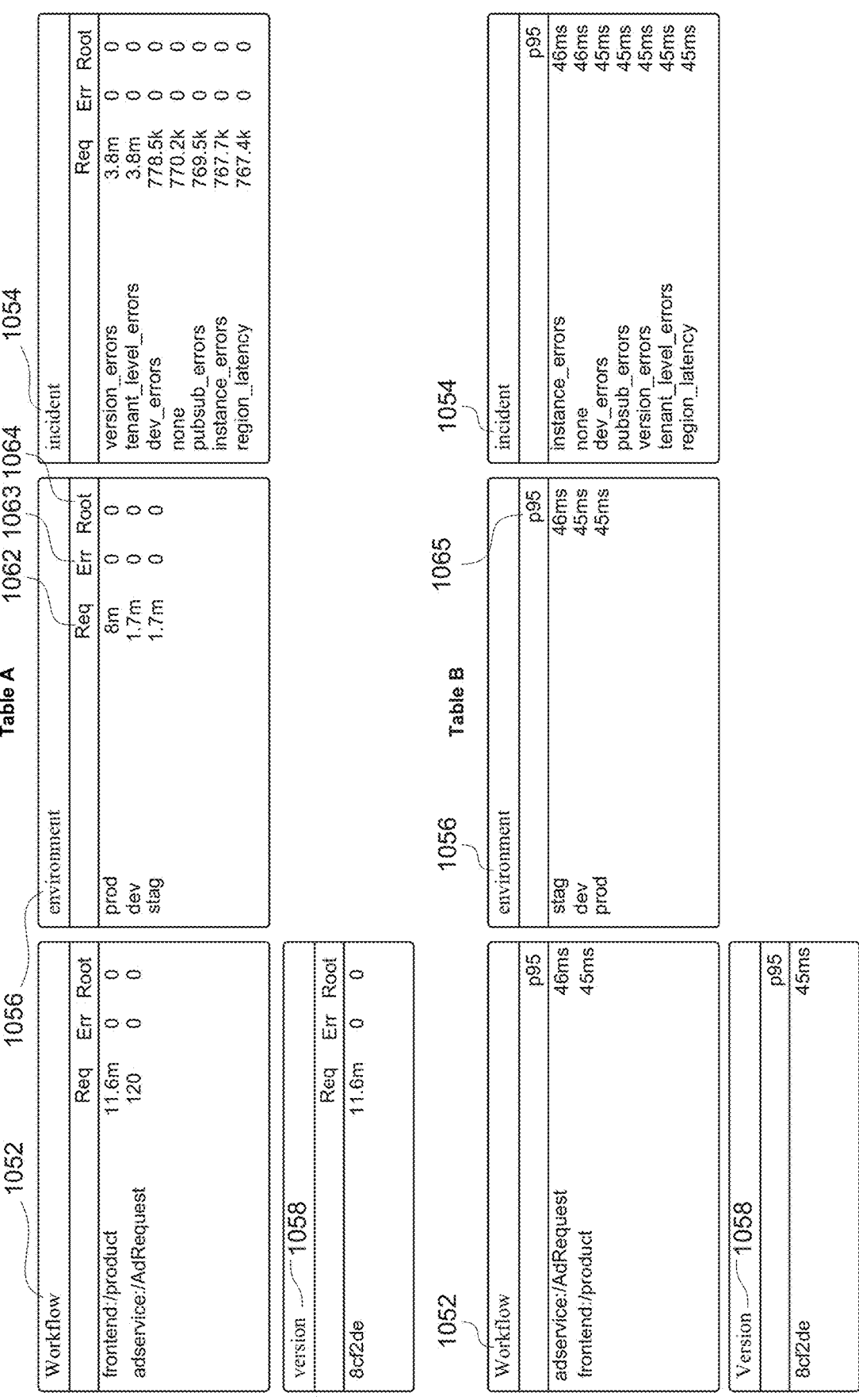
FIG. 10B illustrates exemplary analysis of indexed tags associated with exemplary dimensions, in accordance with embodiments of the present invention.

FIG. 10B illustrates exemplary analysis of indexed tags associated with exemplary dimensions, in accordance with embodiments of the present invention. The analysis of the indexed tags shown in FIG. 10B are based on computations made using the metrics data set associated with the FFF mode. For each category of dimension (e.g., workflow 1052, environment 1056, incident 1054 and version 1058), table A illustrates indexed tags and the metrics (namely, requests 1062, errors 1063 and root-cause behavior 1064) associated with the respective tags. Meanwhile, table B illustrates indexed tags and the p95 latency values 1065 associated with the respective tags. For example, indexed tag "environment=prod" has 8 million associated requests, a p95 latency value of 45 ms and no errors or root-cause behaviors associated with it.

Figures 11A, 11B:
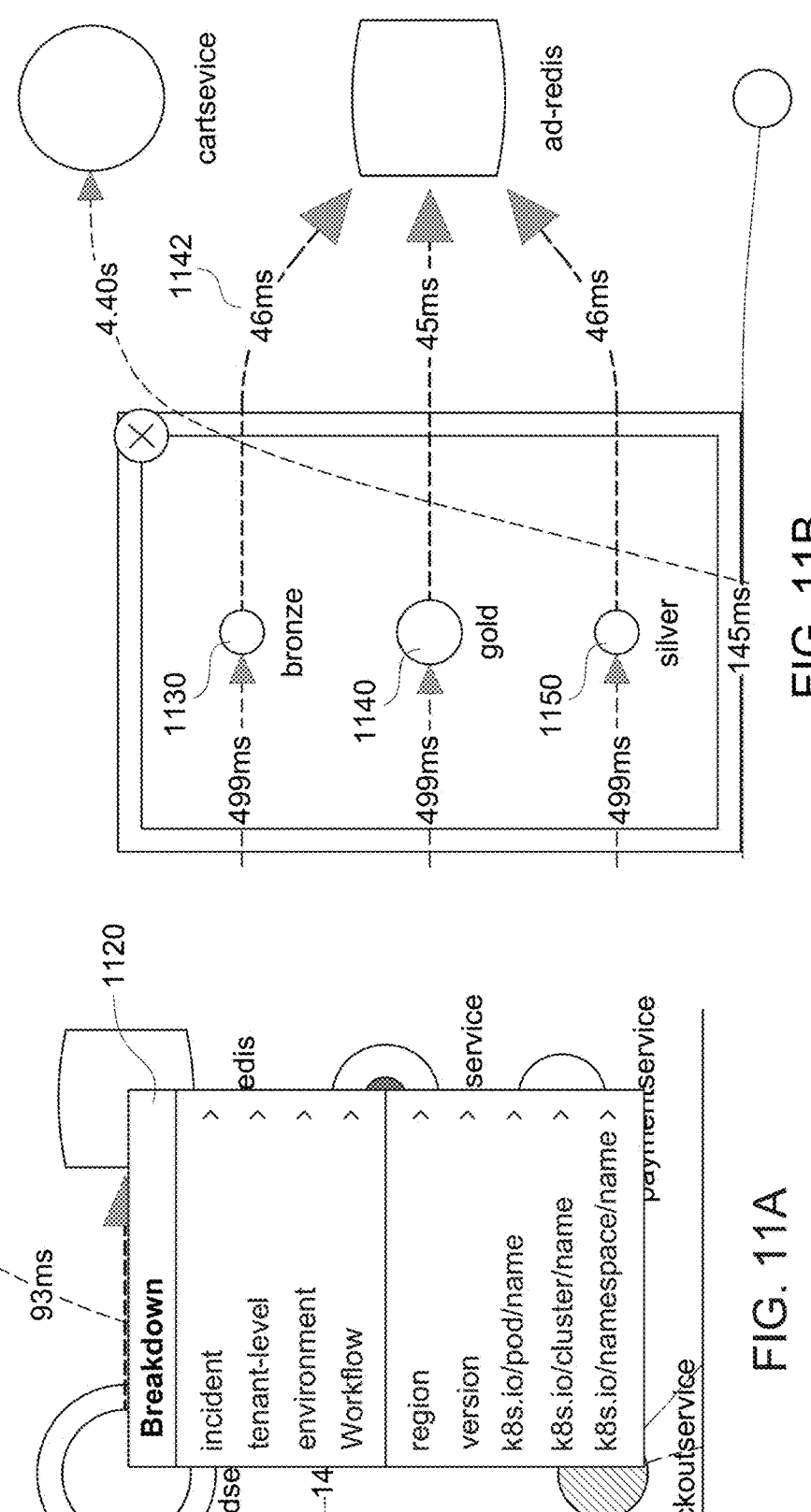
FIG. 11A illustrates exemplary categories of dimensions across which the nodes of the application topology graph may be analyzed, in accordance with embodiments of the present invention.
FIG. 11B illustrates a service node broken down across a selected category of dimensions, in accordance with embodiments of the present invention.

FIG. 11A illustrates exemplary categories of dimensions across which the nodes of the application topology graph may be analyzed, in accordance with embodiments of the present invention. Note that the FFF mode also enables a client, in one embodiment, to break down a service graph node or edge across a variety of different attributes. Breaking down a service graph node or edge comprises analyzing constituent attributes associated with a respective service or node. For example, as shown in FIG. 11A, drop-down menu 1120 may be accessed by interacting with a service node, where the drop down menu allows a client to break down the node across a set of attributes. Note that the categories of dimensions, namely "incident," "tenant-level," "environment," and "Workflow," presented in menu 1120 are the same as the ones discussed in FIG. 10A.

FIG. 11B illustrates a service node broken down across a selected category of dimensions, in accordance with embodiments of the present invention. If a user selects to break down the service node from FIG. 11A across the "tenant-level" category, the node in a service graph expands allowing a user to traverse to the underlying dimensions or attributes associated with the 'tenant-level' category. For example, 'tenant-level' comprises bronze 1130, gold 1140 and silver 1150 type tenants. FIG. 11B illustrates the three types of tenants within the expanded view of the service graph along with the SLIs (e.g., latency value 1142) associated with the three types of tenants. In this way the FFF mode enables the monitoring platform to support a "click and breakdown" feature whereby users may click on a node and break it down into smaller nodes with their associated SLIs displayed on-screen.

Figure 12:
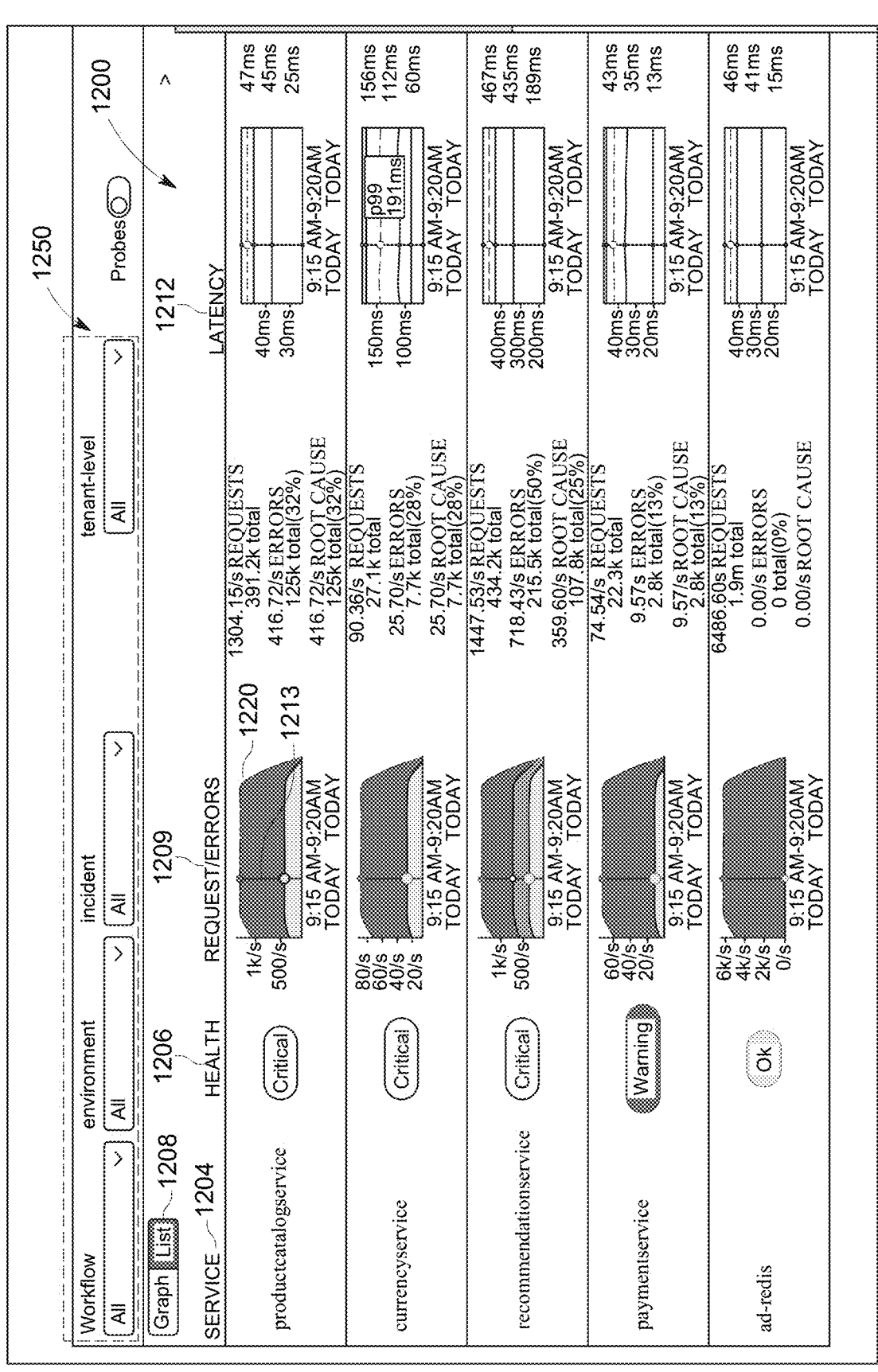
FIG. 12 illustrates an exemplary on-screen GUI showing an alternate method to the topology graph of viewing microservices within an application and their associated SLIs, in accordance with embodiments of the present invention.

FIG. 12 illustrates an exemplary on-screen GUI showing an alternate method to the topology graph of viewing microservices within an application and their associated SLIs, in accordance with embodiments of the present invention. As noted above, in an embodiment, the SLIs are computed using aggregated rows of metrics collected for the FFF mode. The GUI 1200, as shown in FIG. 12, allows the client to select a list view option 1208 instead of a graphical view such as the one illustrated in FIG. 7. The list view provides the client with a columnar list 1204 of the services within the application and their corresponding Health status 1206, SLIs 1209 (e.g., Requests, Errors, Root Cause computations, etc.) and Latency computations 1212. The client is also provided "Root Cause" computations to allow the client to track errors for which a corresponding service was the originator.

The various SLIs and Root Cause computations provided to the user are similar to the computations provided to the user, for example, through the dialog box 808 in FIG. 8; the list view of FIG. 12, however, automatically provides the client with SLI-information within the GUI without needing to select or hover over a service-related node. Further, an interactive graphical view 1220 of the SLIs is also provided, and similar to features associated with the hover graph 804 in FIG. 8, a client is able to click within the interactive graphical view 1220 and slide a bar 1213 to access further information.

It should be noted that GUI 1200 also provides the user the ability to select various combinations of dimensions through drop-down menus 1250 in order to compute more particularized SLIs for each of the services. Selecting a combination of the dimensions using drop-down menus 1250 re-calculates the SLIs in the GUI (e.g., SLIs 1209, etc.) using the metrics data associated with the FFF mode and displays them on-screen for the user.

4.1.3 Distributed Error Stacks

Embodiments of the present invention use the data from the aggregated rows of metrics data created for the FFF mode to create distributed error stacks which visually illustrate the manner in which an error traverses through various services in an application. One of the challenges associated with distributing tracing is diagnosing the root cause of error events. Referencing FIG. 6, for example, for an error originating at the product catalog service 606 that propagates through the recommendation service 604 and eventually comes to the user's attention through the front-end service 602, a conventional monitoring service may not provide an application developer adequate detail regarding where and how the error originated. Embodiments of the present invention address this challenge by using trace error signatures, which are signatures that summarize a type of error encountered during trace execution and provides the application developer insight into the root cause of the failure.

In order to generate distributed error stacks (interchangeably referred to as "trace error signatures"), embodiments of the present invention track and summarize the errors generated by the various services in a microservices-based application for discrete time-ranges. As will be explained further below, embodiments of the present invention subsequently perform a statistical aggregate of the trace error signatures across different traces to track the number of times in a given time window an error associated with each trace error signature occurred.

To track and summarize the errors generated by the various services in a microservices-based application for discrete time-ranges, embodiments of the present invention need to determine error spans associated with a trace. A span generated by a service is considered an "error span" if it represents an operation that returned an error to its caller (e.g., a microservice that made the call that resulted in the error). An error span may be explicitly marked as an error span during the instrumentation process or may be inferred to be an error span based on some type of heuristics, e.g., if inspecting the span tags for a span returns a HTTP status code that is >=400. In one embodiment, the application owner may customize what constitutes an error span by using a query language. A root cause error span is an error span that does not have a child span that is also an error span.

In one embodiment of the present invention, a span error signature (interchangeably referred to as a "span error frame") is created to summarize the type of error returned by the error span to its caller. In order to create a span error signature, embodiments of the present invention map a span to some key attributes that summarize the type of error associated with the span (e.g., a span may either be associated with the root cause originating service for the error or with a service through which the error propagates).

An exemplary span error signature may be represented as the following exemplary tuple: {serviceName, operationName, statusCode, isError, isRootCause}, where serviceName represents the name of the service that executes a call resulting in the error span, operationName represents the name of the specific operation within the service that made the call, statusCode represents the status code of the error (e.g., "503"), isError is a 'TRUE/FALSE' flag that indicates whether a span is an error span, and isRootCause is a 'TRUE/FALSE' flag that indicates whether the error span is the root cause error span. It should be noted that the tuple used to represent the span error signature may include other identifying dimensions as well.

Furthermore, in alternate embodiments of the present invention, the tuple used to represent a span error signature may include fewer elements. For example, the tuple may comprise the serviceName, statusCode, isError and isRootCause elements. It should be noted that a span error signature may be calculated even for non-error spans, where the error related fields (e.g., isError, isRootCause) may be empty or comprise 'FALSE' values. In one or more embodiments, trace error signatures are created by identifying one or more root cause error spans associated with a particular trace (from among the error spans for the trace), determining a call path for each identified root cause error span, and, for each call path identified, mapping each span in the call path to a span error signature.

FIG. 13 presents a flowchart illustrating a process to create a trace error signature starting with a root cause error span, in accordance with embodiments of the present invention. Blocks 1302-1306 describe exemplary steps comprising the process 1300 depicted in FIG. 13, in accordance with the various embodiments herein described. In one embodiment, the process 1300 is implemented at least in part as computer-executable instructions stored in a computer-readable medium and executed in one or more processing devices.

At block 1302, a root cause error span is identified from among a plurality of error spans associated with a particular trace. At block 1304, a call path is determined for the root cause error span, wherein the call path comprises a chain (or series) of spans starting at the root cause error span, and wherein each subsequent span in the chain is a parent span of the prior span in the chain. Stated differently, each subsequent span error signature will belong to the caller of the previous span in the list (e.g., a given span in the chain has a child-of reference to the subsequent span).

In one embodiment, the chain or series of spans starts from the root cause error span and extends to include the last span in the call path that is an error span and has a parent that is a non-error span. In other words, the span error chain comprises spans that are error spans. In a different embodiment, the chain of spans is extended to the root span of the trace regardless of whether it is an error span or not.

At block 1306, a distributed error stack ("or trace error signature") is created from the chain of spans comprising the call path by mapping each span in the chain to a span error frame (the "span error signature"). The top-most frame of the distributed error stack will belong to the root cause error span and the bottom-most frame will belong to the last span in the chain (which may either be the root span of the trace or the last span in the call path that is an error span, depending on embodiment).

Accordingly, a trace error signature is a signature that summarizes a type of error encountered during trace execution. In an embodiment, a trace error signature comprises an ordered list of span error signatures starting from the root cause error span to the last span in the call path that is an error span and has a parent that is a non-error span. The first span error signature in the ordered list or the top-most frame in the distributed stack will belong to the root cause error span. In this embodiment, the bottom-most frame comprises the error signature of the parent of the first non-error span. In a different embodiment, the bottom-most frame of the stack comprises the error signature of the root span of the trace regardless of whether it is an error span or not; this may be done, for example, to provide the developer visibility in instances where intermediary services in a call path may have absorbed an error, but the error still manifests at an upstream service as a degraded or incorrect payload.

Visual representations and SLIs pertaining to the distributed error stacks are displayed on-screen through the GUI and are created using computations made from the underlying metrics data associated with the FFF mode. As mentioned previously, the metrics data may be aggregated rapidly (typically at sub-second rates) to yield the number of counts associated with the error stacks.

Referencing FIG. 6, the exemplary GUI of FIG. 6 comprises the on-screen error panel 689 that visually displays the overall error rate 690 for the application over a given time duration (e.g., 30 minutes from 9:12 a.m. to 9:42 a.m. as shown on accompanying graph 691) and also displays various distributed error stacks 680 that are aggregated over the same time duration for the application associated with service graph 600. In an embodiment, the elements of on-screen error panel are computed using data associated with the FFF mode. The graph 691 displays the manner in which the overall error rate for the application fluctuates over time. In one embodiment, the graph 691 is interactive, allowing a user to click at a point in time within the graph to gather further information.

Embodiments of the present invention perform a statistical aggregate of the trace error signatures across different traces to count the number of times in a given time window an error associated with each trace error signature occurred. Each distributed error stack computed and its associated count is displayed in the on-screen error panel 689. The FFF mode comprises generating aggregated rows of metrics data to accurately keep track of the number of counts (count 687 associated with the recommendation service 604) associated with each distributed error stack. Note that because of sampling, conventional monitoring tools would not be able to provide application owners perfectly accurate information regarding the number of times a particular type of error occurred.

For example, the on-screen error panel 689 displays information pertaining to 5 error stacks, a recommendation service error stack 655, a product catalog service error stack 650, a product catalog service error stack 696, a currency service error stack 697 and a payment service error stack 698. Two of the error stacks in the exemplary GUI of FIG. 6, the error stacks 650 and 655, are expanded so the frames in the stack are visible to the user. Error stacks may also be collapsed by the client to hide the corresponding frames in each stack. For example, the error stacks 696, 697 and 698 are collapsed.

In an embodiment, each of the error stacks shown in FIG. 6 comprises an on-screen interactive heat-map 688 and the count 687 of the number of times that particular type of error occurred during a given time duration. The heat-map 688 is an interactive graphical representation of the error intensity over the selected time duration. Darker shades of the heat-map indicate higher error activity than lighter shades.

All the error stacks 680 provide information about errors that occur within the application topology represented by graph 600 for a given time-range. The top-most frame of an error stack, as displayed in the GUI, is associated with the root cause error span. The error stack 650 in FIG. 6, therefore, indicates that the root cause error span is associated with the product catalog service 606. In the exemplary GUI of FIG. 6, frames associated with the root cause error spans indicate the corresponding error status code with a darker shade as compared to the other layers of the stack.

The "503" error status code generated by the product catalog service 606 (for stack 650), for example, propagates upstream to the recommendation service 604 as a "503" error before it finally shows up at the front-end service 602 as a "503" error. It should be noted that there are two frames within stack 650 associated with each of recommendation service 604 and front-end service 602. As noted previously, often times a service may execute calls to itself (e.g., different operations within the same service). Accordingly, there may be multiple consecutive frames in an error stack associated with a single service. In an embodiment, a single error frame may be displayed within the distributed error stack for each service even though the service may make multiple calls to itself.

The error stack 655 in FIG. 6 indicates the root cause error span is associated with the recommendation service 604 and comprises a "503" error status code (also indicated as a darker shade of color to represent a root cause error originating service). This error propagated upstream through two different operations at the front-end service 602 before it reached the user.

The on-screen GUI of FIG. 6 allows a client to visually correlate the error stack with the service graph to efficiently determine from where the errors are originating and the manner in which they are flowing through the application. For example, given error stack 650, a client may visually inspect the path that the error takes through the application. Referring to the service graph 600, a client may note that the error originates at the product catalog service 606 and propagates to the recommendation service 604 through the edge 626 and, subsequently, to the front-end service 602 via a call represented by the edge 622.

4.1.4 Metrics Data Generation and Persistence

Figure 14A:
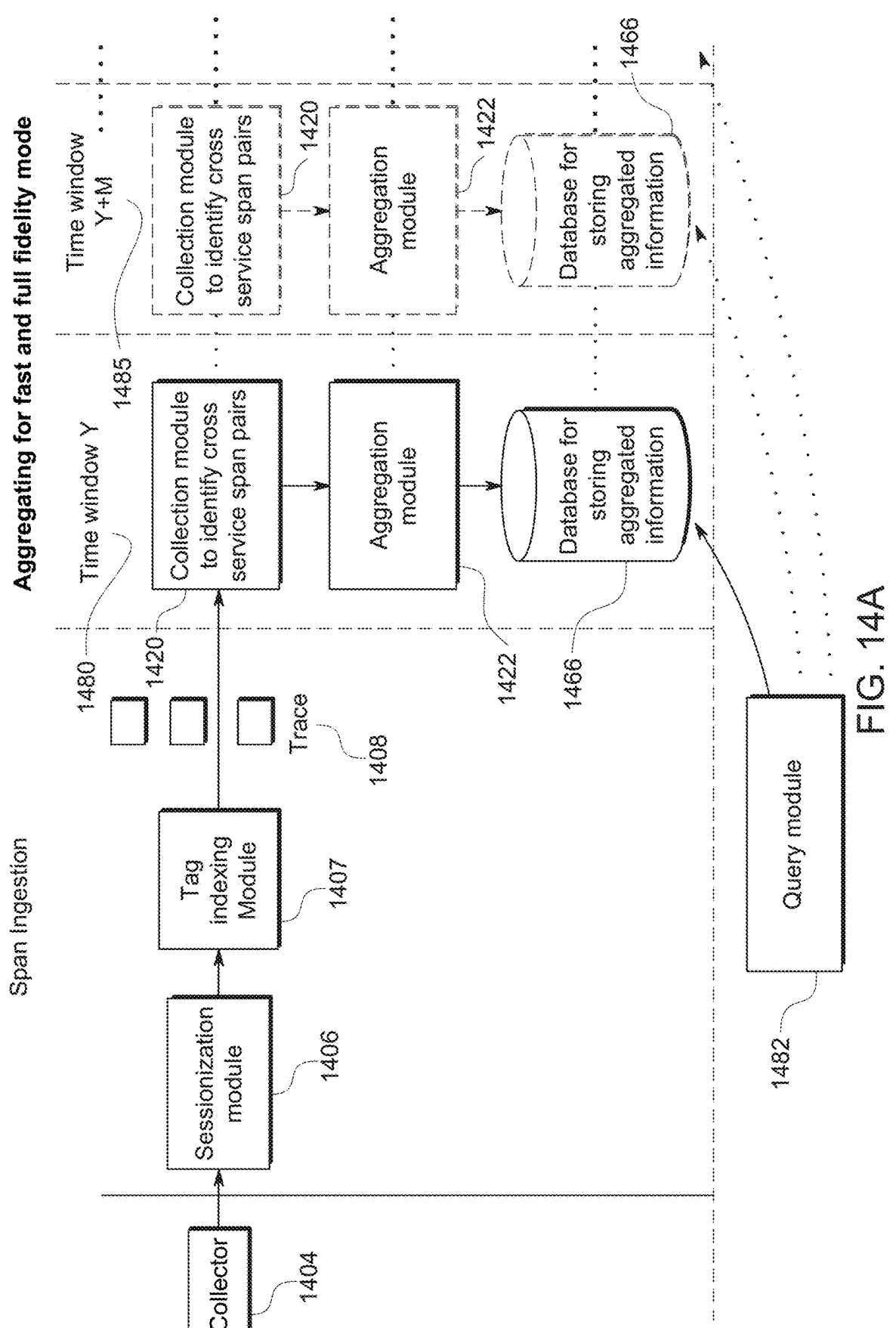
FIG. 14A is a flow diagram that illustrates an exemplary method for aggregating metrics data from ingested traces for the FFF mode, in accordance with embodiments of the present invention.

FIG. 14A is a flow diagram that illustrates an exemplary method for aggregating metrics data from ingested traces for the FFF mode, in accordance with embodiments of the present invention. As mentioned previously, span information is received at a monitoring service from a collector 1404. The span information is then combined into traces 1408 in real time using module 1406 in a process called sessionization as discussed in connection with FIG. 5A. The sessionization process may consolidate traces (from spans) within a first 15-minute window (associated with time window Y 1480) before transmitting the traces to the collection module 1420. Thereafter, the sessionization process may consolidate traces within the subsequent 15 minutes (associated with time window "Y+M" 1485).

Subsequent to consolidation, the trace data is indexed by tag indexing module 1407, which indexes one or more tags in the trace data. The tags may be client-selected tags or tags that the monitoring platform is configured to index by default. In one embodiment, the FFF mode indexes a subset of tags associated with the spans of a trace, but indexes that set of tags at full-fidelity. Accordingly, the FFF computes SLIs pertaining to the indexed set of tags with perfect accuracy.

In one or more embodiments, collection module 1420 receives one or more traces 1408 generated within a predetermined time window Y 1480, and traverses the traces to identify and collect cross-service span pairs that represent cross-service calls. To collect the cross-service span pairs, the collection module 1420 identifies parent-child span pairs in a given trace where the service name for the parent and the child are different. Stated differently, the collection module 1420 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a user, e.g., to render the service graph and display the SLIs associated with the various dependencies between services. Spans associated with calls to internal operations that a service might make may not be of interest to an application owner and may, therefore, be ignored by the collection module 1420 when determining the cross-service span pairs.

It should be noted that, in one embodiment, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1420 from service tiers associated with a cross-service span pair. In a different embodiment, however, the tags may be extracted directly from the parent span and child span in a cross-service span pair rather than the respective service tier associated with the parent span or child span.

In one or more embodiments, once the cross-service span pairs are collected and the indexed tags extracted from the respective service tiers, the collection module 1420 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one embodiment, the aggregation module 1466 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this embodiment, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In a different embodiment, the count may be maintained at the service level. Accordingly, the count may be increased each time the same cross-service span pair is encountered within the trace information ingested from the client.

The aggregation module 1422 advantageously prevents duplication by storing a single instance of each unique set of "FROM" tag attributes and "TO" tag attributes for a given cross-service span pair with an associated count in the storage module 1466. The information in the storage module 1466 may be accessed by querying module 1482 where the querying module 1482 determines that the query would be best suited for the FFF mode. The querying module 1482 may, for example, be associated with the query engine and reporting system 324 discussed in FIG. 3.

The aggregated cross-service "FROM" and "TO" tag attribute sets and associated count values stored in the storage module 1466 may be used by the querying module 1482 to respond to queries in accordance with the FFF mode (as will be further illustrated in connection with FIGS. 14B, 15A and 15B). Note that the collection and aggregation process is repeated for subsequent time windows (including window Y+M 1485) after time window Y 1480. In this way, the aggregation process is performed over time. This allows the FFF mode to deliver query results over varying time durations (as discussed, for example, in connection with the drop-down menu 722 in FIG. 7).

FIG. 14B is a table illustrating an exemplary manner in which selected tags for each service in a cross-service span pair may be mapped to tag attributes and stored as part of a data object associated with an edge in the service graph, in accordance with embodiments of the present invention. As noted above, in one or more embodiments, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one embodiment, one or more edge data objects similar to the one shown in FIG. 14B is used to persist the data for the FFF mode (in addition to node data objects and distributed error stack data objects which will be discussed in connection with FIG. 15B).

The table of FIG. 14B illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us—west" and "us—east."

If all possible combinations exist in Service A, there may be 4 unique tag combinations associated with the "FROM" tag attribute, e.g., {(span.kind=client, region=us—west) (span.kind=client, region=us—east) (span.kind-server, region=us—west) (span.kind-client, region=us—east). Similarly, if all possible combinations exist in Service B, there may also be 4 unique tag combinations associated with the "TO" tag attribute. Assuming there is a complete inter-action between Service and Service B, there may be 16 (4×4) different edges between the two services based on the unique set of "FROM" and "TO" type tag attributes.

Note that the example in FIG. 14B illustrates information for two unique sets of "FROM" and "TO" tag attributes. Edge 1490 is associated with a TO-type attribute of "region=us—east" while edge 1492 is associated with a TO-type attribute of "region-us—west." Because the two sets of "FROM" and "TO" attributes are not identical, a separate count is maintained for each. The edge 1490 has an associated count of 2, while the edge 1492 has an associated count of 1. To determine the total number of requests or total count associated with the cross-service call from Service A to Service B, the number of counts for each set of "FROM" and TO" tag attributes for an associated cross-service call may be summed up. In the example of FIG. 14B then, a total of 3 requests is computed to occur between Service A and Service B.

In one embodiment, data sets for the FFF mode are stored as row of metrics extracted from the indexed tags in the service tiers, where each row is associated with either an edge or a node in the service graph. In an embodiment, the edges on the service graph (e.g., the edges 622 and 626 of FIG. 6) are rendered using both the "FROM" and "TO" tag attribute sets because rendering the edges requires informa-tion regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an embodiment, this grouping may be performed using "group by" state-ments in a query language, e.g., SQL. In one embodiment, the value of the number of requests between two services may be used to determine the thickness of the edge between the two services in the service graph.

In one embodiment, the nodes (e.g., nodes associated with services 602, 604, 606) on the service graph are also rendered using the aggregated cross-service "FROM" and "TO" tag attribute sets. However, rendering the nodes does not require directionality information and, therefore, the nodes may be rendered by collecting and extracting infor-mation from the "TO" type tag attributes. Stated differently, the nodes are rendered by grouping the "TO" tag attributes associated with a given service and summing up the request counts associated with the service. In an embodiment, this grouping may be performed using "group by" statements in a query language, e.g., SQL. The "TO" tag attributes rep-resent new services being called within the microservices architecture. Accordingly, the counts associated with "TO" tag attributes for a given service may be summed up to determine the total number of requests made to the service. In one embodiment, the value of the number of requests may also be used to determine the size of the node when rendering the service graph.

In an embodiment, the "TO" type tag attributes for rendering the nodes may be aggregated separately from the "FROM" and "TO" tag attribute sets aggregated for render-ing the edges (as will be discussed in connection with FIG. 15B). In the exemplary table of FIG. 14B, information for Service B may be determined, for example, by analyzing the "TO" type tag attributes in the table.

Figure 15A:
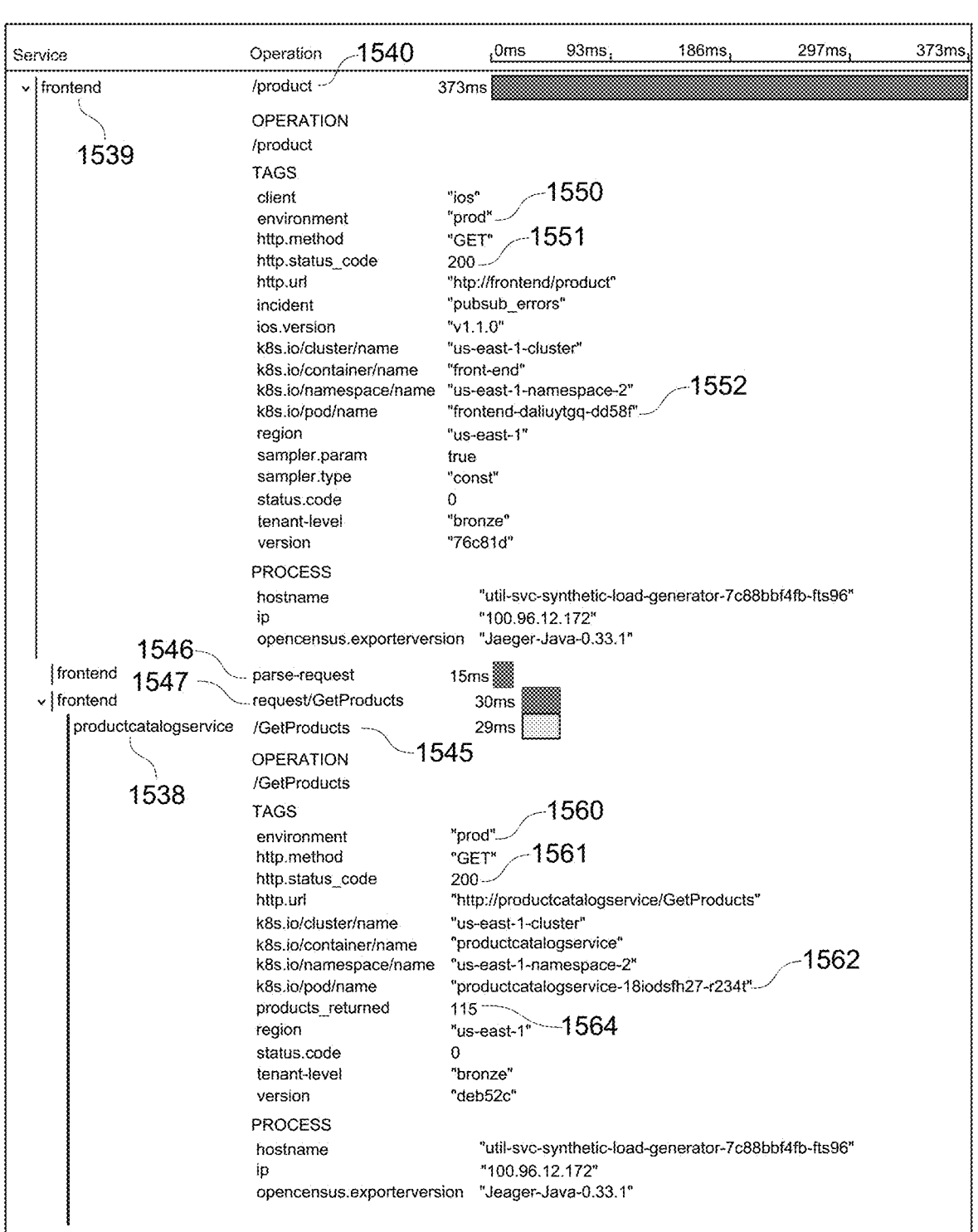
FIG. 15A illustrates an exemplary on-screen GUI showing a visual representation of a portion of an exemplary trace illustrating a cross-service call, in accordance with embodiments of the present invention.

FIG. 15A illustrates an exemplary on-screen GUI show-ing a visual representation of a portion of an exemplary trace illustrating a cross-service call, in accordance with embodi-ments of the present invention. As shown in FIG. 15A, front-end service 1539 makes a call to product catalog service 1538. Accordingly, the front-end service 1539 and the product catalog service 1538 comprise a cross-service span pair. Note that spans 1540, 1546 and 1547 may be part of the service tier for front-end service 1539. Accordingly, even though the call is made by the span 1547 ('frontend: request/GetProduct') to span 1545 ('productcatalogservice: /GetProducts), indexed tags associated with the front-end service 1539 may also be extracted from the spans that are part of the service tier for the front-end service 1539. In one embodiment, the first matching tag within a service tier is extracted. For example, indexed tag "environment=prod" 1550 may be extracted from the span 1540, even though it is repeated in the spans 1546 and 1547 because the span 1540 comprises the first matching instance of the tag 1550. Assuming tags "environment" (referred to herein as "env"), "http.status_code" (referred to herein as "code") and "k8s.io/pod/name" (referred to herein as "pod") are indexed, then tags 1550, 1551 and 1552 are extracted from the front-end service 1539 while tags 1560, 1561 and 1562 are extracted from the product catalog service 1538.

In an embodiment, the extracted indexed tags are mapped to tag attributes. The extracted tags 1550, 1551 and 1552 in the parent span (associated with the front-end service 1539) may be mapped to a "FROM" tag attribute while the extracted tags 1560, 1561 and 1562 in the child span may be mapped to a "TO" tag attribute. In one embodiment, the mapped tags may be used to create node and edge data objects that are used to persist data for the FFF mode as shown in FIG. 15B.

FIG. 15B illustrates the manner in which data in the FFF mode is persisted using an edge data object comprising a memory-resident table of tag attributes with associated counts and using a node data object comprising a memory-resident table of tags with associated counts, in accordance with an embodiment of the present invention. In one embodiment of the present invention, a memory-resident table 1501 titled "Edge Health" may be maintained to keep track of the various dependencies in the application. The table 1501 may be stored in, for example, in the storage module 1466. A memory-resident table 1500 titled "Node Health" may be maintained to keep track of the various service nodes in the application. Both tables comprise aggregated rows comprising metrics values. In one embodiment, these rows are stored efficiently for fast aggregation.

For example, the table 1501 may comprise one or more exemplary rows related to the cross-service span pair discussed in connection with FIG. 15A. Row 1506 is one exemplary row that may be generated for the cross-service span pair of FIG. 15A. Note that for simplicity, only tag attributes "from pod" and "to pod" are illustrated in row 1506 in FIG. 15B, but row 1506 would typically also comprise information for tag attributes associated with indexed tags "code" and "env" that are also indexed. As discussed above, each row for the cross-service span pair of FIG. 15A will comprise a unique set of "FROM" and "TO" tag attributes. For example, if the front-end service (e.g., front-end service 1539 in FIG. 15A) makes multiple calls to the product catalog service (e.g., product catalog service 1538 of FIG. 15A), but any of the calls are associated with different values for the "pod" tag from the values shown in row 1506, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1501 for the cross-service call discussed in connection with FIG. 15A, where each row would comprise a unique combination of "FROM" and "TO" tag attributes for a given cross-service span pair.

Each row in the table 1501 comprises a count value for number of requests 1504, errors 1505 and latency 1511. The request metric 1504 is incremented each time the same cross-service call with the same unique set of attributes for a respective row is observed on a trace. The error metric 1505 is incremented each time a request associated with a respective row is observed on a trace that has an error. The latency 1511 metric relates to a histogram of the duration that a respective request took. Further, each row comprises a timestamp 1503 to record the time of the cross-service call.

Using the metrics associated with the requests 1504, errors 1505 and latency 1511 and the timestamp 1503, aggregations on the rows may be performed quickly and efficiently to determine SLIs for varying ranges of time as discussed in connection with FIGS. 6 to 12. In response to a user query then, the numeric rows in the tables 1500 and 1501 may be summed into either timeseries buckets or into a single number depending on the query.

In one embodiment, the FFF mode may maintain a separate memory-resident table 1500 titled "Node Health" associated with the service nodes in the application. Similar to table 1501, table 1500 may be maintained in, for example, storage module 1466. While a separate table may be maintained for node information, it should be noted that in a different embodiment, nodes may be rendered by extracting and collecting information from the "TO" type tag attributes of the memory-resident table 1501. The nodes, for example, may be rendered by grouping the "TO" tag attributes associated with a given service from the memory-resident table 1501 and summing up the request counts associated with the service.

In the embodiment shown in FIG. 15B, however, a separate table for nodes is maintained by the system in memory. Each row in the memory-resident table 1501 comprises a unique combination of service names and associated tags. For example, row 1508 is associated with the front-end service (e.g., service 1539 in FIG. 15A) and comprises corresponding tag values for "env," "pod" and "code." Similarly, row 1507 is associated with the product catalog service (e.g., product catalog service 1538 of FIG. 15A) and comprises corresponding tag values for "env," "pod" and "code."

Each unique combination of service name and corresponding tag values is associated with metrics that are maintained in the memory-resident table 1500, e.g., request, error and latency (as discussed in connection with table 1501). These metrics may be used to perform fast and efficient aggregations in the FFF mode to provide the user sub-second query responses. For example, if the user queried the number of times "env=prod" in the application, assuming the two exemplary services illustrated in table 1500 are the only ones where "env=prod," the request counts in each row would be aggregated to provide a result of 2.

Note that the memory-resident table 1500 may also comprise a "root cause" metric 1509 which tracks the number of times the corresponding service was the root cause of an error. For example, the "root cause" metric may be aggregated using the memory-resident table 1500 across multiple rows to determine the number of times each given service in an application was the root cause for an error. As noted above, the FFF mode is able to provide accurate information because up to 100% of the incoming spans from an application may be ingested and reduced down to the metric values that are persisted in tables 1500 and 1501.

In one embodiment, a software tool may be employed to perform faster aggregations across the rows of tables 1500 and 1501. For example, Apache Druid, which is an open-source data store designed for sub-second queries on real-time and historical data, may be used to perform the aggregations rapidly and efficiently. In different embodiments, other tools may also be used to perform aggregations. In one embodiment, the information in the memory-resident tables 1500 and 1501 may be used in the FFF mode to perform the metrics aggregations for rendering the service graph (e.g., graph 600 of FIG. 6) and computing the associated SLIs discussed in connection with FIGS. 6 to 12.

Embodiments of the present invention use a table similar to the exemplary ones illustrated in FIG. 15B to aggregate rows of metrics associated with the trace error signatures (or distributed error stacks). The aggregated metrics are used by the FFF mode to provide SLIs pertaining to the error stacks, e.g., the SLIs discussed in connection with the on-screen error panel 689 in FIG. 6. Embodiments of the present invention are further able to extract various tags or attributes (e.g., global tags) associated with each of the traces ingested into the FFF module 520 (of FIG. 5A), and associate the attributes with the computed trace error signatures through a mapping and reduction process.

In one or more embodiments, following trace ingestion, for each window of time, a mapping process emits several pairs, each comprising a trace error signature and associated tags or attributes. Thereafter, in a reduction process, duplicate "trace error signature" and associated "attributes" pairs are reduced and a count is maintained for how often each pair occurred for a given time window. Aggregating trace error signatures by the associated attributes allows users the ability to filter the error information accumulated by any dimension in the FFF mode. The pairing and reduction process enable embodiments of the present invention to support breaking down the trace error signatures by different dimensions in the FFF mode. For example, a user may be able to break down error stacks by type of client. The pairing and reduction process also enable embodiments of the present invention to compute full-fidelity SLIs across many different dimensions and allow user to filter and aggregate SLIs across any dimension in the FFF mode. This pairing and reduction process are described in more detail in U.S. patent application Ser. No. 16/672,210, entitled "IN A MICROSERVICES-BASED APPLICATION, MAPPING DISTRIBUTED ERROR STACKS ACROSS MULTIPLE DIMENSIONS", filed on Nov. 1, 2019, which is hereby incorporated by reference in their entirety.

In one embodiment, the complete data set to support queries handled by the FFF mode comprises an edge health table 1501, a node health table 1500 and a table for the trace error signatures. Tables 1501 and 1500 keep track of the metrics pertaining to the nodes and edges while the table for trace error signatures keeps track of metrics related to the distributed error stacks displayed on-screen, for example, in the on-screen error panel 689. In an embodiment, the data set comprising the tables may be stored in the storage module 1466.

In one embodiment, the monitoring platform may be able to perform custom metric extraction. An application owner may, for example, be able to identify numeric tags on spans that may be extracted out into numeric timeseries in the FFF mode. The FFF mode, therefore, allows application owners and developers to specify and extract customized metrics and perform full-fidelity queries against the extracted time-series. Further, the FFF mode also allows simple arithmetic combinations of the numeric fields (e.g., add, subtract, etc.) using a software tool, e.g., Apache Druid.

FIG. 15C illustrates the manner in which custom metrics in the FFF mode may be extracted and persisted, in accordance with an embodiment of the present invention. As discussed in connection with FIG. 15B, typically the extracted indexed tags associated with an edge (as shown in table 1501) or a node (as shown in table 1500) may be persisted in rows along with metrics for number of Requests, Errors, Duration (or Latency) (also known as RED metrics) and Root Cause. The FFF mode also provides users the option to extract custom metrics in addition to the RED and Root Cause metrics.

For example, referring to FIG. 15A, an application owner may be interested in the "products_returned" tag 1564 to determine the number of products that were returned by customers. In one embodiment, the application owner may be able to flag the "products_returned" tag 1564 so that the tag is extracted out as a custom metric and associated with a numeric timeseries. The extracted values are stored per tag combination similar to tables 1500 and 1501.

As shown in FIG. 15C, row 1591 comprises the custom metric 1592 where its value corresponds to the "products_returned" tag 1564 from FIG. 15A. Note that the metric 1592 is stored per time value 1593 which allows aggregations over time to be performed by summing up the corresponding values from the various rows. Further note that the extracted values are stored per tag combination and, accordingly, a separate row would be created for product catalog service if any of the "env," "pod," or "code" tags had different values from the ones in row 1591. The custom metric 1592 would be tracked for each tag combination.

Figure 16:
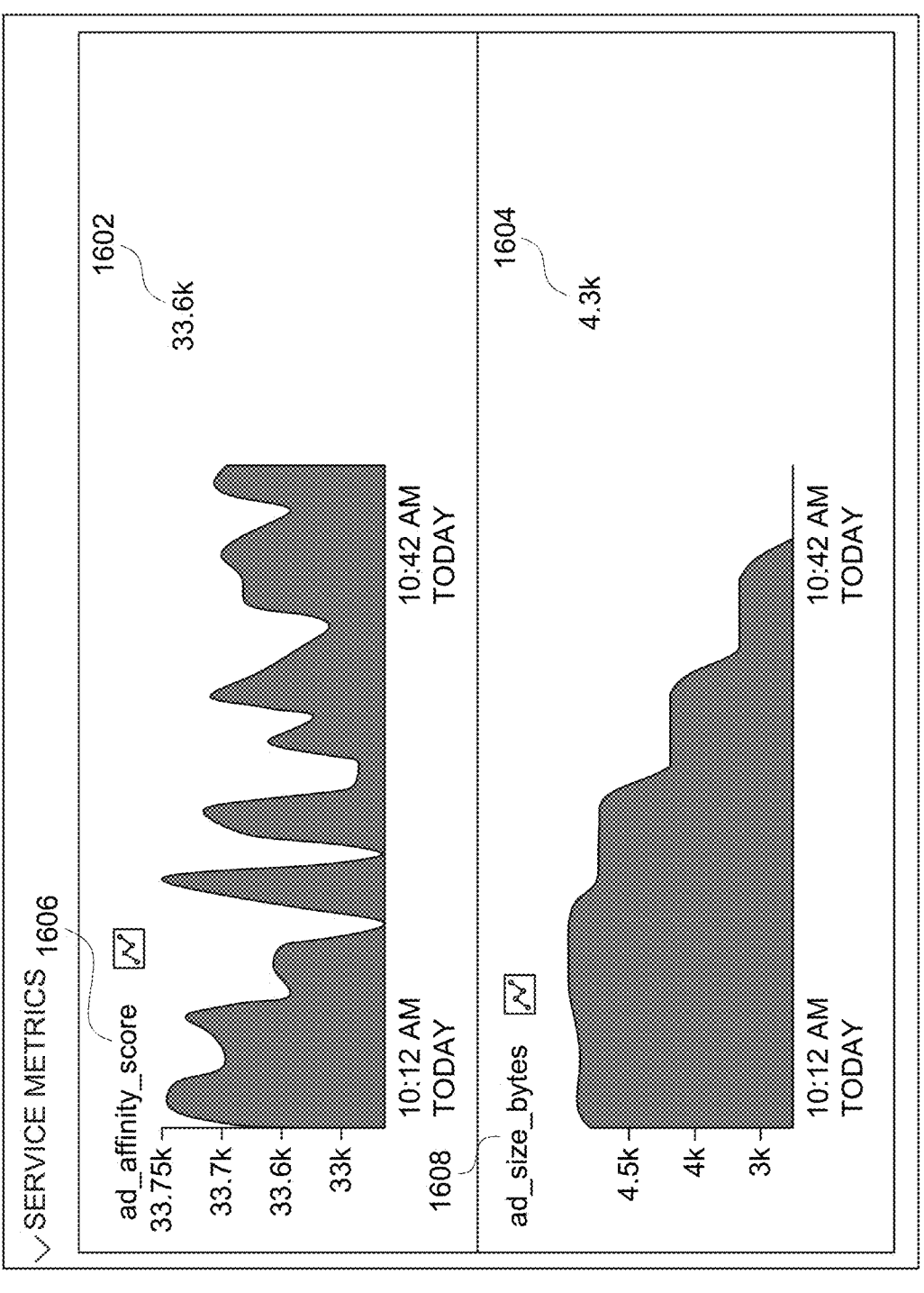
FIG. 16 illustrates an exemplary on-screen GUI displaying the manner in which custom metrics perform over time and their associated SLIs, in accordance with embodiments of the present invention.

FIG. 16 illustrates an exemplary on-screen GUI display-ing the manner in which custom metrics perform over time and their associated SLIs, in accordance with embodiments of the present invention.

As noted above, for custom metrics, the FFF mode allows users to identify numeric tags on spans that are extracted out and saved as metrics in a timeseries. For example, "ad_af-finity_score" 1606 and "ad_size_bytes" 1608 shown in FIG. 16 are two exemplary service metrics flagged by the user for extraction. Extracting the tag data and associating it with a time value in the FFF mode allows the performance of the service metrics to be visually represented over time as shown in FIG. 16. An average value of the extracted tag (e.g., values 1602 and 1604) across the processed traces may be presented to the user in the exemplary GUI of FIG. 16.

FIG. 17 presents a flowchart illustrating the process 1700 in which data for the FFF mode may be aggregated and persisted, in accordance with embodiments of the present invention. Blocks 1702-1712 describe exemplary steps com-prising the computer implemented process 1700 depicted in FIG. 17, in accordance with the various embodiments herein described. In one embodiment, the process 1700 is imple-mented at least in part as computer-executable instructions stored in a computer-readable medium and executed in one or more processing devices.

At block 1702, a plurality of spans associated with instrumented services are ingested for a given time duration and consolidated into one or more traces, where each span comprises at least a Trace ID associated with a user-request. Further, the spans may also comprise a Parent Span ID that allows a parent-child relationship to be created between spans. In one embodiment, the spans are ingested and grouped into traces in real time. In an embodiment, the plurality of spans may be grouped or consolidated into one or more traces in discrete windows of time. A sessionization process is used whereby, using the time-stamps and the Trace IDs associated with each trace, traces are created from the incoming spans such that each session of the session-ization process creates traces associated with a correspond-ing window of time.

At block 1704, a pre-determined set of tags are indexed from the plurality of traces. At block 1706, the collection module 1420 (shown in FIG. 14A) traverses the trace structures to determine and collect cross-service span pairs that represent cross-service calls between two services. As noted in connection with FIG. 17, to collect the cross-service span pairs, the collection module 1420 identifies parent-child span pairs in a given trace where the service name for the parent and the child are different.

At block 1708, once the cross-service span pairs are collected, the collection module 1420 of the monitoring platform maps indexed tags associated with each service in the cross-service span pair to tag attributes, e.g., selected indexed tags associated with a parent span (the originating service) are mapped to a "FROM" tag attribute and selected indexed tags associated with the child span (the target service) are mapped to a "TO" tag attribute. This enables directionality information for the cross-service calls to be preserved. As noted above, in one embodiment, indexed tags associated with each respective service in the cross-service span pairs may be determined based on service tiers.

At block 1710, the aggregation module 1466 maintains one or more separate counts for each unique set of tag attributes associated with a cross-service pair, e.g., a sepa-rate count for Requests, Errors and Duration (Latency) may be maintained for each unique set of "FROM" tag attributes to "TO" tag attributes associated with a cross-service pair.

At block 1712, in response to a user's query that is serviced by the FFF mode, the monitoring platform aggre-gates across the cross-service span pairs by aggregating respective counts for each unique set of attributes, e.g., each unique set of "FROM" tag attributes (and their correspond-ing values) to "TO" tag attributes (and their corresponding values) associated with a cross-service pair. This prevents unnecessary duplication because each set of "FROM" and "TO" tag attributes for a given cross-service pair needs to be saved once and associated with one or more count values (which tracks the number of times a particular set occurred). As noted previously, SLIs pertaining to the edges may be determined by aggregating across the sets of "FROM" and "TO" tag attributes while SLIs pertaining to nodes may be determined by aggregating across the "TO" tag attributes, as discussed above.

4.2 Fast and Approximate Mode (Referred to Hereinafter as "FAA" Mode)

From incoming trace data, in an embodiment, the FAA module 522 of FIG. 5A generates and stores aggregated rows comprising exemplary Trace IDs for unique combinations of service names and corresponding indexed tags. Similar to the FFF mode, selected tags may, for example, be indexed from the incoming spans when the spans are ingested. However, instead of extracting metric values associated with the incoming spans, the FAA mode stores exemplary Trace IDs for each unique combination of service names and associated tags. Note that storing exemplary Trace IDs and performing computations on traces associated with the exemplary Trace IDs is one type of sampling that may be used for the FAA mode. In different embodiments, the FAA mode may use other types of sampling as well, e.g., statistical sampling.

4.2.1 Data Generation and Persistence

Figure 18A:
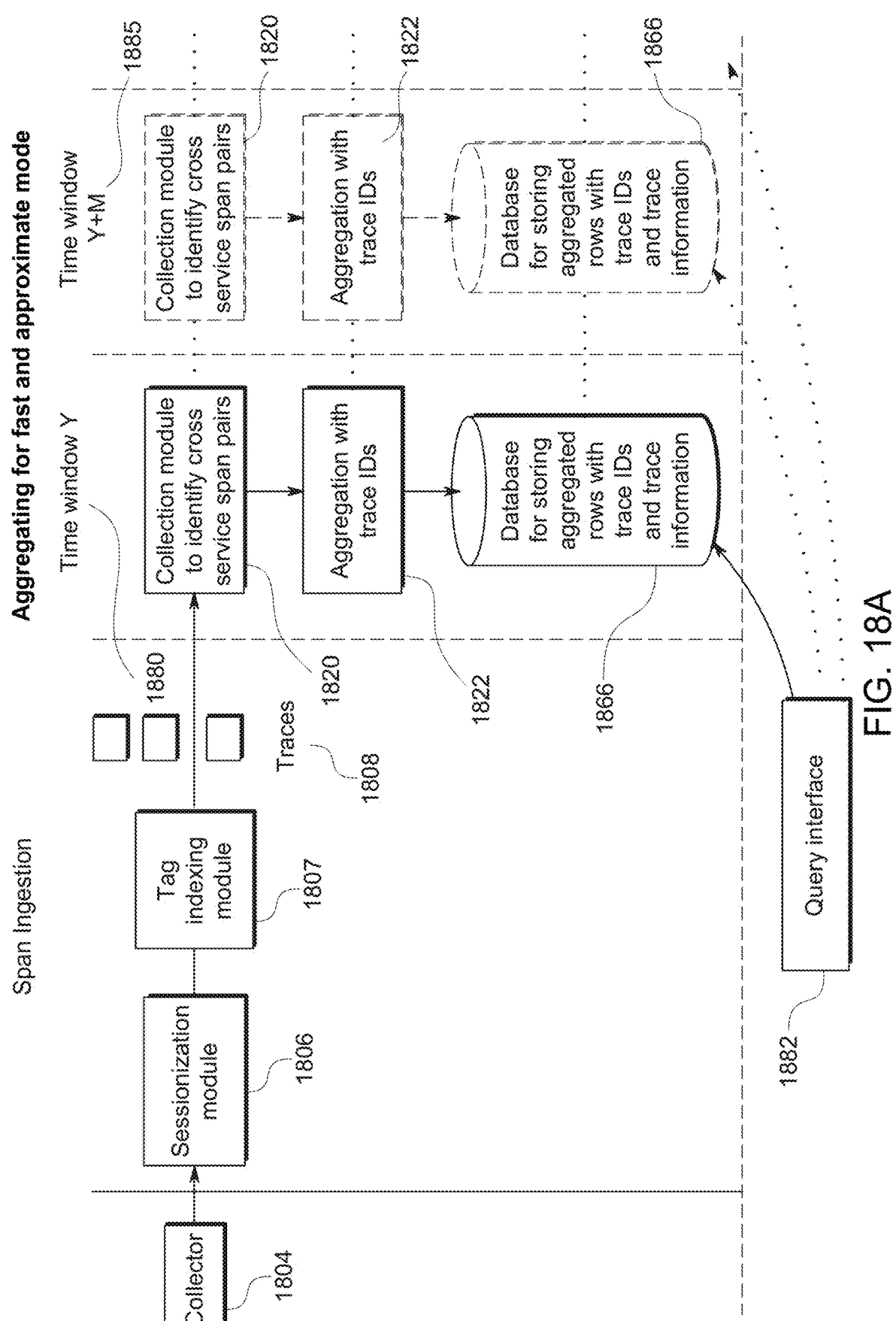
FIG. 18A is a flow diagram that illustrates an exemplary method for ingesting and aggregating trace information to generate aggregated rows with Trace IDs for the FAA mode, in accordance with embodiments of the present invention.

FIG. 18A is a flow diagram that illustrates an exemplary method for ingesting and aggregating trace information to generate aggregated rows with Trace IDs for the FAA mode, in accordance with embodiments of the present invention. It should be noted that collector module 1804, sessionization module 1806, tag indexing module 1807 and collection module 1820 perform substantially the same function as the corresponding modules in FIG. 14A. As discussed in connection with FIG. 14A, the sessionization process may consolidate traces (from spans) within a first 15-minute window (associated with time window Y 1880) before transmitting the traces to the collection module 1820. Thereafter, the sessionization process may consolidate traces within the subsequent 15 minutes (associated with time window "Y+M" 1885) before transmitting those traces to the collection module 1820.

Subsequent to consolidation, the trace data is indexed by the tag indexing module 1807, which indexes one or more tags in the trace data. The tags may be client-selected tags or tags that the monitoring platform is configured to index by default. In one embodiment, the FAA mode indexes the same tags that are indexed for the FFF mode and uses the same pipeline to extract the indexed tags as the one used for the FFF mode. In a different embodiment, the FAA indexes different tags from the FFF mode and performs the extraction in a pipeline dedicated to the FAA mode specifically.

In one or more embodiments, the collection module 1820 receives one or more traces 1808 generated within a predetermined time window Y, and traverses the traces to identify and collect cross-service span pairs that represent cross-service calls. It should be noted that, in one embodiment, once the cross-service span pair is identified, indexed tags may be extracted for the cross-service span pair, e.g., from the respective service tier for for the parent and child spans of the span pair. Thereafter, the collection module 1820 maps one or more selected tags for each service in the cross-service span pair to tag attributes, e.g., selected tags in a parent span are mapped to a "FROM" tag attribute and selected tags in a child span are mapped to a "TO" tag attribute similar to the manner discussed in connection with FIG. 14A.

In one embodiment, the aggregation module 1822 of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. It should be appreciated that in this embodiment, Trace IDs are maintained at the tag level for the cross-service span pair (rather than at the service level). Accordingly, a different one or more exemplary Trace IDs is maintained for each set of parent span tags (mapped to a "FROM" tag attribute) and child span tags (mapped to a "TO" tag attribute).

In a different embodiment, Trace IDs may be maintained at the service level. Accordingly, exemplary Trace IDs may be maintained for each unique cross-service call.

The aggregation module 1822 advantageously prevents duplication by storing a single instance of each unique set of "FROM" tag attributes and "TO" tag attributes for a given cross-service span pair with an associated one or more exemplary Trace IDs in the storage module 1866. The information in the storage module 1866 may be accessed by querying module 1882 in instances where the querying module 1882 determines that the query should be serviced by the FAA mode. The querying module 1882 may, for example, be associated with query engine and reporting system 324 discussed in FIG. 3.

The exemplary Trace IDs stored with each unique set of "FROM" and "TO" tag attributes for a cross-service span pair may be used by the querying module 1882 to respond to queries in accordance with the FAA mode. For example, if a user needs particularized information regarding span performance or span duration, the querying module 1882 may be able to use the aggregated rows of information stored in a database associated with the storage module 1866 to access one or more exemplary Trace IDs associated with the call. Using the Trace IDs then, the querying module may be able to access the sessionized traces 1808 and perform analytics on the retrieved exemplary traces to deliver the requisite span performance and span duration information. In one embodiment, the full trace information may be accessed from a storage set associated the slow and full-fidelity mode, which stores the entire traces 1808 as ingested following sessionization. In a different embodiment, however, the FAA mode may save full trace information for traces associated with the exemplary Trace IDs in a separate storage from the data set associated with the slow and full-fidelity mode.

In one embodiment, because the FAA mode allows users to retrieve raw trace data, it also allows users to run an analysis on the retrieved data for an arbitrary set of tags (instead of being limited to the tags pre-indexed by indexing module 1807). Because the user is allowed to run arbitrary analyses and breakdowns against the raw trace data, response times for the fast and approximate mode may be slower than the FFF mode (e.g., on the order of seconds as compared to the sub-second response rates of the FFF mode). Also, the analyses may not be performed at full-fidelity because the analysis focuses on exemplary traces (and not the entire set of relevant traces).

The FAA mode is particularly advantageous in circumstances where the user has identified a problem from the information provided by the FFF mode, e.g., from the service graph and the associated SLIs. Having identified a problem, the user may be able to traverse deeper using the FAA mode and access relevant traces to receive more specific information regarding the problem. Also, the FAA mode allows the user to run an arbitrary analysis on the traces, e.g., on a set of tags that has not previously been indexed, which provides the user with specific information that may be used to diagnose and resolve the problem.

Note that the collection and aggregation process is repeated for subsequent time windows after time window Y 1880. In this way, the aggregation process is performed over time. This allows the FAA mode to deliver query results over varying time durations (as discussed, for example, in connection with drop-down menu 722 in FIG. 7).

Figure 18B:
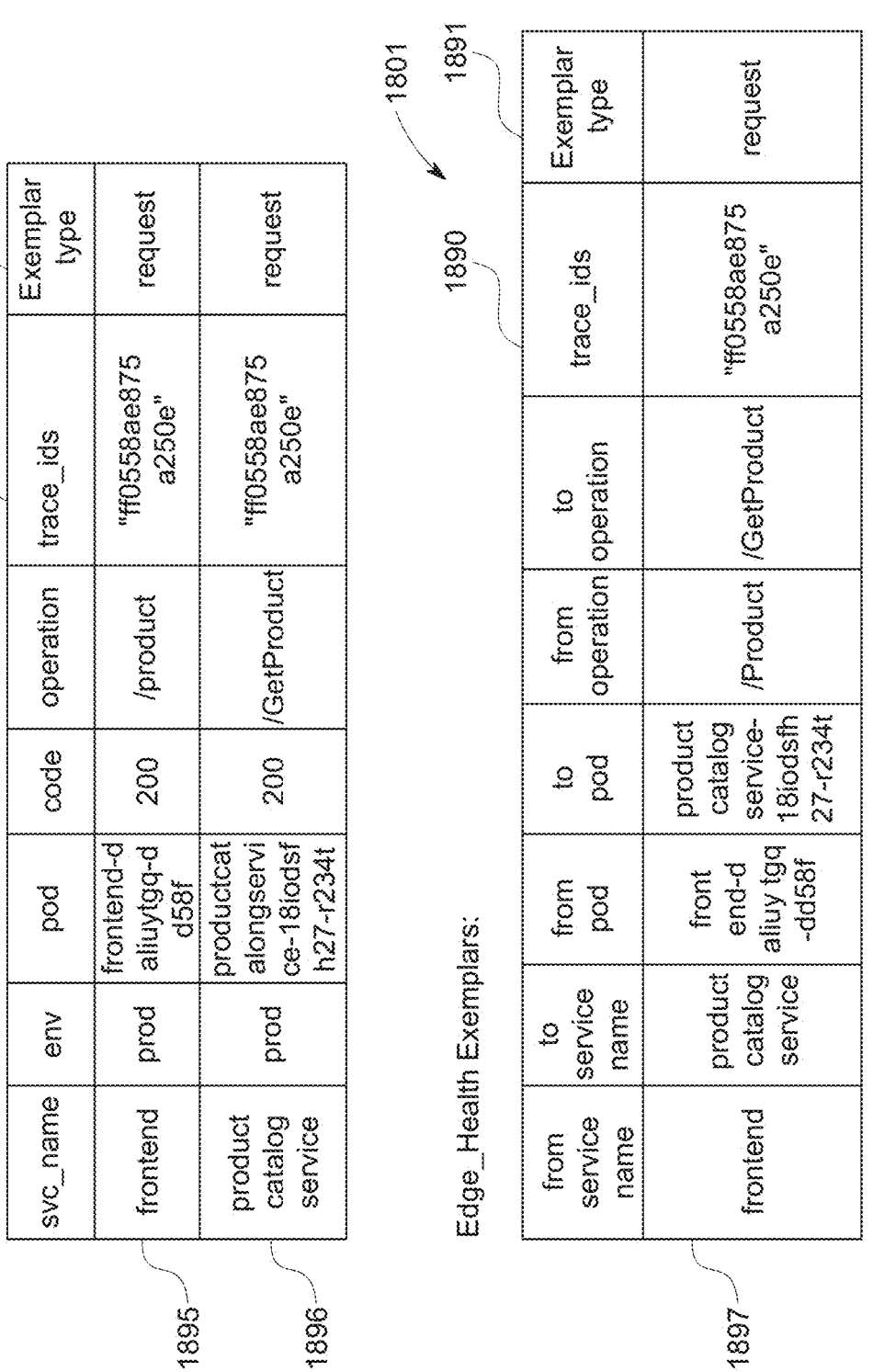
FIG. 18B illustrates the manner in which data in the FAA mode is persisted using an edge data object comprising a memory-resident table of extracted indexed tag attributes with associated Trace IDs and using a node data object comprising a memory-resident table of extracted tags with associated Trace IDs, in accordance with an embodiment of the present invention.

FIG. 18B illustrates the manner in which data in the FAA mode is persisted using an edge data object comprising a memory-resident table of extracted indexed tag attributes with associated Trace IDs and using a node data object comprising a memory-resident table of extracted tags with associated Trace IDs, in accordance with an embodiment of the present invention. In one embodiment of the present invention, a memory-resident table 1801 created to persist data for the FAA mode is associated with the various dependencies in the application. Also, a memory-resident table 1800 created to persist data for the FAA mode is associated with the various service nodes in the application. Note that table 1801 is created in a similar way to table 1501 in FIG. 15B and that table 1800 is created in a similar way to table 1500 of FIG. 15B. Instead of tracking RED metrics, however, the tables in FIGS. 18A and 18B comprise a column for Trace IDs 1890 and Exemplar Type 1891.

Row 1897 in table 1801 is one exemplary row that may be generated for the cross-service span pair of FIG. 15A. Note that for simplicity, only tag attributes "from pod" and "to pod" are illustrated in row 1897 in FIG. 18B, but row 1897 would typically also comprise information for tag attributes associated with indexed tags "code" and "env." As discussed previously, each row for the cross-service span pair of FIG. 15A will comprise a unique set of "FROM" and "TO" tag attributes. Accordingly, there may be multiple rows in table 1501 for the cross-service call discussed in connection with FIG. 15A, where each row would comprise a unique combination of "FROM" and "TO" tag attributes for a given cross-service span pair. Each row in table 1801 comprises a Trace ID column 1890, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one embodiment, the Exemplar Type column 1891 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one embodiment, the FAA mode may maintain a separate table 1800 associated with the service nodes in the application. Rows 1895 and 1896 in table 1800 are two exemplary rows that may be generated for the cross-service span pair of FIG. 15A. Each row in table 1800 comprises a unique combination of service and associated tags. For example, row 1895 is associated with the front-end service (e.g., service 1539 in FIG. 15A) and comprises corresponding tag values for "env," "pod" and "code." Similarly, row 1896 is associated with the product catalog service (e.g., product catalog service 1538 of FIG. 15A) and comprises corresponding tag values for "env," "pod" and "code."

Each unique combination of service name and corresponding tag values is associated with a Trace ID and Exemplar type that is maintained in table 1800. The Trace IDs may be used in FAA mode to retrieve full traces for more detailed analysis. In one embodiment, full traces associated with the exemplary Trace IDs may be maintained in a dedicated storage associated with the FAA mode. In a different embodiment, the full traces may be accessed from a data set associated with the slow and full-fidelity mode.

Tables 1801 and 1800 are similar to tables 1501 and 1500 in FIG. 15B respectively in that the combination of the service names and attributes that are used as an index for each row are the same, but instead of metrics information, tables 1801 and 1800 store Trace IDs that are used to retrieve exemplary traces that may be further analyzed to determine problem areas. Embodiments of the present invention use a table similar to the exemplary ones illustrated in FIG. 18B to aggregate rows of Trace IDs associated with the trace error signatures (or distributed error stacks). Each unique pairing of trace error signature and associated tags is stored with an exemplary Trace ID, which may be used to access exemplary traces associated with the trace error signature.

4.2.2 Features Supported by FAA Mode

Figure 19:
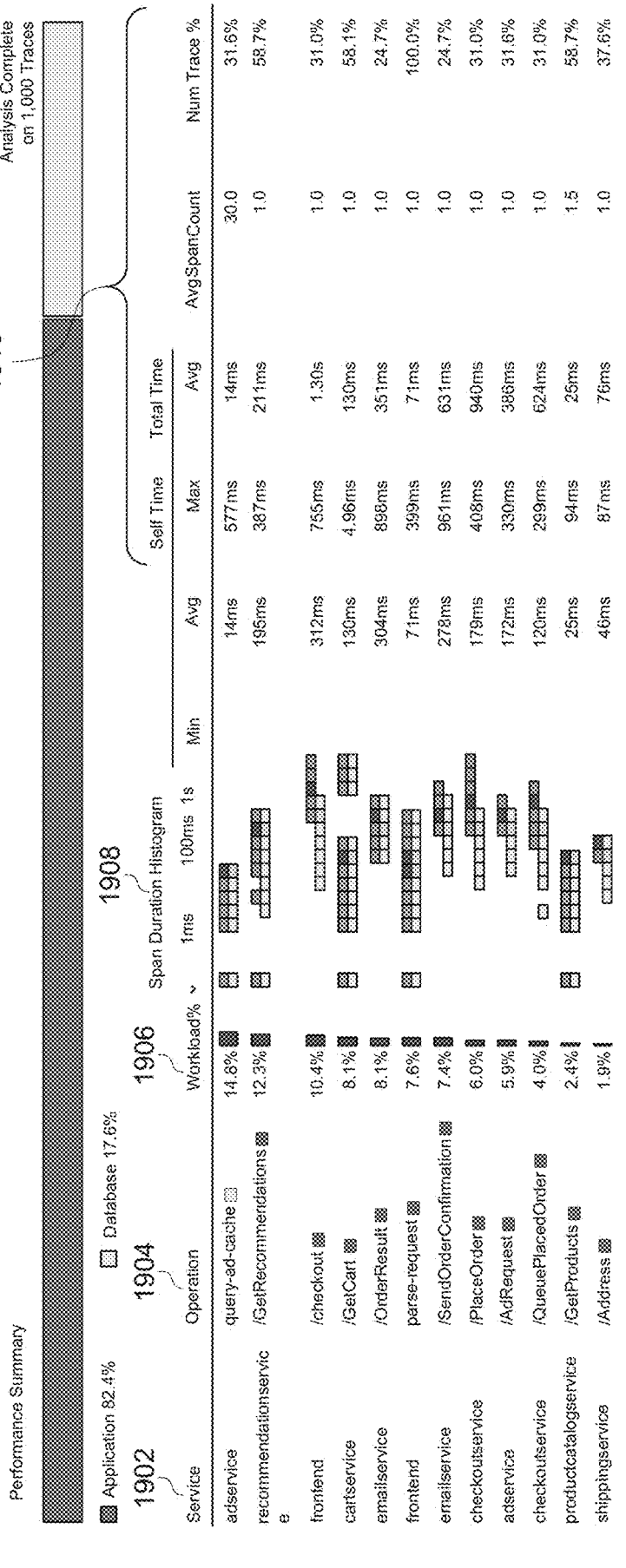
FIG. 19 is an on-screen GUI showing the manner in which a client may access detailed performance summaries for each span in the FAA mode, in accordance with embodiments of the present invention.

In one embodiment, the FAA mode may be used to provide users with a detailed analysis on a span level that shows workload percentage and provides detailed distributions for each span. FIG. 19 is an on-screen GUI showing the manner in which a client may access detailed performance summaries for each span in the FAA mode, in accordance with embodiments of the present invention. As shown in the GUI of FIG. 19, a user is able to obtain detailed information for each span including the service name 1902, the corresponding operation 1904, workload percentage 1906, a span duration histogram 1908 and various other statistics 1910 associated with a respective span. This detailed analysis is made possible by the ability to access the raw traces and performing computations on the trace.

Figure 20:
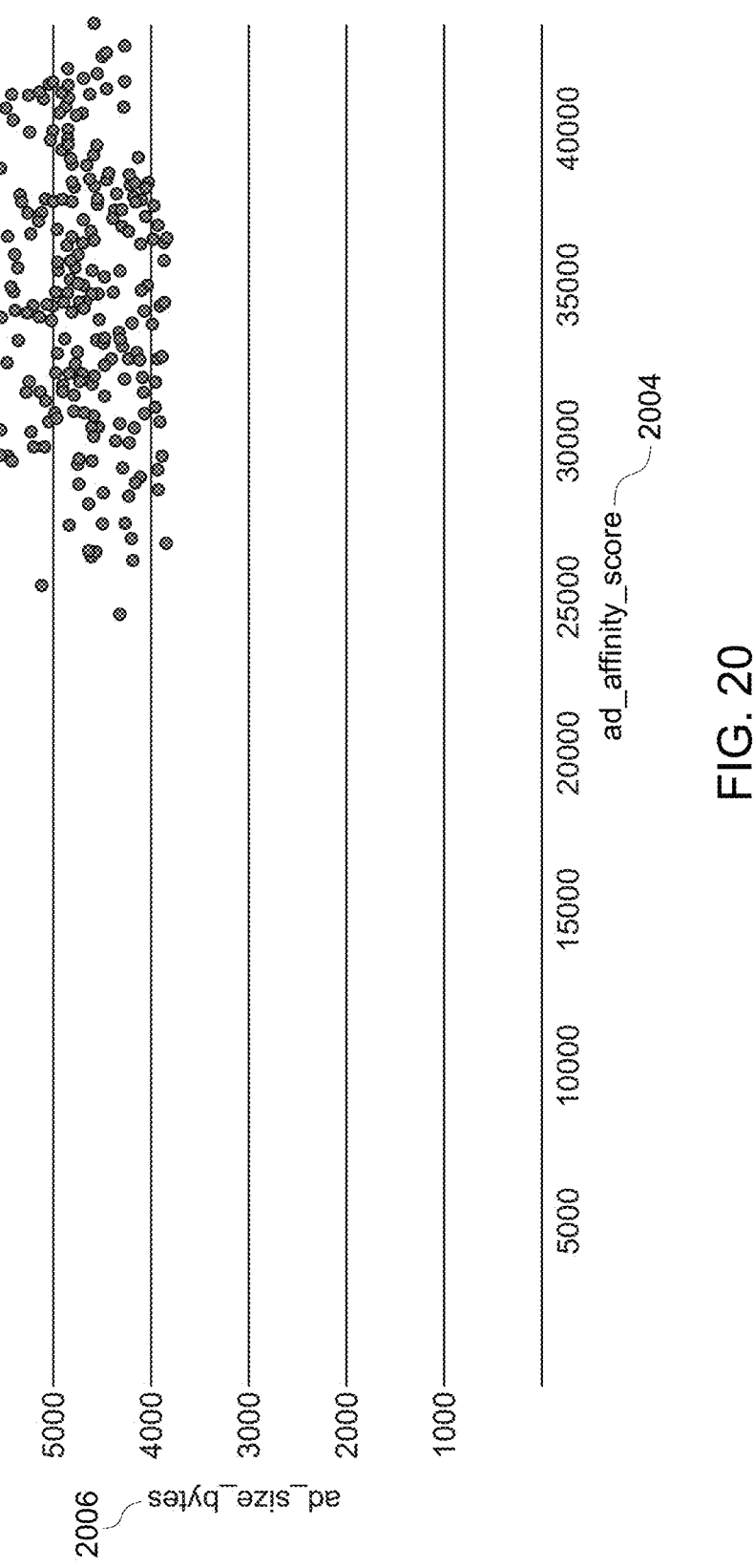
FIG. 20 is an on-screen GUI showing the manner in which a client may compare extracted custom metrics from exemplary traces in the FAA mode, in accordance with embodiments of the present invention.

FIG. 20 is an on-screen GUI showing the manner in which a client may compare extracted custom metrics from exemplary traces in the FAA mode, in accordance with embodiments of the present invention. As shown in FIG. 20, in one embodiment, the FAA mode provides users the ability to compare the ad_size_bytes 2006 and ad_affinity_score 2004 metrics to determine if there is a correlation between the two. Raw trace data may be retrieved using exemplary Trace IDs stored for the FAA mode to perform the comparison. Note that the metrics for comparison is not limited to RED metrics, but may be user-specified custom metrics, e.g., ad_size_bytes 2006 and ad_affinity_score 2004.

In one embodiment, the service graph, e.g., graph 600 in FIG. 6 may be generated using exemplary traces and raw trace data in the FAA mode (instead of metrics values from the FFF mode). Because the FAA data is not full-fidelity and is generated using exemplary traces, the service graph may be an approximate version of the full-fidelity graph displayed in FIG. 6. Similarly, approximate values for the SLIs associated with the service graph 600 may also be calculated in the FAA mode. Again, unlike the FFF mode, the data in the FAA mode is not full-fidelity and, therefore, measurements are approximate.

The FAA mode, in one embodiment, also allows break downs of the service nodes and edges (e.g., as discussed in connection with FIGS. 10A, 10B, 11A and 11B) by an arbitrary set of tags in addition to the pre-determined indexed tags. The FFF mode, by comparison, may not support a break-down across an arbitrary set of tags.

In an embodiment, the FAA mode may be used in conjunction with the slow and full-fidelity mode to perform a deeper analysis. For example, the user may use the exemplary traces to run a search against an arbitrary set of tags to identify problem areas. Once the user has an under-standing of where to look to identify problems within the traces, the user may be able to run more detailed searches against the full-fidelity trace data stored as part of the slow and full-fidelity mode data set.

In one embodiment, the FAA mode may also support displaying hover charts (e.g., the hover chart 728 in FIG. 7, the hover graph 804 in FIG. 8), however, the hover charts may be implemented as scatter-plots instead of line charts because the data is approximate. In one embodiment, the ability to pull up exemplary traces by double clicking on hover charts (e.g., the hover chart 728) or heat-maps for distributed error stacks, as discussed above, may also be supported by the FAA mode.

FIG. 21 presents a flowchart illustrating the process 2100 in which data for the FAA mode may be aggregated and persisted, in accordance with embodiments of the present invention. Blocks 2102-2112 describe exemplary steps comprising the computer implemented process 2100 depicted in FIG. 21, in accordance with the various embodiments herein described. In one embodiment, the process 2100 is implemented at least in part as computer-executable instructions stored in a computer-readable medium and executed in one or more processing devices.

At block 2102, a plurality of spans associated with instrumented services are ingested for a given time duration and consolidated into one or more traces, where each span comprises at least a Trace ID associated with a user-request. In one embodiment, the spans are ingested and grouped into traces in real time. In an embodiment, the plurality of spans may be grouped or consolidated into one or more traces in discrete windows of time. A sessionization process is used whereby, using the time-stamps and the Trace IDs associated with each trace, traces are created from the incoming spans such that each session of the sessionization process creates traces associated with a corresponding window of time.

At block 2104, a pre-determined set of tags are indexed from the plurality of traces. At block 2106, the collection module 1820 (shown in FIG. 18A) traverses the trace structures to determine and collect cross-service span pairs that represent cross-service calls between two services. As noted in connection with FIG. 18A, to collect the cross-service span pairs, the collection module 1820 identifies parent-child span pairs in a given trace where the service name for the parent and the child are different.

At block 2108, once the cross-service span pairs are collected, the collection module 1820 of the monitoring platform maps indexed tags associated with each service in the cross-service span pair to tag attributes, e.g., selected indexed tags associated with a parent span (the originating service) are mapped to a "FROM" tag attribute and selected indexed tags associated with the child span (the target service) are mapped to a "TO" tag attribute. As noted above, in one embodiment, indexed tags associated with each respective service in the cross-service span pairs may be determined based on service tiers.

At block 2110, the aggregation module 1466 maintains one or more exemplary Trace IDs for each unique set of tag attributes associated with a cross-service pair, e.g., one or more exemplary Trace IDs may be maintained for each unique set of "FROM" tag attributes to "TO" tag attributes associated with a cross-service pair. At block 2112, in response to a user's query that is serviced by the FAA mode, the monitoring platform may use a unique combination of service name (and operation name) and tag attributes as an index to access respective one or more Trace IDs and retrieve the raw trace information associated with the Trace IDs to perform further analysis.

4.3 Slow and Full-Fidelity Mode (Referred to Hereinafter as "SFF" Mode)

In one embodiment, the SFF module 524 of FIG. 5A stores all the incoming trace data from the sessionization process in real time. Unlike the prior two modes, the SFF mode stores the trace data in its raw form. In one embodiment, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one embodiment, the format of the metadata may comprise a map of a service name to a map of tag names, wherein each tag name may be mapped to a list of tag values. The batches of full traces in unstructured format and the metadata are queried in the SFF mode using a robust data engine to search for any tag across the traces. For example, PRESTO is an open source distributed SQL query engine that may execute queries against data sources of varying sizes.

Figure 22:
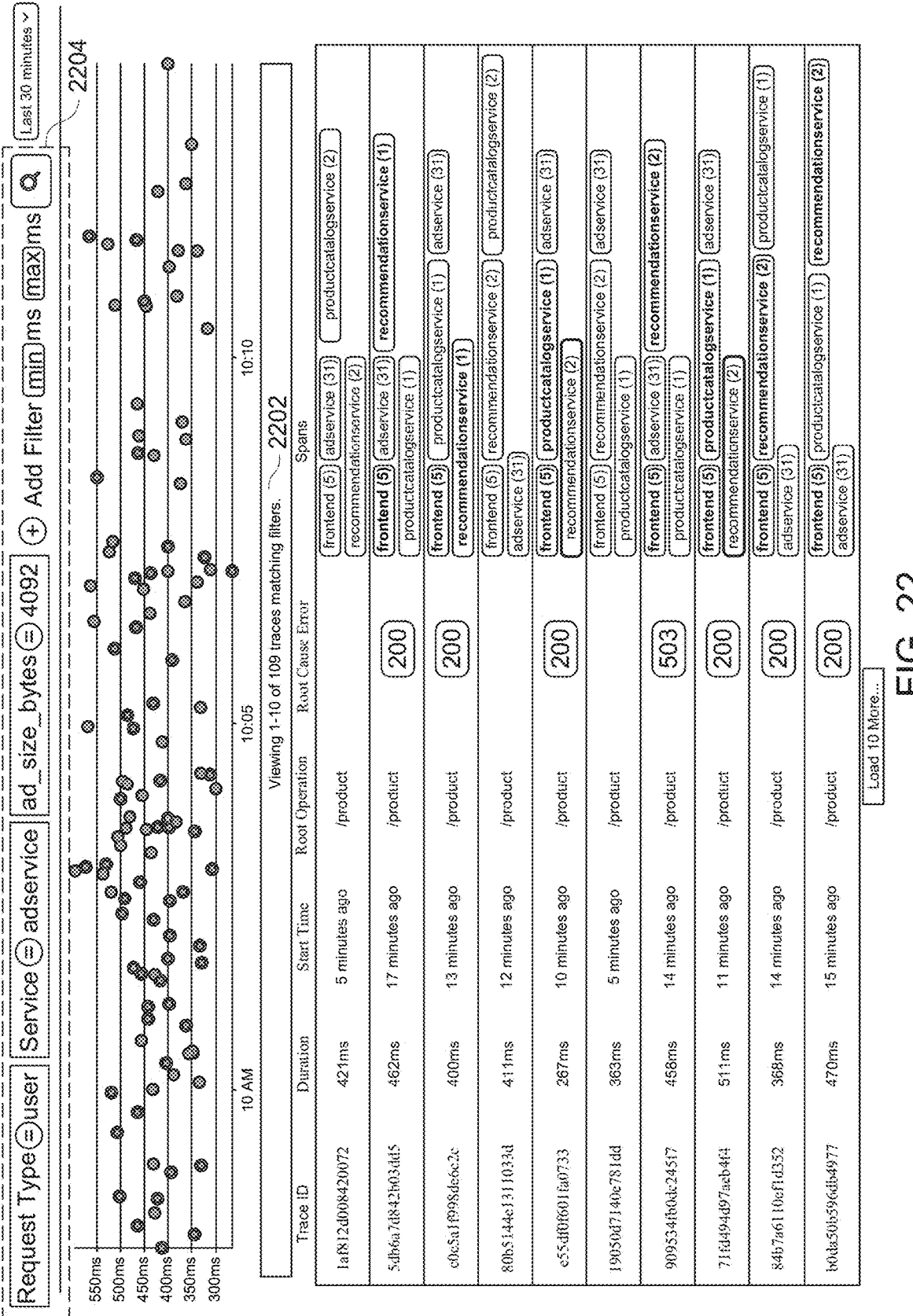
FIG. 22 is an on-screen GUI showing the manner in which a client may submit a query to be executed against the full set of traces stored in the slow and full-fidelity mode, in accordance with embodiments of the present invention.

FIG. 22 is an on-screen GUI showing the manner in which a client may submit a query to be executed against the full set of traces stored in the SFF mode, in accordance with embodiments of the present invention. The SFF mode, in one embodiment, allows a user to execute query against arbitrary tags to receive a set of traces that matches the query. For example, in the GUI of FIG. 22, the user enters a query 2204 for traces where "Request Type=user," "Service=adservice" and the tag "ad_size_bytes=4092." In response, the platform returns a list 2202 of the traces matching the user-entered filters and, further, provides information about the traces, e.g., the Trace ID, duration, start time, root operation, root cause error status code and associated spans.

In one embodiment, the monitoring platform, in the SFF mode, has the ability to run a full trace search (as shown in FIG. 22), and feed the traces collected into other modes of analysis, e.g., the performance summary shown in FIG. 19, to get more detailed information about an arbitrary set of traces and an arbitrary set of attributes associated with the set of traces. The integration between the two modes allows an arbitrary set of traces to be analyzed in the FAA mode, which is typically restricted to analyzing the exemplary traces stored in the FAA data set.

4.4 Seamless Navigation Between Modes

The monitoring platform, in one embodiment, allows a user to easily navigate between the three different modes to perform searches with varying levels of resolution. FIGS. 23A-23D illustrates the manner in which the user may seamlessly navigate between modes to perform queries requesting different levels of performance detail.

Figure 23A:
FIG. 23A is an on-screen GUI showing the manner in which a client may submit a query that is executed using the FFF mode, in accordance with embodiments of the present invention.

FIG. 23A is an on-screen GUI showing the manner in which a client may submit a query that is executed using the FFF mode, in accordance with embodiments of the present invention. For example, a user may need to diagnose problems associated with recommendation service 2304. Accordingly, using the exemplary GUI of FIG. 23A, a user may use drop-down menus to query the number of requests 2308 associated with the recommendation service 2304, where the "version" tag 2312 equals a value of "ffcd23." Note, that the user has the option to select various combinations of tags or attributes using drop-down menus 2302. In accordance with the FFF mode, a tag analysis (as selected using tab 2306) may be performed for indexed tags and presented to the user through panel 2314 in the GUI. The manner in which the FFF mode supports tag analysis was discussed in detail in connection with FIGS. 10A and 10B. As shown in panel 2314 of the exemplary GUI, request, error and root cause metrics may be provided for each of the indexed tags.

If the user needs detailed analysis on the spans associated with recommendation service 2304, the user may switch to a span performance analysis (as selected using tab 2316). The monitoring platform seamlessly transitions to the FAA mode and provides the user with span performance data as shown in FIG. 23B.

Figure 23B:
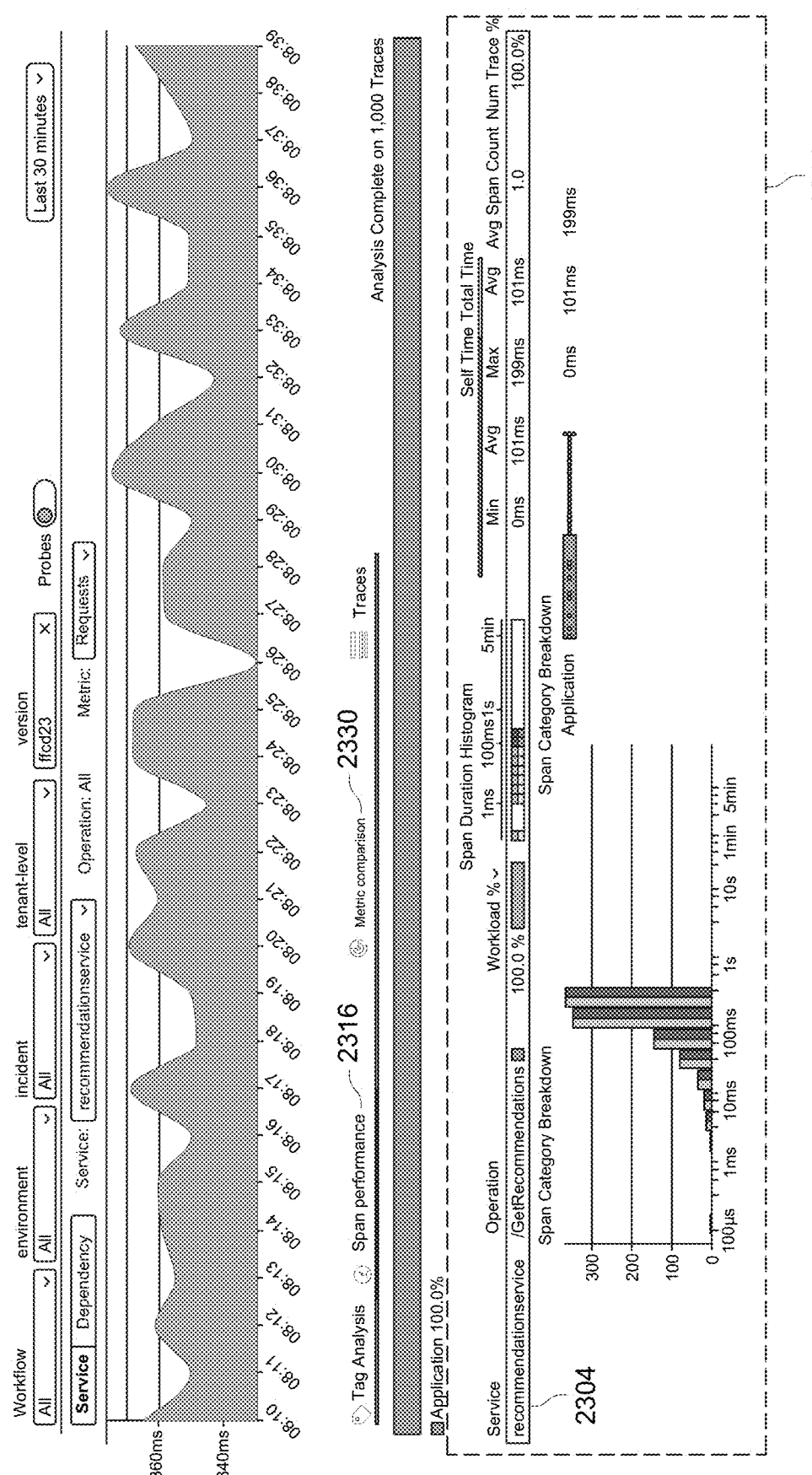
FIG. 23B is an on-screen GUI showing the manner in which a client may be able to receive span performance data for the service analyzed in FIG. 23A, in accordance with embodiments of the present invention.

FIG. 23B is an on-screen GUI showing the manner in which a client may be able to receive span performance data for the service analyzed in FIG. 23A, in accordance with embodiments of the present invention. Having selected the span performance tab 2316, panel 2314 of the GUI seamlessly transitions from displaying tag analysis data (under the FFF mode) to displaying detailed information about the span(s) associated with the recommendation service 2304 under the FAA mode. The various statistics provided by the FAA mode for spans in connection with a performance summary were discussed in connection with FIG. 19.

In an embodiment, the user may elect to perform a metrics comparison by selecting the corresponding metrics comparison tab 2330. Note that metrics comparison charts were discussed previously in FIG. 20 in connection with features supported by the FAA mode. The information displayed in panel 2314, in response to the selection, transitions to providing a metrics comparison chart as shown in FIG. 23C.

Figure 23C:
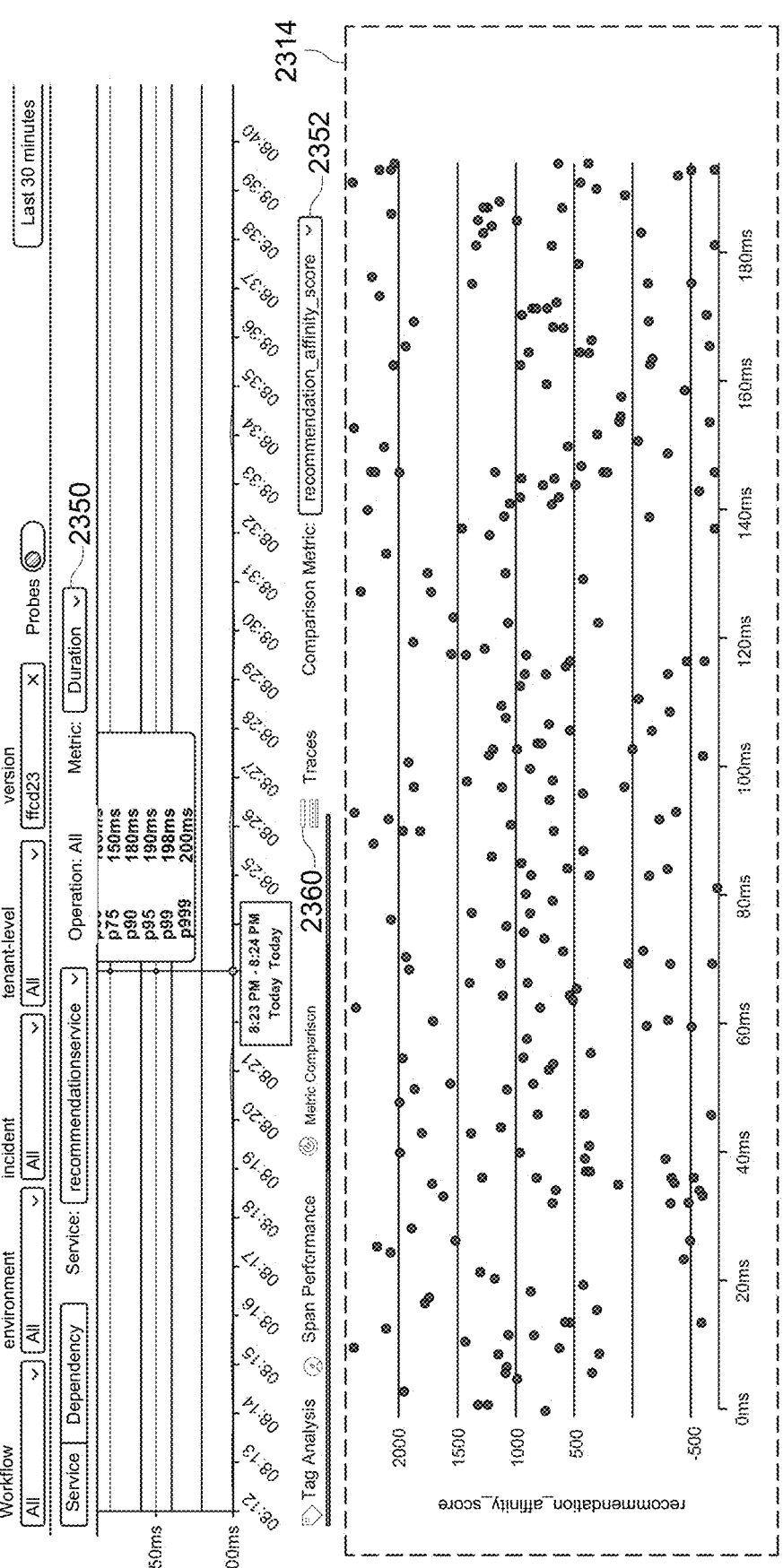
FIG. 23C is an on-screen GUI showing the manner in which a client may be able to receive metrics comparison associated with the service analyzed in FIG. 23A, in accordance with embodiments of the present invention.

FIG. 23C is an on-screen GUI showing the manner in which a client may be able to receive metrics comparison associated with the service analyzed in FIG. 23A, in accordance with embodiments of the present invention. Panel 2314 in FIG. 23C provides a metrics comparison for "recommendation_affinity_score," 2352, a tag associated with the recommendation service 2304 that is extracted out and saved as metrics in a time-series. Note that instead of analyzing the requests associated with recommendation service (as was the case with FIGS. 23A and 23B), the user has selected "Duration" 2350 as the metric of choice in order to review the associated latency values.

Figure 23D:
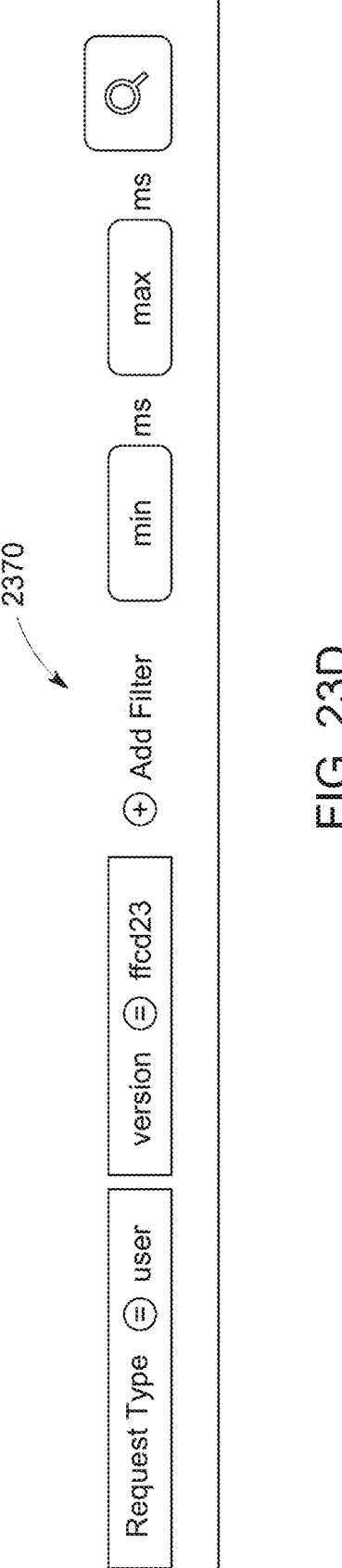
FIG. 23D is an on-screen GUI showing the manner in which a client may be able to able to perform a full trace search under the SFF mode, in accordance with embodiments of the present invention.

In an embodiment, the user has the option to click on the full-trace search tab 2360 in order to perform a full trace search to perform more detailed analyses. FIG. 23D is an on-screen GUI showing the manner in which a client may be able to able to perform a full trace search under the SFF mode, in accordance with embodiments of the present invention. Responsive to user clicking on the full-trace search tab 2360 in FIG. 23D, the GUI seamlessly navigates to providing the user filters for performing an in-depth trace search (similar to the one discussed in connection with FIG. 22). Note that the value for the "version" tag is preserved and carried over from when the user selected the tag 2312 in FIG. 23A. When the query 2370 is executed, the monitoring platform will seamlessly access the data set associated with the SFF mode to respond to the query. In this way, the GUI provides an application owner or developer the option of seamlessly navigating between the three different modes to extract various level of details associated with the services in the architecture.

FIG. 24 presents a flowchart illustrating the process 2400 for persisting and querying data in a computer system comprising microservices, in accordance with embodiments of the present invention. Blocks 2402-2412 describe exemplary steps comprising the computer implemented process 2400 depicted in FIG. 24, in accordance with the various embodiments herein described. In one embodiment, the process 2400 is implemented at least in part as computer-executable instructions stored in a computer-readable medium and executed in one or more processing devices.

At block 2402, a plurality of spans associated with a microservices-based application are ingested for a given time duration and consolidated into one or more traces, where each span comprises at least a Trace ID (and/or a Parent Span ID) associated with a user-request. In one embodiment, all the spans are ingested and grouped into traces in real time. The monitoring platform is able to ingest all the incoming spans without sampling. In an embodiment, the plurality of spans may be grouped or consolidated into one or more traces in discrete windows of time using a sessionization process.

At block 2404, data is generated for a plurality of modes using the plurality of traces, where each mode extracts a different level of detail from the plurality of spans associated with the plurality of traces for analyzing the data and where each mode is associated with a discrete data set. At block 2406, in response to a user's query, a monitoring platform may be configured to determine which of the modes is best suited to respond to the user's query. At block 2408, the data set associated with the respective mode determined in block 2406 is accessed to compute a response to the user's query.

At block 2410, a response is generated to the user query using information extracted from the accessed data set.

While the principles of the invention have been described above in connection with specific apparatus, it is to be clearly understood that this description is made only by way of example and not as a limitation on the scope of the invention. Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of analyzing performance of services in a microservices-based application by a first analysis mode of a plurality of analysis modes, the method comprising:
   generating a plurality of traces from a plurality of spans associated with a microservices-based application and ingested during a given time duration;
   indexing a plurality of tags from the plurality of traces;
   collecting a plurality of span pairs from the plurality of traces, wherein each span pair of the plurality of span pairs is associated with a call between two services in the microservices-based application;
   mapping at least one indexed tag from the plurality of tags for each span in each span pair of the plurality of span pairs to tag attributes, wherein the tag attributes indicate a directionality of dependency for a respective call between services within a respective span pair;
   maintaining one or more counts for each occurrence of a unique set of tag attributes associated with each span pair of the plurality of span pairs;
   aggregating respective counts associated with each span pair of the plurality of span pairs; and
   servicing a user query based on the aggregating.

2. The method of claim 1, further comprising:
   creating a first table, wherein each row of the first table comprises a unique combination of a span pair from the plurality of span pairs and associated tag attributes, and a count value to track multiple occurrences of a respective span pair and an associated tag attributes in the plurality of traces.

3. The method of claim 1, further comprising:
creating a second table, wherein each row of the second table comprises a unique combination of a service in the microservices-based application and associated the at least one indexed tag from the plurality of tags, and a count value to track multiple occurrences of a respective service and the associated the at least one indexed tag from the plurality of tags in the plurality of traces.

4. The method of claim 1, further comprising ingesting the plurality of spans in real time.

5. The method of claim 1, further comprising:
generating metrics for services and dependencies comprised within the microservices-based application by tracking a number of occurrences of the at least one indexed tag from the plurality of tags in connection with a respective service or a respective dependency for the given time duration, and wherein the metrics are selected from a group including requests, errors, and duration.

6. The method of claim 1, further comprising:
generating metrics for services and dependencies comprised within the microservices-based application by tracking of a number of occurrences of the at least one indexed tags from the plurality of tags in connection with a respective service or a respective dependency for the given time duration; and
rendering an application topology graph for display in a GUI using the metrics.

7. The method of claim 1, wherein the first analysis mode from the plurality of analysis modes is selected based on at least one of a structure of the user query, a type of the user query, a syntax of the user query, a content of the user query, and an interface through which the user query was submitted.

8. A non-transitory computer-readable medium having computer-readable program code embodied therein for causing a computer system to perform a method of analyzing performance of services in a microservices-based application by a first analysis mode of a plurality of analysis modes, the method comprising:
generating a plurality of traces from a plurality of spans associated with a microservices-based application and ingested during a given time duration;
indexing a plurality of tags from the plurality of traces;
collecting a plurality of span pairs from the plurality of traces, wherein each span pair of the plurality of span pairs is associated with a call between two services in the microservices-based application;
mapping at least one indexed tag from the plurality of tags for each span in each span pair of the plurality of span pairs to tag attributes, wherein the tag attributes indicate a directionality of dependency for a respective call between services within a respective span pair;
maintaining one or more counts for each occurrence of a unique set of tag attributes associated with each span pair of the plurality of span pairs;
aggregating respective counts associated with each span pair of the plurality of span pairs; and
servicing a user query based on the aggregating.

9. The non-transitory computer-readable medium of claim 8, further comprising:
creating a first table, wherein each row of the first table comprises a unique combination of a span pair from the plurality of span pairs and associated tag attributes, and a count value to track multiple occurrences of a respective span pair and an associated tag attributes in the plurality of traces.

10. The non-transitory computer-readable medium of claim 8, further comprising:
creating a second table, wherein each row of the second table comprises a unique combination of a service in the microservices-based application and associated the at least one indexed tag from the plurality of tags, and a count value to track multiple occurrences of a respective service and the associated the at least one indexed tag from the plurality of tags in the plurality of traces.

11. The non-transitory computer-readable medium of claim 8, further comprising ingesting the plurality of spans in real time.

12. The non-transitory computer-readable medium of claim 8, further comprising:
generating metrics for services and dependencies comprised within the microservices-based application by tracking a number of occurrences of the at least one indexed tag from the plurality of tags in connection with a respective service or a respective dependency for the given time duration, and wherein the metrics are selected from a group including requests, errors, and duration.

13. The non-transitory computer-readable medium of claim 8, further comprising:
generating metrics for services and dependencies comprised within the microservices-based application by tracking of a number of occurrences of the at least one indexed tag from the plurality of tags in connection with a respective service or a respective dependency for the given time duration; and
rendering an application topology graph for display in a GUI using the metrics.

14. The non-transitory computer-readable medium of claim 8, wherein the first analysis mode from the plurality of analysis modes is selected based on at least one of a structure of the user query, a type of the user query, a syntax of the user query, a content of the user query, and an interface through which the user query was submitted.

15. A system for performing a method of analyzing performance of services in a microservices-based application by a first analysis mode of a plurality of analysis modes, the system comprising:
a processing device communicatively coupled with a memory and configured to:
generate a plurality of traces from a plurality of spans associated with a microservices-based application and ingested during a given time duration;
index a plurality of tags from the plurality of traces;
collect a plurality of span pairs from the plurality of traces, wherein each span pair of the plurality of span pairs is associated with a call between two services in the microservices-based application;
map at least one indexed tag from the plurality of tags for each span in each span pair of the plurality of span pairs to tag attributes, wherein the tag attributes indicate a directionality of dependency for a respective call between services within a respective span pair;
maintain one or more counts for each occurrence of a unique set of tag attributes associated with each span pair of the plurality of span pairs; and aggregate respective counts associated with each span pair of the plurality of span pairs to service a user query.

16. The system of claim 15, wherein the processing device is further configured to:

create a first table, wherein each row of the first table comprises a unique combination of a span pair from the plurality of span pairs and associated tag attributes, and a count value to track multiple occurrences of a respective span pair and an associated tag attributes in the plurality of traces; and create a second table, wherein each row of the second table comprises a unique combination of a service in the microservices-based application and associated the at least one indexed tag from the plurality of tags, and a count value to track multiple occurrences of a respective service and the associated the at least one indexed tag from the plurality of tags in the plurality of traces.

17. The system of claim 15, wherein the first analysis mode from the plurality of analysis modes is selected based on at least one of a structure of the user query, a type of the user query, a syntax of the user query, a content of the user query, and an interface through which the user query was submitted.

\* \* \* \* \*